United States Patent
Li et al.

(10) Patent No.: US 12,395,552 B2
(45) Date of Patent: Aug. 19, 2025

(54) METHODS, ARCHITECTURES, APPARATUSES AND SYSTEMS DIRECTED TO ENABLERS FOR BLOCKCHAIN-ENABLED WIRELESS SYSTEMS

(71) Applicant: InterDigital Patent Holdings, Inc., Wilmington, DE (US)

(72) Inventors: Xu Li, Plainsboro, NJ (US); Chonggang Wang, Princeton, NJ (US); Paul Russell, Lawrence, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/011,913

(22) PCT Filed: Jun. 30, 2021

(86) PCT No.: PCT/US2021/039971
§ 371 (c)(1),
(2) Date: Dec. 21, 2022

(87) PCT Pub. No.: WO2022/006324
PCT Pub. Date: Jan. 6, 2022

(65) Prior Publication Data
US 2023/0262113 A1 Aug. 17, 2023

Related U.S. Application Data

(60) Provisional application No. 63/045,857, filed on Jun. 30, 2020.

(51) Int. Cl.
*H04L 67/1008* (2022.01)
*H04L 67/1097* (2022.01)

(52) U.S. Cl.
CPC ...... *H04L 67/1008* (2013.01); *H04L 67/1097* (2013.01)

(58) Field of Classification Search
CPC ................. H04L 67/1008; H04L 67/1097
(Continued)

(56) References Cited

U.S. PATENT DOCUMENTS

| 7,877,511 B1 | 1/2011 | Berger et al. |
| 10,299,128 B1 | 5/2019 | Suthar et al. |

(Continued)

FOREIGN PATENT DOCUMENTS

| CN | 110619317 A | 12/2019 |
| CN | 111885133 A | 11/2020 |

(Continued)

OTHER PUBLICATIONS

3rd Generation Partnership Project; Technical Specification Group Services and System Aspects; Study on application layer support for Factories of the Future in 5G network; (Release 17), 3GPP TR 23.745 V0.8.0, May 2020, 36 pages.

(Continued)

*Primary Examiner* — Ruolei Zong
(74) *Attorney, Agent, or Firm* — Julian F. Santos

(57) ABSTRACT

Procedures, methods, architectures, apparatuses, systems, devices, etc. directed to enablers for blockchain-enabled wireless systems are provided. Among the apparatuses, is an first apparatus that may be configured to receive, from a network application, a registration request including information indicating a plurality of application-level requirements for a distributed ledger service, including one or more performance requirements, and one or more actions; determine a node of a distributed ledger system to associate to the network application based at least in part on the performance requirement; provide, to each of a one or more computing (Continued)

resources, executable code for conducting one or more of the one or more actions; and send a confirmation of registration to the network application.

20 Claims, 48 Drawing Sheets

(58) Field of Classification Search
USPC .......................................................... 709/226
See application file for complete search history.

(56) References Cited

U.S. PATENT DOCUMENTS

| | | | |
|---|---|---|---|
| 10,884,810 B1* | 1/2021 | Verma | H04L 67/02 |
| 11,200,569 B1 | 12/2021 | James et al. | |
| 2015/0081470 A1 | 3/2015 | Westphal | |
| 2018/0096323 A1 | 4/2018 | Baber et al. | |
| 2018/0121909 A1* | 5/2018 | Christidis | H04L 9/3236 |
| 2018/0225640 A1 | 8/2018 | Chapman et al. | |
| 2019/0182254 A1* | 6/2019 | Christidis | H04L 9/0637 |
| 2019/0188699 A1 | 6/2019 | Thibodeau et al. | |
| 2019/0251199 A1 | 8/2019 | Klianev | |
| 2019/0278852 A1 | 9/2019 | Jayachandran et al. | |
| 2019/0280855 A1 | 9/2019 | Tong | |
| 2019/0280878 A1 | 9/2019 | Xia | |
| 2019/0373521 A1* | 12/2019 | Crawford | H04L 67/52 |
| 2019/0379754 A1 | 12/2019 | Krishnaswamy | |
| 2020/0007513 A1 | 1/2020 | Gleichauf | |
| 2020/0022201 A1 | 1/2020 | Ross et al. | |
| 2020/0034839 A1 | 1/2020 | Soundararajan et al. | |
| 2020/0092084 A1 | 3/2020 | Maroney et al. | |
| 2020/0143466 A1 | 5/2020 | Wu et al. | |
| 2020/0187022 A1 | 6/2020 | Ross et al. | |
| 2020/0195495 A1* | 6/2020 | Parker | H04L 41/40 |
| 2020/0219045 A1 | 7/2020 | Kikinis | |
| 2020/0374974 A1* | 11/2020 | Sun | H04L 41/20 |
| 2020/0387893 A1 | 12/2020 | Maim | |
| 2020/0396065 A1 | 12/2020 | Gutierrez-Sheris | |
| 2021/0075610 A1 | 3/2021 | Covaci et al. | |
| 2021/0126771 A1 | 4/2021 | Bae et al. | |
| 2021/0136042 A1* | 5/2021 | Wang | H04L 9/3239 |
| 2021/0160312 A1* | 5/2021 | Yang | H04L 67/101 |
| 2021/0320926 A1 | 10/2021 | Shina et al. | |
| 2021/0406871 A1 | 12/2021 | Ravinathan et al. | |
| 2022/0172180 A1 | 6/2022 | Komiyama | |
| 2022/0337436 A1 | 10/2022 | Beaudet et al. | |
| 2023/0206199 A1 | 6/2023 | Chua et al. | |
| 2023/0245117 A1 | 8/2023 | Higgins et al. | |

FOREIGN PATENT DOCUMENTS

| | | |
|---|---|---|
| WO | WO 2019217428 A1 | 11/2019 |
| WO | WO 2022006320 A1 | 1/2022 |
| WO | WO 2022006361 A1 | 1/2022 |
| WO | WO 2022197650 A1 | 9/2022 |

OTHER PUBLICATIONS

"Guidelines on writing a CR", 3GPP Tdoc S1-220008, 3GPP TSG SA1#97e, e-meeting, Feb. 14-24, 2022, 12 pages.
English Language Abstract, Chinese Publication No. 111885133, Nov. 3, 2020, 1 page.
3rd Generation Partnership Project; Technical Specification Group Services and System Aspects; System architecture for the 5G System (5GS), 3rd Generation Partnership Project (3GPP), Stage 2, Release 16, 3GPP TS 23.501 V16.4.0, Mar. 2020, 430 pages.
3rd Generation Partnership Project; Technical Specification Group Services and System Aspects; Policy and charging control framework for the 5G System (5GS); Stage 2, (Release 16), 3GPP TS 23.503 V16.4.1, Apr. 2020, 115 pages.
3rd Generation Partnership Project; Technical Specification Group Radio Access Network; NG Radio Access Network (NG-RAN); Stage 2 functional specification of User Equipment (UE) positioning in NG-RAN; (Release 16), 3GPP TS 38.305 V16.0.0, Mar. 2020, 107 pages.
"O-RAN Architecture Description", O-RAN.WG1.O-RAN-Architecture-Description-v02.00, version 02.00.07, O-RAN Alliance, Jul. 2020, 28 pages.
Lu Yunlong et al: "Blockchain and Federated Learning for 5G Beyond", IEEE Network, IEEE Service Center, vol. 35, No. 1, Dec. 20, 2020, 7 pages.
3rd Generation Partnership Project; Technical Specification Group Services and System Aspects; 5G System (5GS) Location Services (LCS); Stage 2, (Release 16), 3GPP TS 23.273 V16.0.0, Jun. 2019, 86 pages.
Qiong Zhang et al.: "Demo: A Blockchain Based Protocol for Federated Learning", IEEE 28th International Conference on Network Protocols (ICNP), Oct. 13, 2020, 2 pages.
3rd Generation Partnership Project; Technical Specification Group Services and System Aspects;Study on application layer support for Unmanned Aerial Systems (UAS); (Release 17), 3GPP TR 23.755 V0.7.0, Apr. 2020, 19 pages.
3rd Generation Partnership Project; Technical Specification Group Services and System Aspects; 5G System (5GS) Location Services (LCS); Stage 2, (Release 16), 3GPP TS 23.273 V16.3.0, Mar. 2020, 94 pages.
3rd Generation Partnership Project; Technical Specification Group Services and System Aspects; Procedures for the 5G System (5GS); Stage 2, (Release 16), 3GPP TS 23.502 V16.4.0, Mar. 2020, 213 pages.
English Language Abstract, Chinese Publication No. 110619317, Dec. 27, 2019, 1 page.
3rd Generation Partnership Project; Technical Specification Group Services and System Aspects; Study on support of the 5GMSG Service; (Release 17), 3GPP TR 23.700-24 V0.1.0, Aug. 2019, 13 pages.
3rd Generation Partnership Project; Technical Specification Group Services and System Aspects; Architecture enhancements for 5G System (5GS) to support network data analytics services (Release 16), 3GPP TS 23.288 V16.3.0, Mar. 2020, 62 pages.
Permissioned Distributed Ledger (PDL); Application Scenarios, ETSI GR PDL 003 V1.1.1 (Dec. 2020), 38 pages.

* cited by examiner

General Workflow of a Blockchain System

Transaction States and Block States

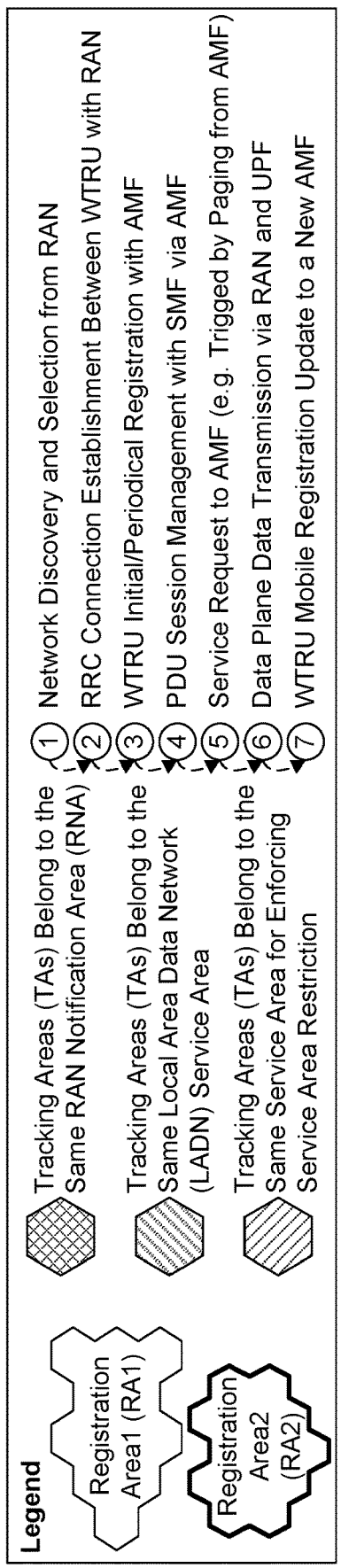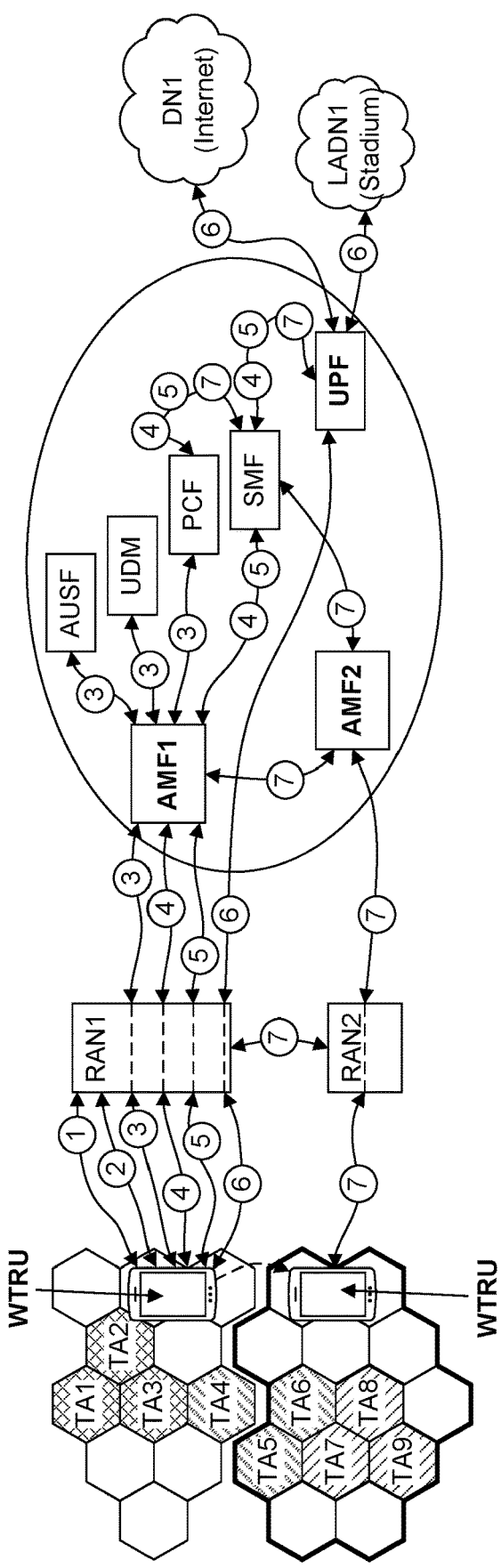
FIG. 5
General Procedures in 5G System Architecture

Policy Control Architecture for Non-Session Management

Policy Control Architecture for Session Management

Smart Manufacturing and Logistics

Procedure for a BCN to Register to a BCF

Procedure for a BCN to Register a Group of BCNs to a BCF

Procedure for BCN Management (Push-based Approach)

Procedure for BCN Management (Pull-based Approach)

BNA/BCA-triggered BCN Management Procedure

Procedure for a BNA to Register to a BCF with Full BCF Arrangements

Procedure for a BNA to Register to a BCF with Partial Arrangements

Procedure for Home BCF Discovery (For BCA Registration/Association Purpose) in Scenario 1

Procedure for Home BCF Discovery (For BCA Registration/Association Purpose) in Scenario 1 (BCC-initiated Discovery)

Procedure for Visited BCF Discovery (For Using Blockchain Service Purpose)

Procedure for Visited BCF Discovery (For Using Blockchain Service Purpose) (BCC-initiated Discovery)

Procedure for BCF Discovery (For BCA Registration/Association Purpose) in Scenario 2

Procedure for BCF Discovery (For BCA Registration/Association Purpose) in Scenario 2 – BCC Initiated Procedure for BCC Registration (in Scenario 1)

Procedure Design for BCA Registration to Its Home BCF (in Scenario 1)

FIG. 28 Procedure for BCA Registration to Its Visited BCF (in Scenario 1)

Procedure for BCA Registration to a BCF (in Scenario 2)

Procedure Design for BCF Registration in Scenario 2 – BCC Initiated

Procedure for BCC Registration to a BCF (in Scenario 3)

Generic Procedure for BCA Registration to a BCC

Generic Procedure for BCF-to-BCF Communication

Generic Procedure for BCN-to-BCN Communication via BCF

Generic Procedure for Policies Deployment

Generic Procedure for Policies Enforcement

5G System Architecture Extension with Blockchain Applications Enablement

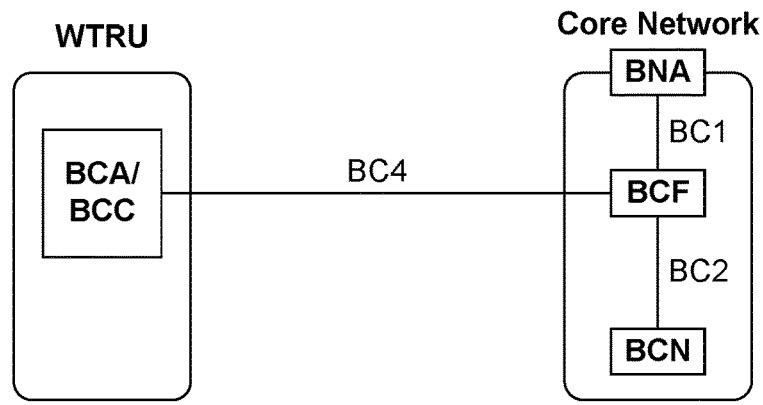
(a)
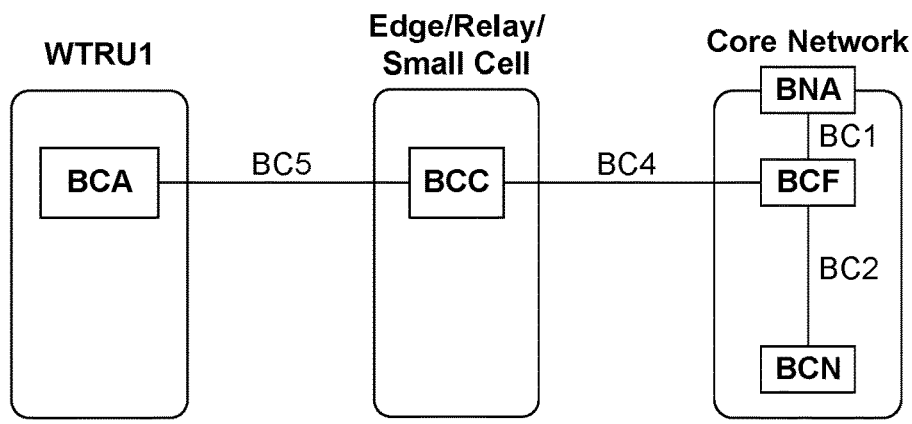
(b)
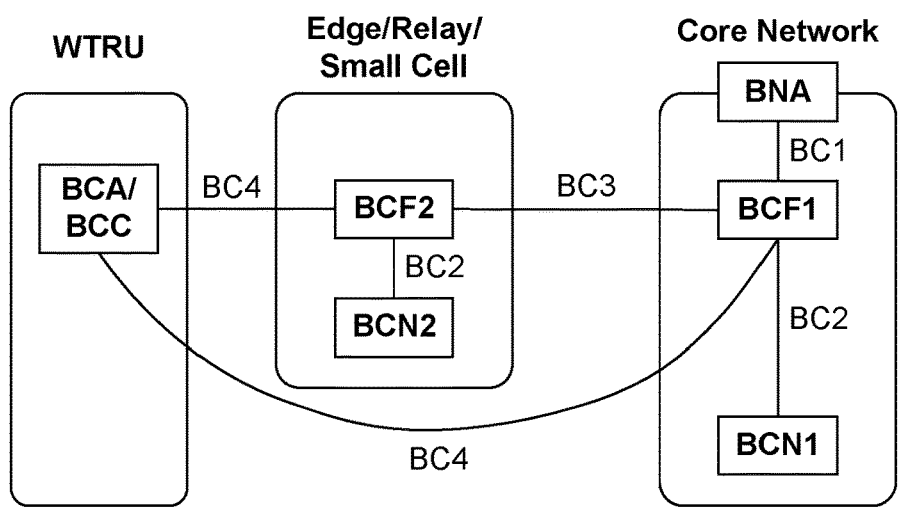
(c)
Blockchain-Enabled Wireless Applications Deployment Scenarios in 5GS
FIG. 38

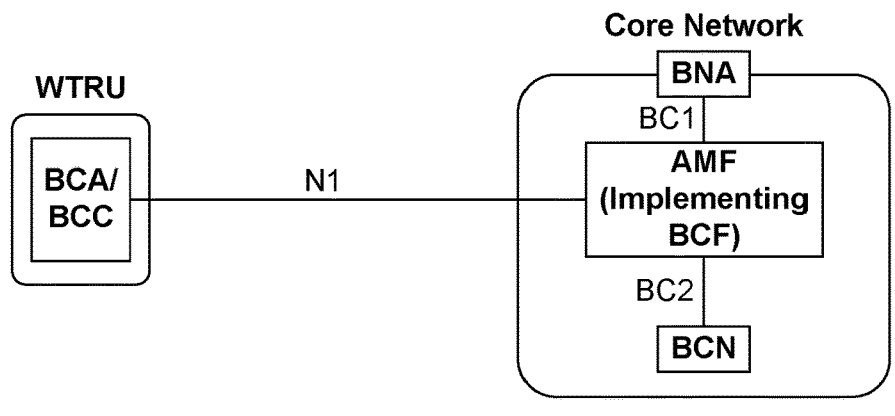
(a)
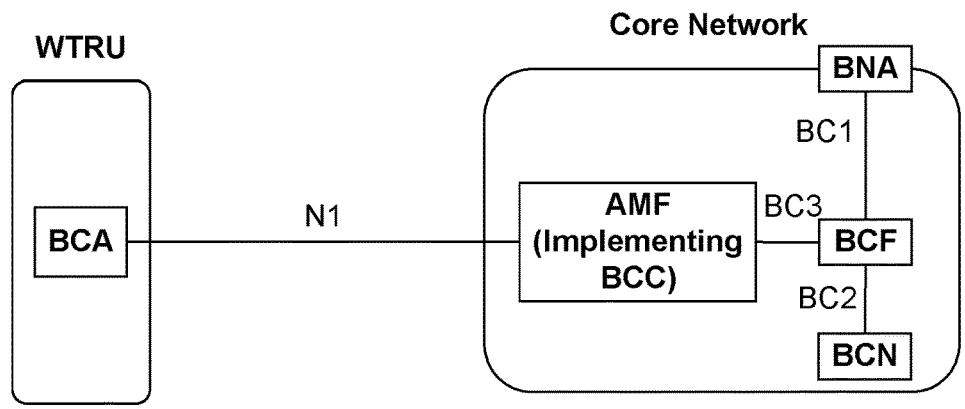
(b)
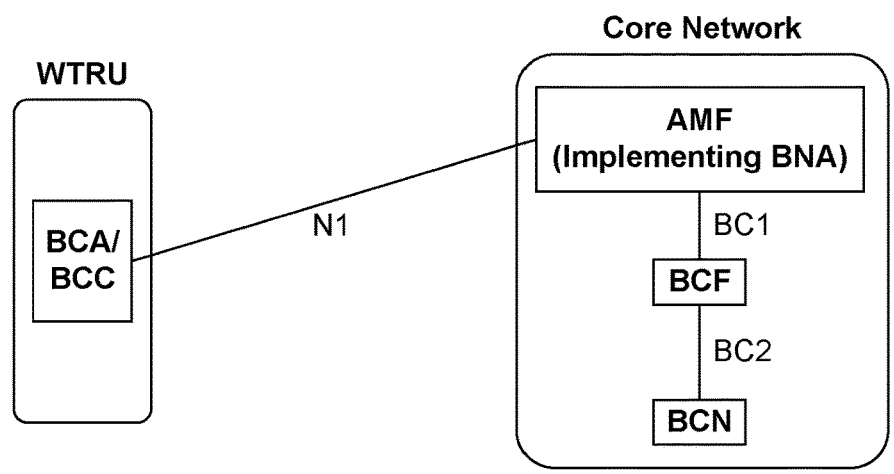
(c)
Implementing BCF/BCC/BNA using Eixsting Entities in 5GS
FIG. 39

Management of Blockchain Policy Rules for BCA and BCC in 5GS

Management of Blockchain Policy Rules for BNA in 5GS

BNA-Triggered Blockchain Policy Update in 5GS

Integrating Existing SA6 Vertical Application Enablements with
Blockchain Application Enablement – Model 1

Integrating Existing SA6 Vertical Applications Enablements with Blockchain Application Enablement – Model 2

Integrating Existing SA6 Vertical Applications Enablements with Blockchain Application Enablement – Model 3

METHODS, ARCHITECTURES, APPARATUSES AND SYSTEMS DIRECTED TO ENABLERS FOR BLOCKCHAIN-ENABLED WIRELESS SYSTEMS

CROSS REFERENCE TO RELATED APPLICATIONS

This application is a U.S. National Stage Application under 35 U.S.C. § 371 of International Patent Application No. PCT/US2021/039971, filed Jun. 30, 2021, which claims the benefit of priority to U.S. Provisional Patent Application No. 63/045,857 filed Jun. 30, 2020, which is incorporated herein by reference.

BACKGROUND

This application is related to wired and/or wireless communications, including, for example, procedures in connection with enablers for blockchain-enabled wireless systems.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein:

FIG. 5 illustrates various procedures in a 5GS;

FIG. 38 illustrates an example blockchain-enabled wireless applications deployment scenarios in 5GS;

FIG. 39 illustrates an example BCF/BCC/BNA implementation using existing entities in 5GS

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
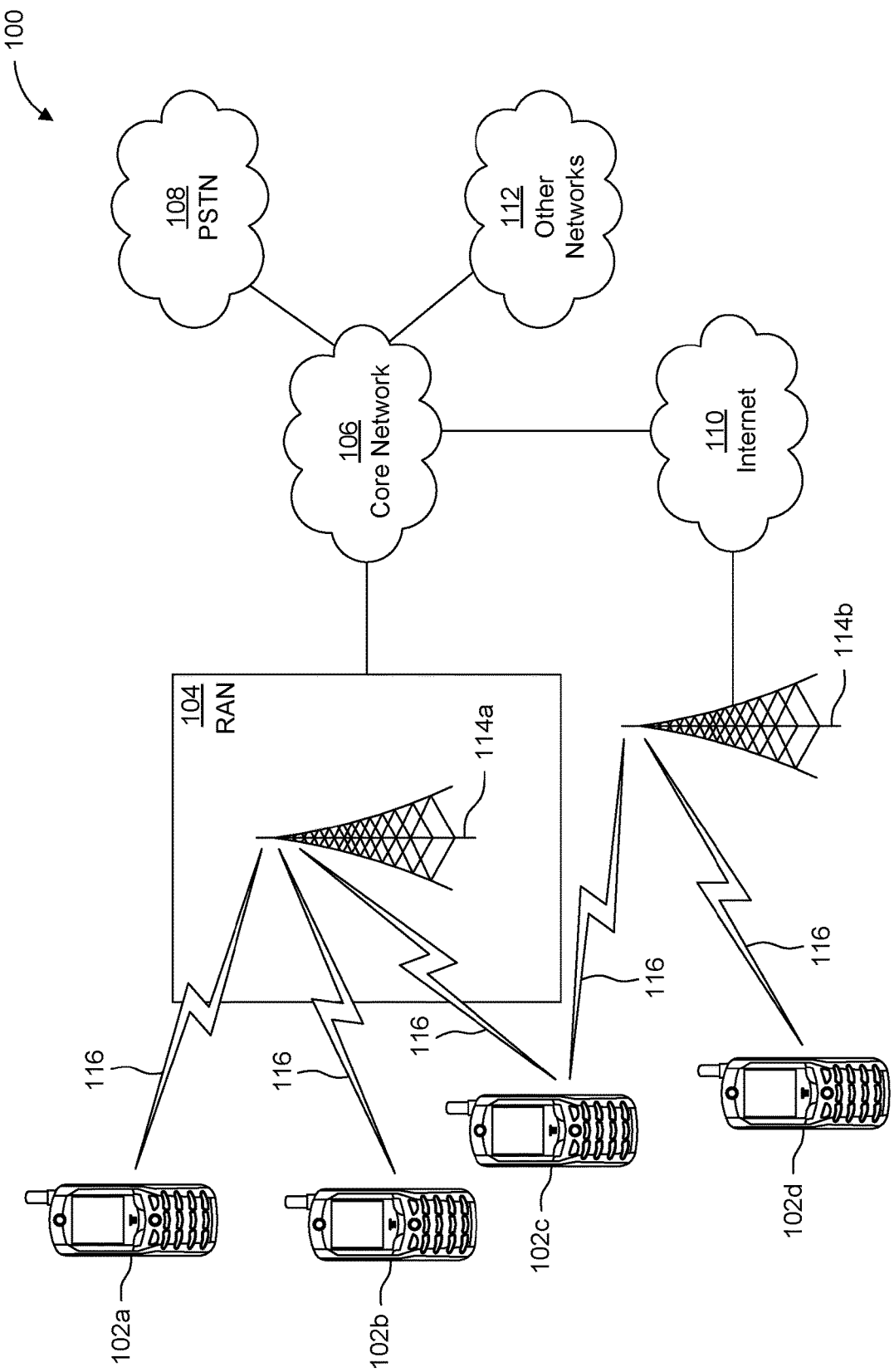
FIG. 1A is a system diagram illustrating an example communications system.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
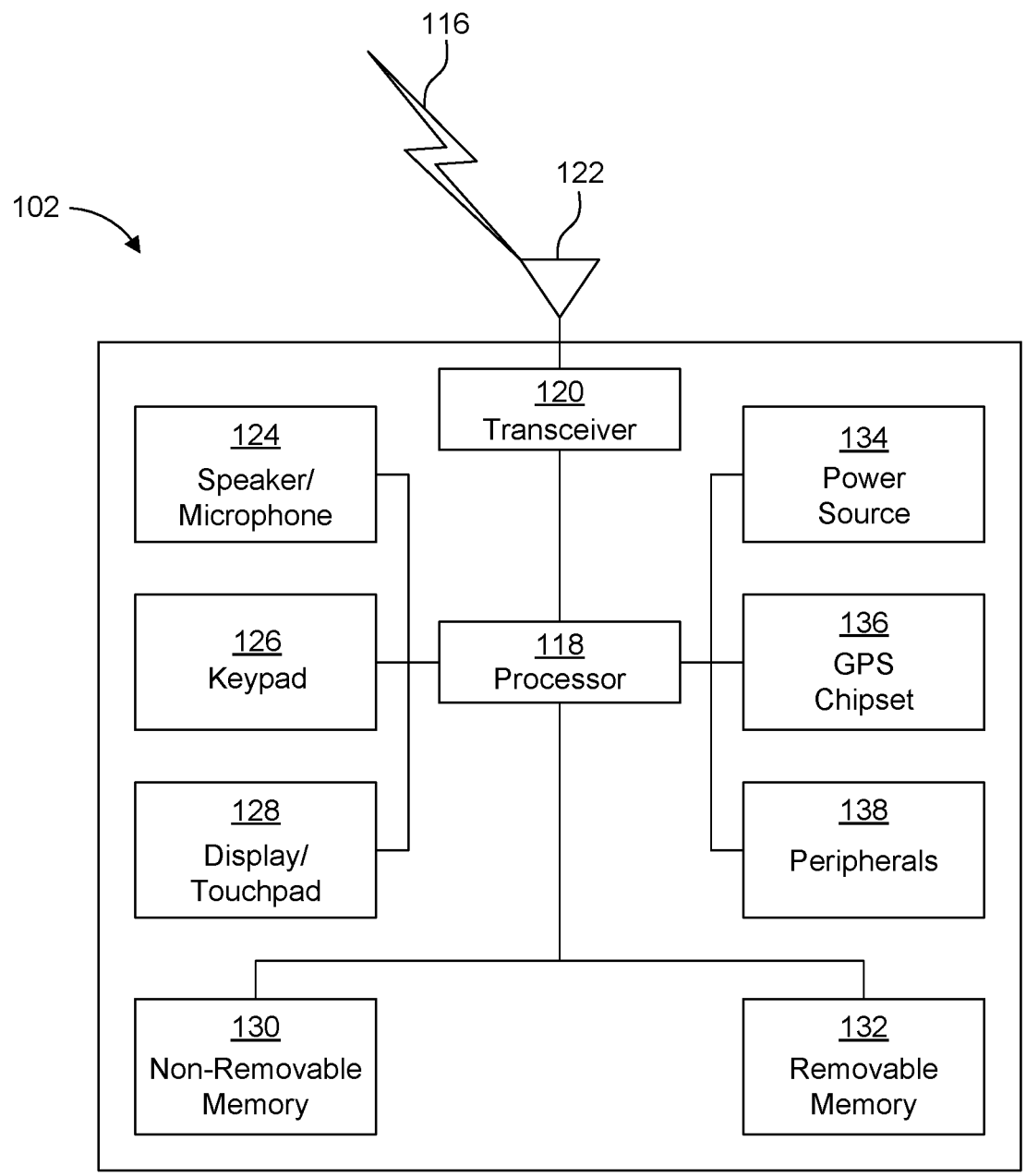
FIG. 1B is a system diagram illustrating an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules/units that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
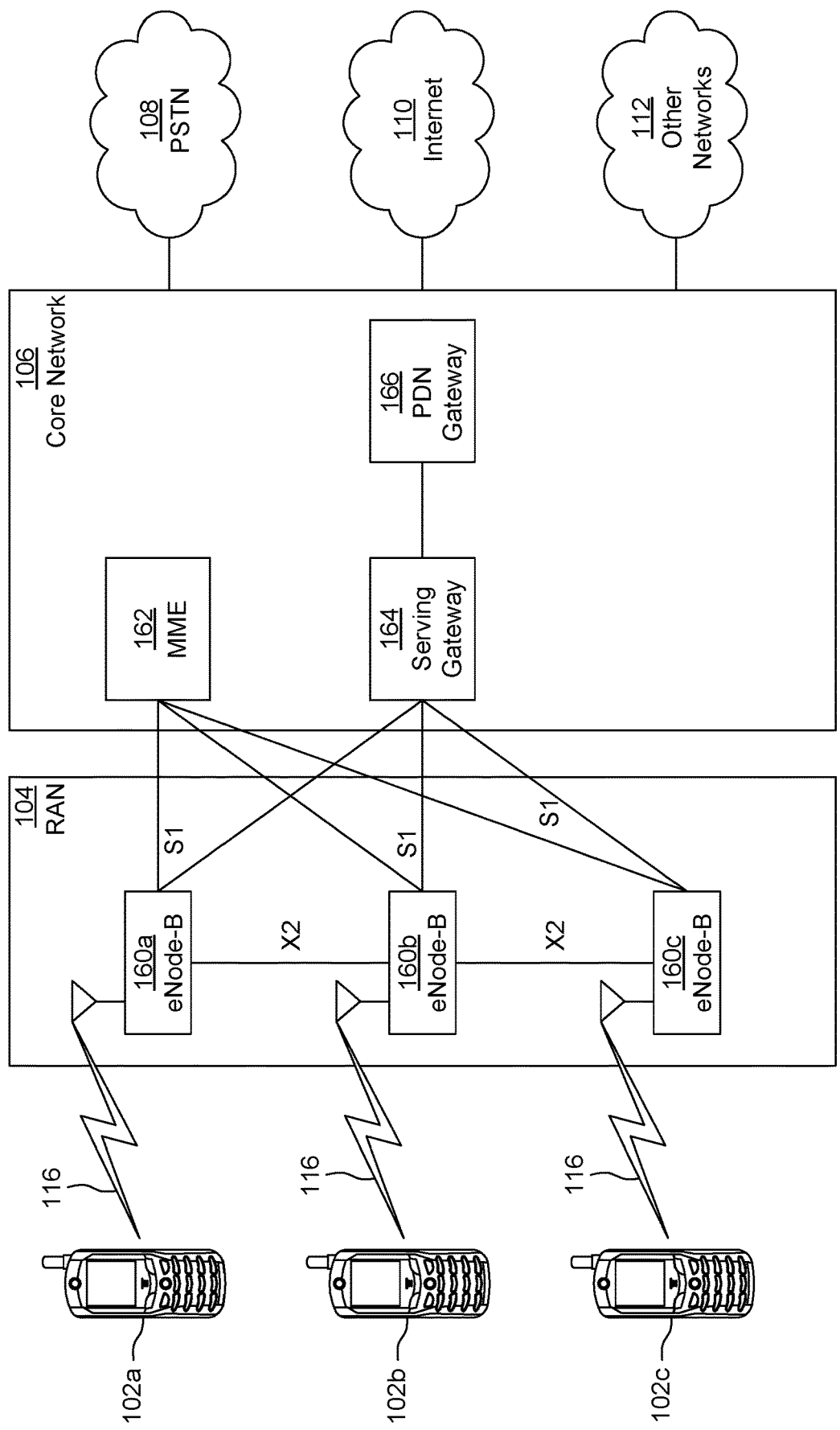
FIG. 1C is a system diagram illustrating an example radio access network (RAN) and an example core network (CN) that may be used within the communications system illustrated in FIG. 1A.

FIG. 1C is a system diagram of the RAN 104 and the CN 106 according to another embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode-B handovers, triggering paging and/or mobile termination when DL data is available for the WTRUs 102a, 102b, 102c, managing and storing contexts of the WTRUs 102a, 102b, 102c, and the like.

The SGW 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to a Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHz, 4 MHZ, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
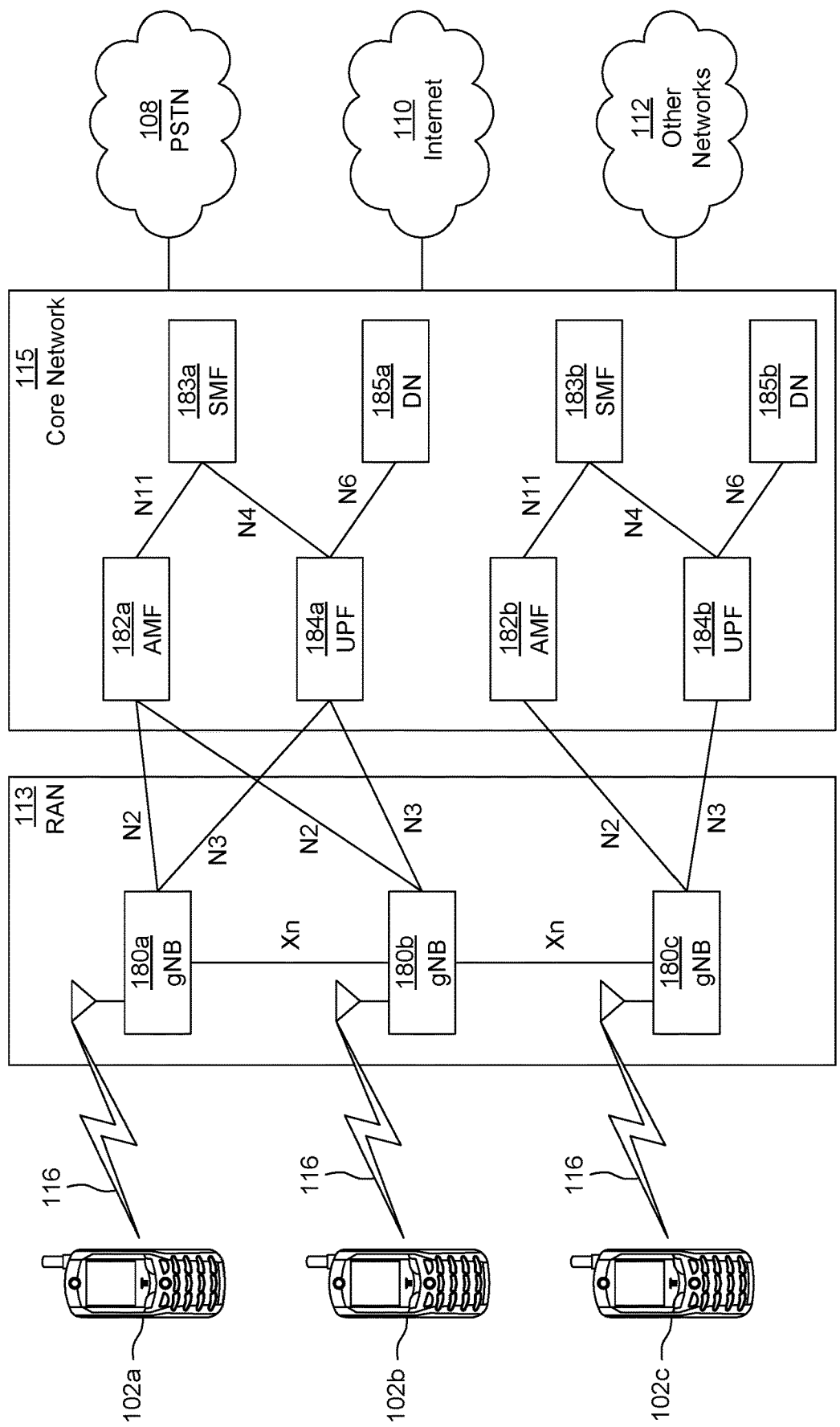
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different packet data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

Blockchain Technology

Blockchain technology jointly uses and builds on top of various existing techniques, such as cryptography, hashing, Merkle tree, distributed ledgers, peer-to-peer (P2P) networking and consensus protocols. Blockchain technology innovatively combines such existing technologies to enable a system that can provide advanced features such as decentralization, immutability, transparency, and security.

A blockchain system is one in which blockchain technology is used. Applications supported by a blockchain system are referred to as blockchain applications. A blockchain system is underpinned by one or more underlying blockchain networks. Each blockchain network may include a plurality (e.g., many) participating blockchain nodes (BCN). Each BCN may host one or more distributed blockchains (a form of distributed ledgers), broadcast blocks using P2P networking, and perform consensus protocols with the other BCNs of the blockchain network to reach distributed trust and data consensus without relying on a centralized party.

A blockchain transaction may be any of a digital representation of a real-world transaction, a digital record of physical assets, a digital record of a physical event, a digital record of any action in an information system, a digital payment and a digital smart contract. A block groups multiple blockchain transactions together. A blockchain is a data structure to chain a growing number of blocks.

For simplicity of exposition, the terms "blockchain technology" are used herein. It should be understood that such terms also represent much broader distributed ledger technology. As such, the various embodiments are applicable to any specific blockchain technology and/or distributed ledger technology.

Figure 2:
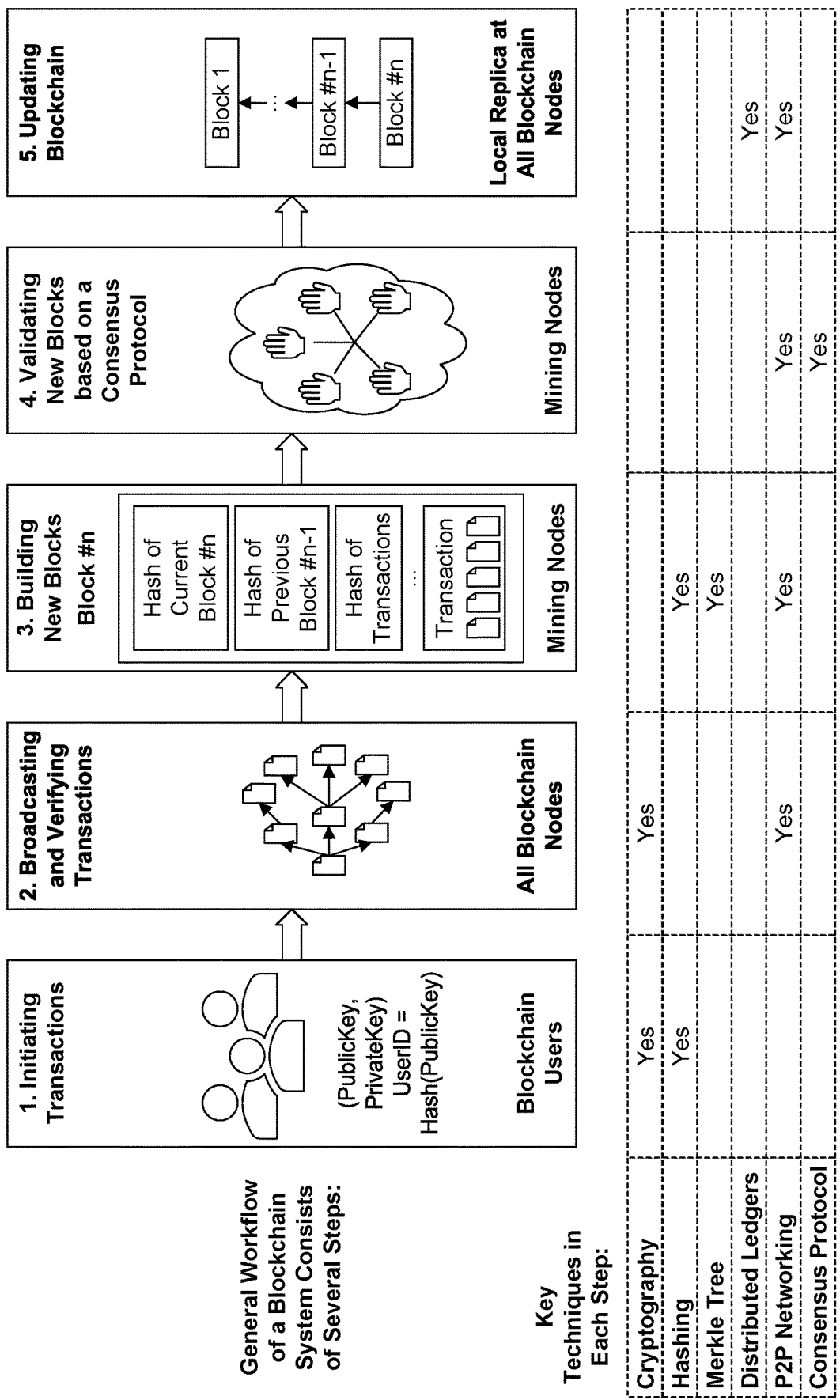
FIG. 2 illustrates an example workflow of a blockchain system.

FIG. 2 illustrates an example workflow of a blockchain system. The workflow may include initiating transactions (1), broadcasting and verifying transactions (2), building new blocks (3), validating new blocks based on a consensus protocol (4) and updating a blockchain (5).

Initiating transactions: Each participating user may generate new transactions independently. Each user may have a user identifier and/or account identifier. The user identifier and/or account identifier may be a hash of a public key of a user ("user's public key"). Each new transaction is signed using the user's private key. After a new transaction is generated, the user may send it to the blockchain network.

Broadcasting and verifying transactions: A new transaction may be received by some BCNs. The transaction may include the user's public key. The BCNs may verify its integrity using the user's public key After verification and if the new transaction is valid, it may be relayed and/or broadcasted within the blockchain network. Eventually, all blockchain nodes receive and possess a copy of any newly generated and valid transactions.

Building new blocks: Some BCN (referred to as mining nodes) start to group many newly generated and pending transactions together to generate a new block. The new block may include a block header and a block body. The block header may include a hash of the current block, a hash of the previously confirmed block, and a hash of all included transactions (e.g., Merkle tree). Dependent on the consensus protocol used, the block header may include other and/or additional information. The block body may include the content of all included transactions. Each mining node may independently attempt to create a new block.

Validating new blocks based on a consensus protocol. Under the Building New Blocks task, mining nodes may independently attempt to create a new block. They may run the same consensus protocol (e.g., Proof-of-Work in Bitcoin system) and may reach an agreement on who (i.e., a winner) may be allowed to insert a block into the existing blockchain. The winner of the consensus protocol may send its newly generated block to the blockchain network. This new block may be broadcasted; allowing all mining nodes to receive and/or verify it.

Updating the blockchain. After the newly generated block is verified, it may be successfully appended to the existing blockchain, since it includes a hash of the previous blockchain.

Figure 3:
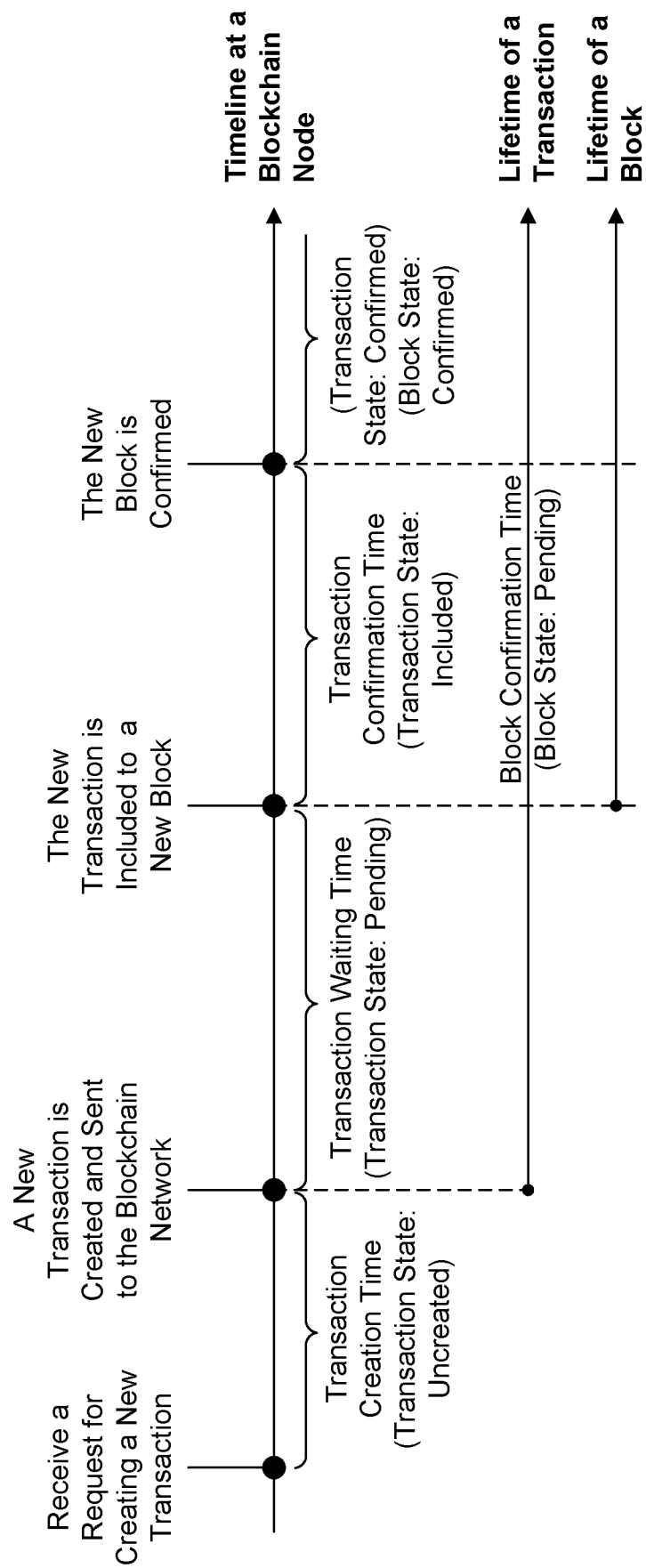
FIG. 3 illustrates example timeline at a blockchain node in connection with a processing a new transaction.

FIG. 3 illustrates example timeline at a BCN in connection with a processing a new transaction. Shown in connection with the timeline are transaction states and block states during periods between various stages of processing the new transaction. The periods may include a transaction creation time, a transaction waiting time, and a transaction confirmation time (or blockchain confirmation time).

The transaction creation time may refer to the period between a time at which a request for creating a new transaction is received and a time at which the new transaction is created. During the transaction creation time, the transaction state may be "uncreated".

The transaction waiting time may refer to the period between the time at which a new transaction is created and a time at which the new transaction is included in a new block. The duration of the transaction waiting time may depend on the underlying P2P networking and consensus mechanism. During the transaction waiting, both the transaction and block states may be "pending".

The transaction confirmation time (or blockchain confirmation time) may denote a period between the time at which a new transaction is included in a new block and a time at which the new block is confirmed. The duration of the transaction confirmation time (or blockchain confirmation time) may depend on the underlying P2P networking and consensus mechanism. During the transaction confirmation time (or blockchain confirmation time), the transaction state may be "included", and the block state may be "pending". Following confirmation of the block, its state may be "confirmed".

The speed of a transaction may be estimated as a sum of the transaction waiting time and transaction confirmation time.

Figure 4:
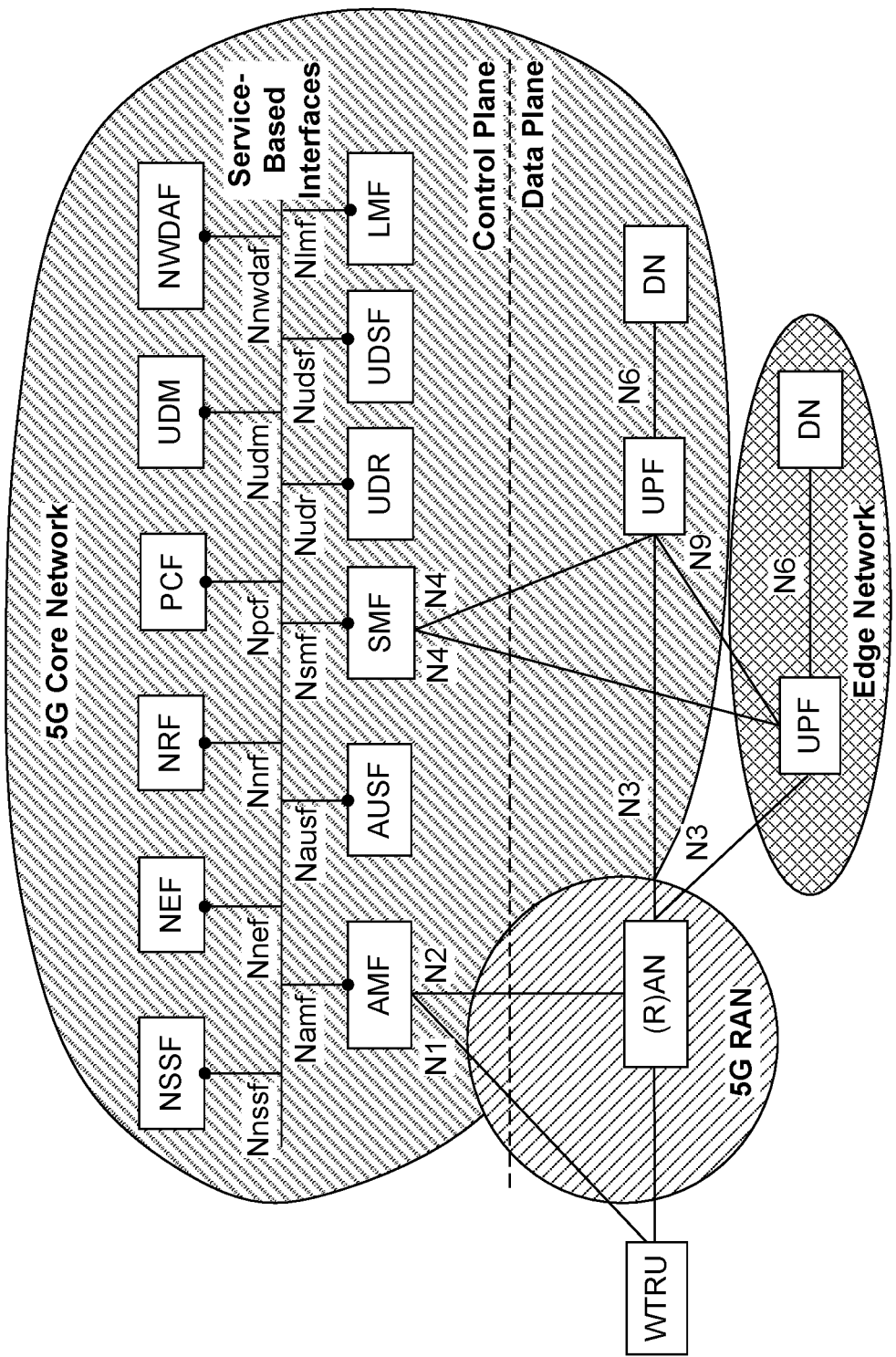
FIG. 4 is a block diagram illustrating a communications system configured as a 5G system (5GS)

FIG. 4 is a block diagram illustrating the communications system 100 (FIG. 1) configured as a (e.g., 3GPP defined) 5G system (5GS). The communications system 100 may include a RAN 113 and CN 115. One of design principles for 5GS architecture is service-centric or service-based.

The CN 115 may include various network functions. The network functions may work together to fulfill and/or provide services to the RAN 113, a WTRU 102 and/or an application server/service provider. The network functions may include a network repository function (NRF), an access and mobility management function (AMF), a session management function (SMF), an authentication server function (AUSF), a policy control function (PCF), a user plane function (UPF), a network exposure function (NEF), a unified data management (UDM), a unified data repository (UDR), an unstructured data storage function (UDSF), a network data analytics function (NWDAF) and a network slice selection function (NSSF).

A network function may access another network function. The network functions may access and/or interact with one another in any of a request/response mode and a subscription/notification mode. A network function may register with the NRF. Registering with the NRF may make the network function discoverable to the other network functions.

The AMF may manage access to, and mobility of, WTRUs 102 in the communications system 100. The SMF may be responsible for establishing sessions between a WTRU 102 and the CN 115. The AUSF may be in charge of authentication of users (e.g., WTRUs). The PCF may create and/or provide one or more policy rules for and/or to other control plane network functions and WTRUs 102. The PCF may assign identifiers for the created policy rules, and other control plane network functions and WTRUs 102 may use the identifiers to refer to (e.g., look up or otherwise obtain) the corresponding policy rules.

The UPF may be a function for the user plane. The UPF may monitor, manage, control and redirect user plane traffic flows, such as between a WTRU and an application server. The NEF may expose control plane functions to entities (e.g., network applications) that are outside of the 5GS and/or not in the same trusted domain.

The CN may provide data storage and analytics services through functions, such as any of the UDM, the UDR, the UDSF and the NWDAF. The communications system may support network slicing. Network slicing may be facilitated by the NSSF.

Although the network functions may be defined as separate logical entities, some or all of the network functions may be combined. One or more than one of the network functions may be invoked and/or used in connection with a particular procedure or operation. By way of example, the AMF, AUSF and SMF may be involved in WTRU mobility. One or more than one instance of a network function may be instantiated. The NRF may maintain the information of each network function instance. Although shown within a single cloud, one or more of network functions may be deployed in an edge network, such as one that supports edge computing and/or that is in close proximity to and/or co-located with the RAN 113. It may be advantageous to deploy the UPF and/or the NEF in an edge network that supports edge computing, which can save certain communication costs since the policy control may be applied to the event/data directly at the edge (i.e., where data/events are generated).

FIG. 5 illustrates various procedures in a 5GS. The various procedures are described with reference to the communications system 100 of FIG. 4 for convenience. The various procedures may be carried out using other architectures, as well. For convenience and simplicity of exposition, the reference numerals in the disclosures accompanying 5 are shown with the prefix "5:".

As denoted at (5:1), a WTRU may discover and/or may select a network (e.g., a PLMN, a RAN, a cell, etc.) based on received system information block (SIB) broadcast by one or more RAN nodes. As denoted at (5:2), the WTRU may establish a radio resource control (RRC) connection with a selected RAN (e.g., RAN1). The WTRU may communicate with the 5GS CN via the selected RAN. As denoted at (5:3), the WTRU may initiate registration towards an AMF. The selected RAN may determine/select, from one or more AMFs, a serving AMF for the WTRU. As denoted at (5:3), the serving AMF may check with the AUSF for primary access authentication and authorization, request subscription data from the UDM, check with the PCF for access and mobility policies, and/or contact the SMF to activate any existing PDU session (e.g., if indicated by the WTRU).

A registration area (RA) may be defined within the 5GS. The RA may be formed from one or more tracking areas (TAs); each of which may cover one or more cells. An advantage of the RA is that it reduces signaling overhead by not requiring registration updates with the serving AMF while within the RA unless a periodic registration timer expires. If the WTRU moves from one RA (e.g., RA1) to another RA (e.g., RA2), then the WTRU may perform a new registration, such as, for example, with a registration type set to mobility registration update (as described herein and denoted at (5:7)). A larger RA may reduce registration overhead, but it may increase paging signaling overhead due to the serving AMF having to page the WTRU in a larger number of TAs (or cells).

After successful registration, the WTRU may enter RM-REGISTERED state and/or may access and/or interact with other control plane NFs via the serving AMF. In various embodiments, the serving AMF might be the only entry point for the WTRU to access and interact with the CN control plane. The procedures denoted at (5:3), (5:5) and (5:7), for example, may be related to connection management.

As denoted at (5:4), the WTRU may establish a PDU session for a DN with an SMF. The serving AMF may determine/select the serving SMF for the PDU session. As denoted at (5:4), the SMF may check with the PCF for PDU session policies and/or may select a UPF as an anchor for the PDU session ("PDU session anchor"). The WTRU may access the DN and/or exchange packets with the DN via the PDU session anchor (PSA). The PCF may retrieve subscription data of the WTRU from a UDR in connection with the SMF checking with the PCF for session policies and may provide it to the SMF. The SMF may perform primary session authentication using the WTRU's subscription data as retrieved from the UDM, and may perform secondary authentication between the WTRU and a DN-AAA server, e.g., using an extensible authentication protocol (EAP), such as defined in RFC3748 and RFC5247. The procedure denoted at (5:4) and the procedure denoted at (5:5) may be jointly performed.

As denoted at (5:5), the WTRU may be in a CM-IDLE state (e.g., after connection with the serving AMF is released), and may initiate a service request procedure to reestablish a connection with the serving AMF and enter a CM-CONNECTED state. The WTRU may be in mobile initiated connections only (MICO) mode when it initiates the service request procedure to reestablish the connection with the serving AMF. If the WTRU is not in MICO mode, then the serving AMF may page and/or trigger the WTRU to initiate service request procedure, for example, to receive any downlink packets. A non-access-stratum (NAS) connection may be established between the WTRU and the serving AMF in connection with the service request.

The service request may be carried out together with WTRU registration, in which case, the WTRU may enter CM-CONNECTED state. The WTRU may move within the RA without notifying the serving AMF while in CM-CONNECTED state. If WTRU remains within the RA but moves out of a RAN notification area (RNA), then the WTRU may perform a RAN update to trigger the RAN to update the WTRU context and the corresponding RRC connection maintained by the RAN. The RNA may be smaller than the RA. For example, the RNA may include a subset of TAs forming the RA (e.g., TA1, TA2, and TA3, as shown).

As denoted at (5:6), the WTRU may carry out data transmission (data plane) with the DN via RAN 113 and the UPF as the PSA. The DN may have a data network name (DNN). Although not shown, the 5GS may include and/or be communicatively coupled with more than one DN, and the DN may have respective DNNs.

As denoted at (5:7), the WTRU may detect when it moves from RA1 to RA2. For example, the WTRU may detect such event by checking a list of TAs for each RA configured by the serving AMF. As denoted at (5:7), the WTRU may perform a mobile registration update with a new serving AMF. As denoted at (5:7), a (e.g., Xn-based or N2-based) inter-RAN handover from the current RAN to a new RAN with a serving AMF change may be performed. A new serving AMF may contact the old serving AMF for transferring WTRU's context information. As denoted at (5:7), the SMF may contact the PCF and/or the UPF to update existing PDU sessions with the WTRU.

As shown in FIG. 5, multiple TAs may be grouped together as a local area data network (LADN) service area to support LADN service. As an example, TA4, TA5, and TA6 may form a LADN service area. The WTRU may be allowed to access LADN1 if (e.g., if and only if) the WTRU remains within TA4, TA5, or TA6.

A set of TAs may be grouped as a service area. The 5GS may specify and/or enforce service area restrictions for a WTRU. For example, the 5GS may configure a WTRU for service area restriction for a service area formed from TA7, TA8, and TA9, where the WTRU may be allowed to access 5GS if (e.g., if and only if) the WTRU remains within TA7, TA8, or TA9.

The various procedures disclosed herein and denoted in FIG. 5 need not be carried out in the order shown or described, and not all of the procedures need to be performed. For example, the procedures denoted at (5:7) may be performed before the procedures denoted at (5:6), and the procedure denoted at (5:5) need not be performed.

Representative Policy Control Function (PCF)

Figure 6:
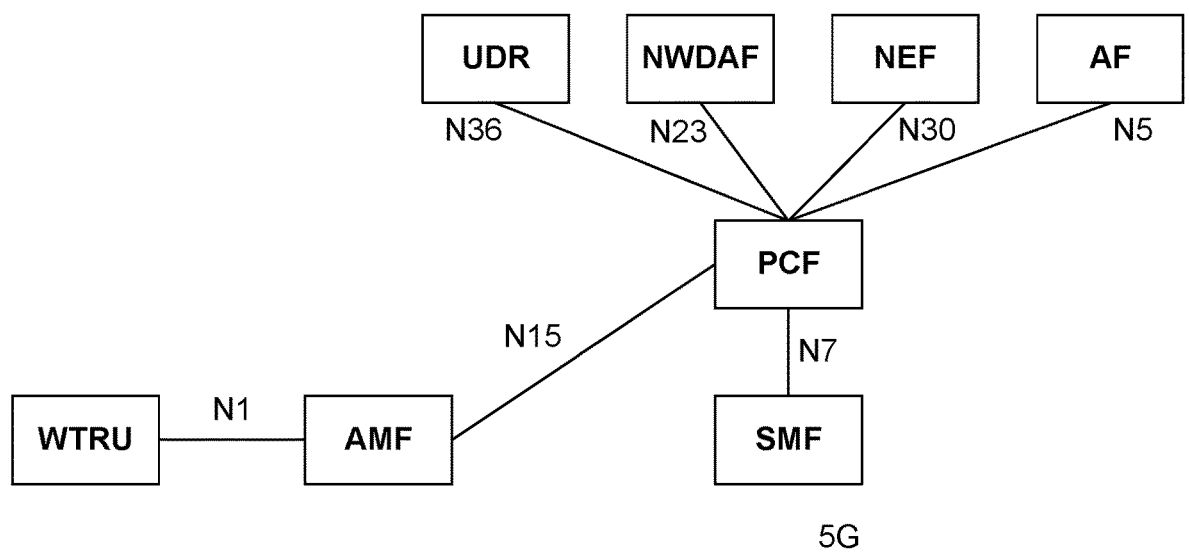
FIG. 6 illustrates an example policy control reference architecture for non-session management related policy control.
Figure 7:
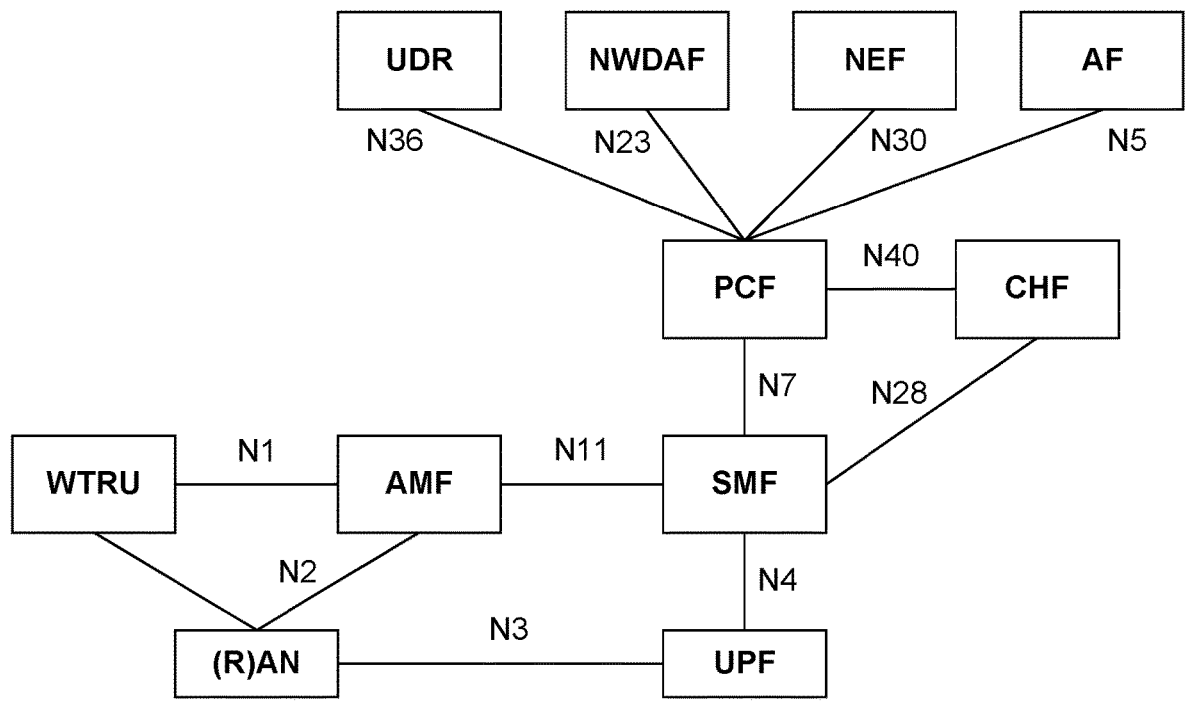
FIG. 7 illustrates an example policy control reference architecture for session management related policy control.

Policy control in a 5GS may include non-session management related policy control and session management related policy control. FIG. 6 illustrates an example policy control reference architecture for non-session management related policy control. FIG. 7 illustrates an example policy control reference architecture for session management related policy control. A Charging Function (CHF) is introduced in FIG. 7.

Examples of non-session management related policy control include access and mobility related policy control, WTRU access selection and PDU session selection related policy (WTRU policy) control, management of Packet Flow Descriptions (PFD), and network status analytics information requirement. Examples of session management related policy control include QoS control for PDU sessions and Service Data Flows (SDFs), charging control for PDU sessions and SDFs, reporting PDU session events to an AF, usage monitoring control, application detection policy control, service capability exposure policy control, and traffic steering policy control.

The PCF may provide various functionalities for both non-session management related policy control and session management policy control. The PCF may provision different policies to control plane functions (e.g., AMF, SMF, NEF), WTRUs, and AFs, at which the provisioned policies may be enforced. The PCF may retrieve subscription data from a UDR to create new policies. An operator can configure policies at the PCF. The policies may be stored at a UDR. The policies may be dynamically, semi-statically and/or statically configured at various entities, devices, etc., such as to any of an AMF, an SMF and a WTRU.

For example, access and mobility related policy control may provide any of management of service area restrictions, management of RAT/frequency selection priority (RFSP) functionalities, and management of SMF selection. A serving AMF and a PCF may perform "AM Policy Association Establishment" for a WTRU (e.g., when the WTRU performs an initial registration and selects (e.g., only selects) the serving AMF). The serving AMF and PCF may exchange access and mobility related policies, e.g., following the AM Policy Association Establishment.

Based on operator-defined policies, a PCF can modify service area restrictions for a WTRU as a part of subscription data. Operator-defined policies in the PCF may depend on input data such as WTRU location, time of day, the information provided by other NFs, etc. When a WTRU registers with a serving AMF, the serving AMF may retrieve its service area restrictions from a UDM as a part of its subscription data. The serving AMF may report the service area restrictions to a PCF. The PCF may modify the service area restrictions and/or may send the modified service area restrictions to the serving AMF. The AMF may store the modified service area restrictions and/or may enforce the modified service area restrictions to determine the mobility restrictions for the WTRU.

A RFSP index may be used by a serving AMF to manage radio resources for a WTRU. A PCF may modify the RFSP index, e.g., based on operator-defined policies. For example, operator-defined policies in the PCF may depend on input data such as accumulated usage, load level information per network slice instance etc. When a WTRU registers with the serving AMF, the serving AMF may retrieve the RFSP index from a UDM, e.g., as a part of subscription data. The serving AMF may report the RFSP index to the PCF. The PCF may modify the RFSP index and/or may send it to the serving AMF. The AMF may send the modified RFSP index to a (R)AN node. The RAN node may enforce the modified RFSP index.

A PCF may configure a WTRU with various policies via a serving AMF. The policies may include an access network discovery and selection policy (ANDSP) for non-3GPP access, and a WTRU Route Selection Policy (URSP) related to applications and PDU sessions. The WTRU may use URSP rules to determine whether to use an already established PDU session and/or trigger an establishment of a new PDU session for an application, e.g., according to a traffic descriptor specifying matching criteria included in a (e.g., each) URSP rule. If the WTRU is in CM-IDLE state, the serving AMF may send a paging message to the WTRU to trigger the WTRU to perform a WTRU-initiated service request procedure so that the serving AMF may deliver ANDSPs and URSPs (received from the PCF) to the WTRU.

Application detection as a type of session management related policy control may be provided through interactions among a PCF, a SMF, and a UPF. The PCF may install (or activate) one or more policy and charging control (PCC) rules including enforcement actions to the SMF. The SMF may instruct the UPF to detect events in specific application traffic. The UPF may apply configured enforcement actions on specific application traffic, such as gating control (e.g., blocking application traffic), QoS control (e.g., bandwidth limitation), and traffic redirection.

The UPF may detect an event and may report the detected event to the PCF via the SMF. The PCF may modify the PCC rules and/or install modified PCC rules to the SMF based on one or more reported events.

In various embodiments, methods for, and/or for use in connection with, enablers for distributed ledger (e.g., blockchain) enabled wireless system may be implemented in a WTRU. Among such methods is a first method that may be implemented a device comprising circuitry, including a transmitter, a receiver and a processor, and that may include (e.g., any of) receiving, from a network application, a registration request including information indicating a plurality of application-level requirements for a distributed ledger service, including one or more performance requirements and one or more actions; determining a node of a distributed ledger system to associate to the network application based at least in part on the performance requirement; providing, to each of a one or more computing resources, executable code for conducting one or more of the one or more actions; and sending a confirmation of registration to the network application.

Among the methods is a second method that may be implemented a device comprising circuitry, including a transmitter, a receiver and a processor, and that may include (e.g., any of) receiving, from a network application, a registration request including information indicating a plurality of application-level requirements for a distributed ledger service, including one or more distributed ledger system features, one or more performance requirements, and one or more actions; determining a node of a distributed ledger system to associate to the network application based at least in part on the performance requirement and the one or more distributed ledger system features; providing, to each of a plurality of computing resources, executable code for conducting one or more of the one or more of actions; and sending a confirmation of registration to the network application.

3. The method of at least one of the claims 1-2, further comprising:
generating one or more distributed ledger related configurations for the one or more actions, wherein providing executable code for conducting one or more of the one or more of actions comprises providing the executable code and the distributed ledger related configurations.

In various embodiments, the plurality of application-level requirements may include information indicating one or more distributed ledger related policies.

In various embodiments, at least one of the methods may include providing a distributed ledger related policy to a policy function of a communication network. In various embodiments, at least one of the methods may include deploying a distributed ledger related policy at the device.

Among the apparatuses, is an first apparatus that may be configured to receive, from a network application, a registration request including information indicating a plurality of application-level requirements for a distributed ledger service, including one or more performance requirements, and one or more actions; determine a node of a distributed ledger system to associate to the network application based at least in part on the performance requirement; provide, to each of a one or more computing resources, executable code for conducting one or more of the one or more actions; and send a confirmation of registration to the network application.

Among the apparatuses, is an second apparatus that may be configured to receive, from a network application, a registration request including information indicating a plurality of application-level requirements for a distributed ledger service, including one or more distributed ledger system features, one or more performance requirements, and one or more actions; determine a node of a distributed ledger system to associate to the network application based at least in part on the performance requirement and the one or more distributed ledger system features; provide, to each of a plurality of computing resources, executable code for conducting one or more of the one or more of actions; and send a confirmation of registration to the network application.

In various embodiments, the circuitry may be configured to generate one or more distributed ledger related configurations for the one or more actions; and provide, to each of a one or more computing resources, the executable code for conducting one or more of the one or more actions and the one or more distributed ledger related configurations.

In various embodiments, the plurality of application-level requirements may include information indicating one or more distributed ledger related policies.

In various embodiments, the circuitry may be configured to provide a distributed ledger related policy to a policy function of a communication network. In various embodiments, the circuitry may be configured to deploy a distributed ledger related policy at the device.

In various embodiments, the distributed ledger related configurations may include any of a transaction format and the determined node of the distributed ledger system.

In various embodiments, the policy function may be a policy control function of the communication network.

In various embodiments, the plurality of application-level requirements may include any of an identifier of the distributed ledger system; a type of the distributed ledger system; a consensus mechanism/protocol; an application programming interface (API) specification of the distributed ledger system; a number of peer nodes of the distributed ledger system; a current size of a ledger of the distributed ledger system; peer node geographical distribution of the distributed ledger system; a capability of the distributed ledger for supporting a new ledger; one or more supported performance metrics of the distributed ledger system; access details of the node of the distributed ledger system; a node type of the node of the distributed ledger system; a mobility type of the node of the distributed ledger system; and an organization affiliated with the node of the distributed ledger system.

In various embodiments, the device and/or may at least one service-based function, and the at least one service-based function may carry out at least determining a node of a distributed ledger.

In various embodiments, the confirmation of registration to the network application may be sent via an air interface. In various embodiments, the registration request may be received via an air interface.

In various embodiments, the device and/or circuitry is configured as and/or configured with elements of a wireless transmit/receive unit (WTRU). In various embodiments, the device and/or circuitry is configured is, is configured as and/or configured with elements of a sidelink relay or with elements of a base station.

Among the methods is a third method that may be implemented in a blockchain function (BCF) and that may include any of registering a blockchain node (BCN) for a blockchain capability of the BCN; monitoring and managing the blockchain capability of the BCN; and providing blockchain as a service to a vertical application using the BCN.

In various embodiments, another BCN may be registered with the BCF for a blockchain capability of the other BCN, and the blockchain capability of the other BCN may be different from the blockchain capability of the BCN.

In various embodiments, the method may include determining to use the BCN based on the vertical application and the blockchain capability of the BCN.

In various embodiments, the method may include determining to use the BCN based on the vertical application, the blockchain capability of the BCN and the blockchain capability of the other BCN.

In various embodiments, the method may include configuring the blockchain as a service based on the blockchain capability of the BCN.

In various embodiments, providing the blockchain as a service may include encapsulating the blockchain capability of the BCN. In various embodiments, the method may include registering the vertical application.

In various embodiments, the method may include registering the vertical application may include registering any of a blockchain client application (BCA) and a blockchain network application (BNA).

In various embodiments, registering a BCN may include any of receiving a registration request from the BCN, wherein the registration request indicates the blockchain capability of the BCN; generating a BCN registration record for the BCN; adding the BCN registration record to a (e.g., local) repository; and sending, to the BCN, a response indicating a registration status.

In various embodiments, the registration request may be a discovery message. In various embodiments, the response may be a discovery message.

In various embodiments, the method may include examining information sent from the BCN. In various embodiments, the method may include validating the BCN as a valid BCN for further operation. In various embodiments, the method may include deciding how the BCN will be managed by 1) either making a subscription to the first BCN regarding a metric and/or status should be reported, 2) or periodically querying the real-time performance status of first BCN.

In various embodiments, the BCN may be node of a blockchain system.

In various embodiments, the registration request may indicate and/or includes the blockchain capability of the BCN.

In various embodiments, the registration request indicates and/or includes any of: (i) a blockchain system identifier/identity; a blockchain system type; a consensus mechanism/protocol; an application programming interface (API) specification of the blockchain system; a number of peer nodes of the blockchain system; a current size of a ledger of the blockchain system; peer node geographical distribution of the blockchain system; a capability of the blockchain system for supporting a new chain; one or more supported performance metrics of the blockchain system; access details of the BCN; a node type of the BCN; a mobility type of the BCN; and an organization affiliated with the BCN.

In various embodiments, the method may include referring to the BCN registration record in connection with determining to use the BCN.

In various embodiments, the vertical application lacks a capability to directly interact with the BCN.

In various embodiments, the method may include receiving, from the vertical application, a request to use a blockchain service.

In various embodiments, providing the blockchain as a service may include sending, to the vertical application, a response to the request.

In various embodiments, the BCF may be deployed in any of a radio access network (RAN) node, a core network (CN) node, a server, a local gateway and a WTRU.

Among the methods is a fourth method that may be implemented in a first blockchain function (BCF) and may include any of: receiving, from a vertical application, a first request to discover a BCF that can provide blockchain services; examining, by the first BCF, information received from the vertical application; validating, by the first BCF, that the vertical application is allowed to use blockchain related operations; determining, by the first BCF, a first blockchain node (BCN) assigned to the vertical application for providing the blockchain service; sending, to a second BCF capable of providing the blockchain service, a second request to provide the blockchain service; and receiving, from the second BCF, a response indicating that the second BCF agrees to provide the blockchain service to the first vertical application.

Among the methods is a fifth method that may be implemented in a first blockchain function (BCF) and may include any of: receiving, from a vertical application, a first request to use a blockchain service; determining that a BCF other than the first BCF is capable of providing the blockchain service; sending, to a second BCF, a second request to provide the blockchain service to the vertical application; receiving, from the alternative BCF, a response indicating that the second BCF agrees to provide the blockchain service to the vertical application; sending, to the vertical application, a notification indicating that the second BCF is an alternative to the first BCF for providing the blockchain service.

In various embodiments, the method may include examining information received from the vertical application. In various embodiments, the method may include validating whether the vertical application has permission to request the blockchain service. In various embodiments, the first request may be a discovery message.

In various embodiments, the first request may indicate and/or include any of an identification/identity of the vertical application, an identification/identity of the vertical application client, an identification/identity of the vertical application server, a blockchain-related operation {to be conducted}, and a current location of a device hosting the vertical application.

In various embodiments, the first BCN may be deployed in a core network.

In various embodiments, the second BCF may resides at an edge of a network and/or is located closer (e.g., physically closer) to a device hosting the vertical application.

In various embodiments, the method may include identifying and/or selecting the second BCF based on its capability of providing the blockchain service.

In various embodiments, the method may include sending, to the vertical application, a response to the first request.

In various embodiments, the response to the first request indicates any of: the second BCF will provide the blockchain service; and the blockchain service will be provided by the second BCN. In various embodiments, the vertical application may include a vertical application client.

Among the methods is a sixth method that may include any of receiving, from a vertical application at a first blockchain function (BCF), a first request to discover a BCF that can provide the blockchain services; examining, by the first BCF, information received from the vertical application; validating, by the first BCF, that the vertical application is allowed to use blockchain related operations; determining, by the first BCF, a first blockchain node (BCN) assigned to the vertical application for providing the blockchain service; sending, from the first BCF to a second BCF capable of providing the blockchain service, a second request to provide the blockchain service; and receiving, from the second BCF at the first BCF, a response indicating that the second BCF agrees to provide the blockchain service to the first vertical application client.

In various embodiments, the first request may be a discovery message.

In various embodiments, the first request may indicate and/or include any of an identification/identity of the vertical application, an identification/identity of the vertical application client, a blockchain-related operation to be conducted, and a current location of a device hosting the vertical application.

In various embodiments, the first BCN may be deployed in a core network.

In various embodiments, the second BCF may reside at an edge of a network and/or is located closer (e.g., physically closer) to a device hosting the vertical application.

In various embodiments, the method may include identifying and/or selecting the second BCF based on its capability of providing the blockchain service.

In various embodiments, the method may include sending, to the vertical application, a response to the first request.

In various embodiments, the method may include the response to the first request may indicates any of: the second BCF will provide the blockchain service; and the blockchain service will be provided by the second BCN.

In various embodiments, the method may include determining, by the second BCF, whether to provide the blockchain service to the first vertical application.

In various embodiments, the method may include determining, by the second BCF, the second BCN from among one or more BCNs managed by the second BCF.

In various embodiments, the first and second BCNs are the same type of the BCN.

In various embodiments, the first and second BCNs may have a same blockchain capability.

In various embodiments, the BCF may be deployed in any of a radio access network (RAN) node, a core network (CN) node, a server, a local gateway and a WTRU.

Among the apparatuses, is an apparatus, which may include any of a receiver, transmitter, a processor and memory, configured to perform a method as in at least one of the preceding methods.

Representative Use Case 1—Internet of Vehicles

Figure 8:
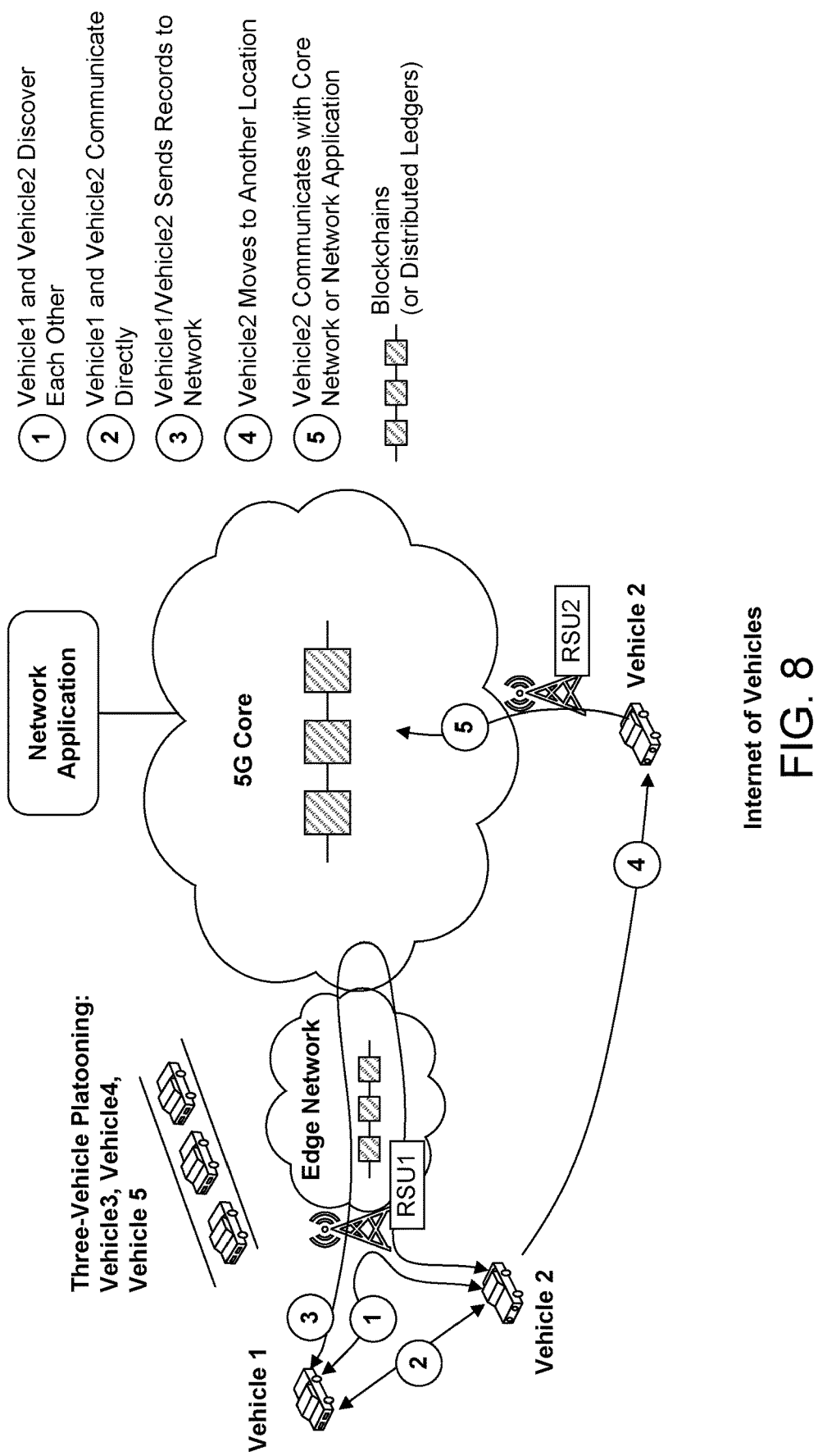
FIG. 8 illustrates an example use case for an internet of vehicles.

FIG. 8 illustrates an example use case for an internet of vehicles. Each vehicle may have a connection to the internet via at least a wireless connection (e.g., 5G) with a roadside unit (RSU) (or a base station). The RSU may include or have access to a local edge network with computing and storage resources.

A vehicle may move from one RSU to another RSU. A vehicle can communicate with another vehicle, an RSU, an edge network, a core network, and/or a network application. For example, Vehicle1 may discover Vehicle2 and may find that both are under the same RSU1. Vehicle1 and Vehicle2 may engage in direct communications (e.g., Vehicle-to-Vehicle). Following the direct communications, one or both of Vehicle1 and/or Vehicle2 may send a record of their communications to the network to maintain the history. Vehicle2 may move out of coverage of the RSU1 and/or may associate with a new RSU, RSU2. Vehicle2 may engage in communications with any of the CN and a network application via RSU2.

In this use case, there may be various scenarios where blockchain transactions may be created and stored on a target blockchain. Examples of the various scenarios may include any of the following.

- The event that Vehicle1 and Vehicle2 meet each other under the same RSU1 may be recorded in a blockchain transaction The blockchain transaction may include, for example, location information of both vehicles.
- Direct communications between Vehicle1 and Vehicle2 may be coordinated and enabled through the blockchain system in a decentralized fashion.
- The record of communications between Vehicle1 and Vehicle2 may be recorded in a blockchain transaction. The blockchain transaction may include, for example, the time length and total data volume of the communications.
- When Vehicle2 moves from RSU1 to RSU2, the new location of Vehicle2 may be recorded in the blockchain system.
- RSU1 may store Vehicle2's context information to a blockchain system. As such, when Vehicle2 moves from RSU1 to RSU2, RSU2 may access Vehicle2's context information directly from the blockchain system without contacting RSU1.
- After Vehicle2 moves to RSU2, it may transmit application messages to the network application directly through a blockchain network.
- A platooning event involving a plurality of vehicles may be recorded in a blockchain transaction. An example of a platooning scenario with three vehicles: Vehicle3, Vehicle4, and Vehicle5 is shown in FIG. 8.

Representative Use Case 2—Smart Manufacturing and Logistics

Figure 9:
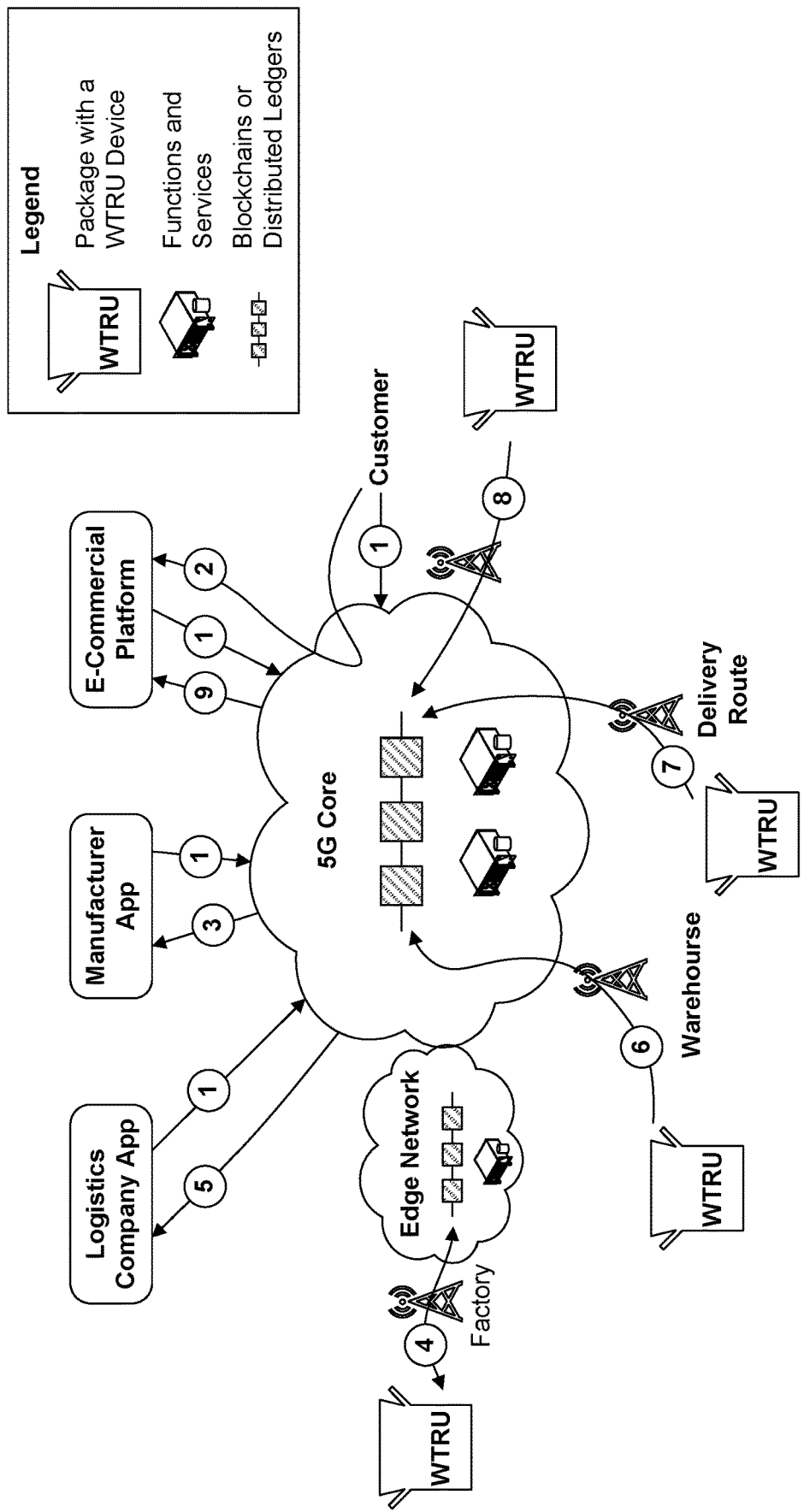
FIG. 9 illustrates a smart manufacturing and logistics use case.

FIG. 9 illustrates a smart manufacturing and logistics use case. For convenience and simplicity of exposition, the reference numerals in the disclosures accompanying 9 are shown with the prefix "9:". The smart manufacturing and logistics use case may include four participating parties: a customer, an e-commercial company, a manufacturer, and a logistics company. These four parties may use an internet of things (IoT) and/or 5G technologies to enable a smart manufacturing and logistics process. The smart manufacturing and logistics process may include any of the following:

- Step or operation 1: Each party may register to a 5GS (or a cloud system) as an application (9:1).
- Step or operation 2: The customer may submit a purchase request to an e-commercial platform (application of the e-commercial company) (9:2). For the sake of simplicity, the purchase request may be for a single product item.
- Step or operation 3: The manufacturer application may receive the list of product items ordered by the customer (9:3), likely from the e-commercial platform.
- Step or operation 4: The manufacturer application may send the list to the factory, where the ordered product item is produced and ready for shipping to the customer (9:4).
- Step or operation 5: The logistics company may receive a notification to pick up the produced item from the factory and ship it towards the customer (9:5).
- Step or operation 6: The shipped item arrives at a warehouse (9:6), which may be owned or rented by the logistics company.
- Step or operation 7: The item may be sent for delivery on route towards the customer (9:7).
- Step or operation 8: The item may arrive and be received by the customer (9:8).
- Step or operation 9: The e-commercial platform may receive a notification (9:9).

In this case, each step or operation may trigger one or more actions for the corresponding party, and any (e.g., each) of such events may be created as a blockchain transaction and be stored onto a target blockchain. However, the WTRU attached to each package may be very resource constrained for the sake of cost reduction (e.g., as a reduced WTRU). The reduced WTRU might not have the capability to create transactions and/or to participate in the blockchain system (e.g., to store the blockchain, to perform consensus mechanism, etc.). As used herein, the term "step" is understood to encompass "one or more operations", and thus, for convenience and simplicity of exposition, the terms "step and "operation(s)" may be used interchangeably herein.

Embodiments address the following key issues described with reference to the use cases disclosed herein.

Key Issue #1: Blockchain-as-a-Service refers to providing easy access interfaces to users in order to enable them to utilize blockchain in their applications without having to handle all the internal operation complexities of blockchain systems. However, most of blockchain-as-a-service solutions are proprietary solutions and do not provide enough flexibilities. For example, for upper-layer application developers, they have to understand the full API specifications of the blockchain-as-a-service platform provided by a particular company. It poses significant maintenance and upgrade costs when the application developers intend to use a different blockchain-as-a-service platform (provided by a different company) in a later time (e.g., due to the new/emerging requirements/needs of their applications or business logics), since the application developers have to re-learn the new API specification of the second blockchain-as-a-service platform. Proprietary blockchain-as-a-service solutions may only provide a limited choice of underlying blockchain systems, which may not meet various needs from application developers for different applications. In fact, it is foreseen that there will be many different types of blockchain systems, and it will be desired if the blockchain systems can participate in providing blockchain services. Therefore, a common or a standard-based blockchain function (BCF) may be needed as a middleware to not only efficiently manage different types of underlying blockchain systems but also provide easy and effective blockchain services to the upper layer application developers. Different from the existing proprietary blockchain-as-a-service solutions in which the whole blockchain infrastructure is proprietary, a common and standard-based BCF may allow multiple parties (e.g., multiple blockchain system providers) to freely participate in providing blockchain services. For example, with this BCF, different blockchain systems may proactively register to BCF and be managed by the BCF. In this way, a BCF can satisfy all kinds of needs from applications since it may manage a vast number of different types of blockchain systems. In various embodiments, the BCF can and/or may provide a standard or a uniform interface to application developers so that the application developers only need to understand a universal API specification provided by BCF. However, currently, such a common standard based BCF is still missing in all prior research and solutions.

Key Issue #2: The existing proprietary solutions to Blockchain-as-a-Service do not provide efficient edge-side support to the applications. For example, most of existing Blockchain-as-a-Service solutions are cloud-based and the applications often do not know the blockchain node geographical distribution of an underlying blockchain system. However, applications are usually deployed on the edge (e.g., on WTRUs) and they do not have to go to the central cloud to require certain blockchain service if certain desired blockchain nodes are directly available at the edge, or closer to the WTRUs. In order to do so, the common BCF is expected to not only provide blockchain management functionalities but also can help application developers to identify available blockchain services at the edge side. However, such a feature is currently missing from all existing Blockchain-as-a-Service solutions.

Key Issue #3: In a more advanced scenario, there may be multiple BCFs in the system and each of them may manage a list of underlying blockchain nodes. In particular, the BCFs may periodically exchange the information via the overlay network built between BCFs, which is different from the P2P network of the blockchain nodes in the underlying blockchain system. For two (or more) BCFs, it is possible that each of BCFs may manage a particular blockchain node and the two blockchain nodes may come from the same underlying blockchain system. Currently, there has no research been done regarding how the overlay network between BCFs can help blockchain nodes to communicate with each other. In other words, all the communications/ interactions between two blockchain nodes do not have to rely on the P2P network in the underlying blockchain system. Instead, they can rely on BCFs for exchanging the information via the overlay network between BCFs, which may not be using the same communication mediums used in the underlying blockchain networks/systems. In particular, there is not research been done regarding how BCFs can facilitate message delivery between underlying blockchain nodes while also considering its own needs for information exchange between BCFs.

Figure 10:
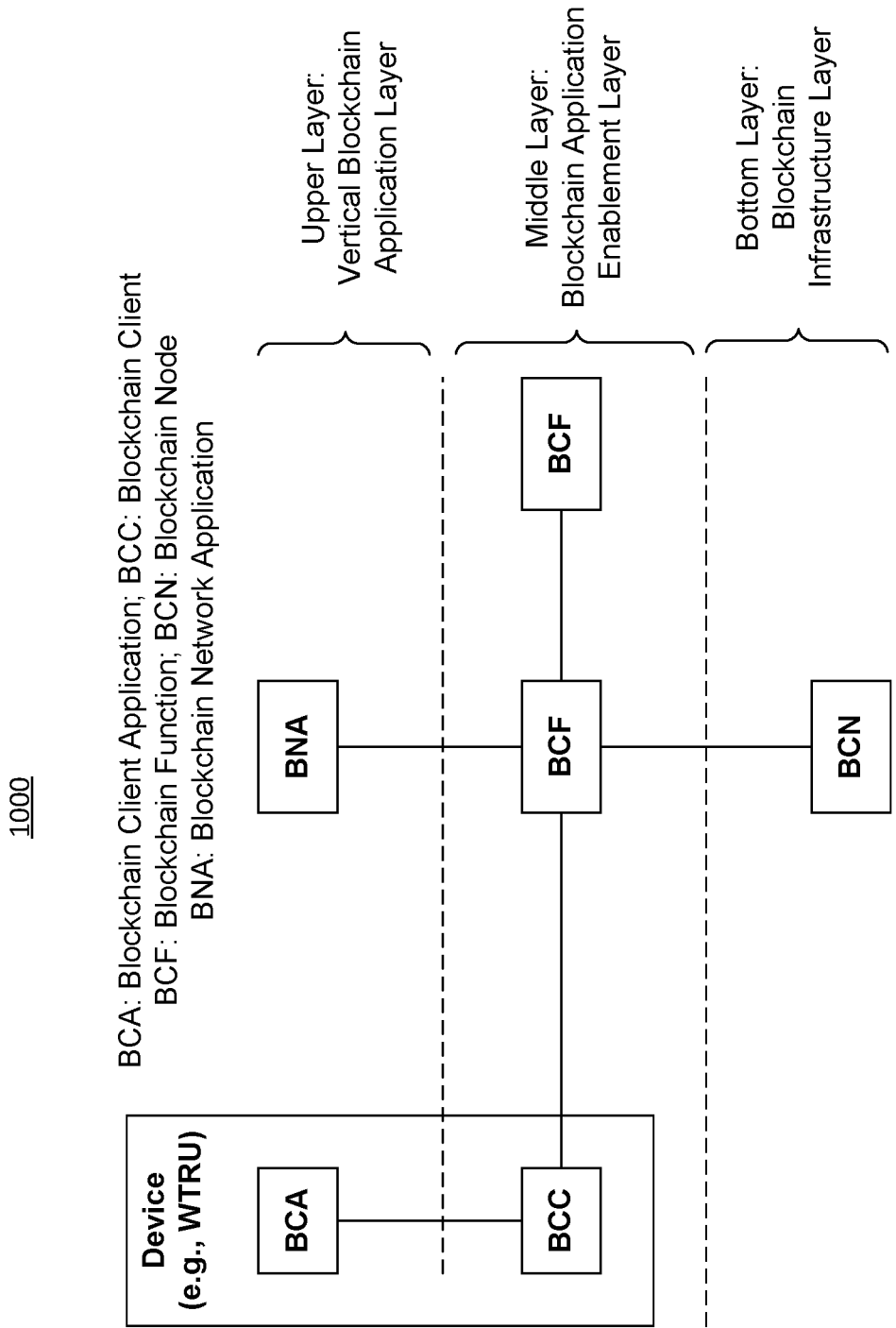
FIG. 10 is a block diagram illustrating an example functional architecture of blockchain-enabled wireless applications (BEWAs)

Representative Functional Architecture of Blockchain-Enabled Wireless Applications FIG. 10 is a block diagram illustrating example functional architecture of blockchain-enabled wireless applications (BEWAs) 1000. The functional architecture 1000 may include various entities, such as, for example, a blockchain client application (BCA), a blockchain client (BCC), a blockchain network application (BNA), a blockchain function (BCF) and a blockchain node (BCN). The architecture 1000 is described with reference to the communications system 100 (FIGS. 1 and 5) for convenience and simplicity of exposition. The functional architecture 1000 may deployed in different architectures as well.

Some of the entities may be deployed on the WTRU/ device side, and other entities may be deployed on the communication infrastructure side. For example, the WTRU/device may be configured with the BCA and the BCC. The infrastructure may be configured with the BCF and BNA. In some embodiments, a BCF may be deployed on any of a WTRU (e.g., a powerful WTRU), a home computer, an edge host, etc.

The functional architecture 1100 may define a set of layers, such as, for example, an upper (e.g., top) layer, a middle layer and a lower (e.g., bottom) layer. The upper, middle and lower layers may include a vertical application layer, a blockchain application enablement layer and a blockchain infrastructure layer, respectively. The various entities may belong to different layers. For example, the BCA and/or the BNA may reside on the vertical application layer. The BCC and/or BCF may reside on the blockchain application enablement layer. Although not shown, the BCA in some embodiments may belong to the blockchain application enablement layer. The BCN may belong to blockchain infrastructure layer.

A vertical application may be realized by a BNA (e.g., for conducting server-side functionalities) and one or more BCAs (e.g., for conducting client-side functionalities). The BCA and BNA, for example, may conduct client-side and server-side application logic processing, respectively, for one or more (e.g., specific) vertical wireless applications.

The blockchain application enablement layer may provide and/or expose one or more (e.g., common) functionalities to the vertical application layer. Using such functionalities, the vertical application layer may access (e.g., more easily and/or efficiently access) the blockchain infrastructure layer through the enablement layer. The BCC and BCF, for example, may provide various value-added blockchain services to the BCA and BNA respectively. The BCC and BCF may interact with and/or manage the underlying BCN(s) to use and/or in connection with using blockchain-related resources thereof.

A BEWA may be a vertical wireless application. The BEWA may be realized by a BNA (e.g., for conducting server-side functionalities) and one or more BCAs (e.g., for conducting client-side functionalities). The BCAs and BNA may conduct client-side and server-side application logic processing, respectively. for a (e.g., specific) vertical wireless application.

A BCA may be, for example, a client-side entity for supporting a (e.g., a specific) vertical wireless application. For example, in the smart manufacturing and logistics use case, a WTRU may be attached (e.g., affixed) to a package, and a smart manufacturing and logistics BCA may be installed on the WTRU. During transit, the package may fall from a storage shelf of a delivery truck as a result of a sharp turn. A sensor on the WTRU may detect such an event and/or may report the same to the BCA on that WTRU. The BCA may determine whether the fall is sufficient (e.g., serious enough) to warrant further action, such as whether to (i) memorialize (record) the event into the transportation log (i.e., to store a record of the event in a blockchain) and/or (ii) report the record of the event (or the to the smart factory and logistics BNA on the server-side.

The BCC may be, for example, a client-side entity for providing functionalities related to blockchain services. A BCA may be responsible for the client-side application logic on a WTRU and may interact with the BCC to obtain blockchain services. In various embodiments, the BCC might not handle the business logic for the specific vertical applications, instead, it may act as a service interface for the BCA to interact with blockchain services (exposed by the BCFs).

The BNA may be a server-side entity for supporting a vertical application. For example, in the smart manufacturing and logistics use case, the smart manufacturing and logistics management platform may be a BNA on the server-side. The BNA may monitor all the packages in the transit process. The BNA may be regarded as the manager/ server/controller of a wireless vertical application, and it may provide and/or define specific application processing logic, a list of the associated BCAs, and related policies.

The BCN may be, for example, an entity that provides blockchain capabilities and functionalities. The BCN may be one of a plurality of BCNs that form an underlying blockchain infrastructure. The BCA and/or the BNA may be consumers of the blockchain capabilities provided by BCN.

A communication infrastructure may be a communication system 100 that may support communications between and/or among BCAs, BCCs, BNAs, and BCFs.

The BCF may be, for example, an entity for supporting blockchain-enabled wireless applications. The BCF functionalities may include any of the following:

The BCF may provide blockchain as a service. There may be different types of blockchain systems with various performance specifications. For example, Bitcoin and Ethereum are two different blockchain systems. The design principles or operations of BCNs in those blockchain systems may be significantly different. A BCA and/or a BNA may provide business logic processing and might not have universal capabilities/knowledge to interact with various BCNs from different blockchain systems. It may be difficult for BCAs/BNAs to efficiently use or interact with BCNs directly. The BCF may act as an intermediary and may provide blockchain capabilities as a service to BCAs/BNAs. The BCF, for example, may encapsulate capabilities of the underlying BCNs (e.g., without regard to the type of blockchain system the BCNs belong).

The BCF may expose (e.g., uniform) interfaces and/or service descriptions to the upper-layer BCAs and BNAs to use for accessing and/or utilizing the underlying blockchain capabilities provided by the BCNs. Various operation requests may be sent from the BCAs or the BNAs to the BCNs (e.g., to store a transaction onto a blockchain) via the BCF. The BCF may translate the requests to the specific commands/calls of the specific blockchain systems. It may be seen that, with the existence of the BCF, the system may become very flexible in the sense that the BCAs and the BNAs may use the (e.g., uniform) blockchain service interfaces provided by the BCF to obtain blockchain services of BCNs having differing blockchain capabilities. The BCF may conduct efficient BCN management (e.g., to use a different BCN provided by a different type of blockchain system) without informing or affecting the upper-layer BCAs and BNAs. Unlike existing proprietary blockchain-as-a-service solutions in which the whole blockchain infrastructure is proprietary, the BCF may allow multiple parties (e.g., multiple blockchain system providers) to freely participate in providing blockchain services (e.g., through BCN registration and management disclosed herein). For example, different blockchain systems may (e.g., may proactively) register to, and/or be managed by, the BCF, and the BCF may provide a blockchain-as-a-service in a multi-party or multi-stakeholder environment.

The BCF may act as a delegator of a BNA. As disclosed above, a BNA may be a server-side entity for supporting a (e.g., a specific) vertical application. For example, in the smart manufacturing and logistics use case, the management platform (as a BNA) may monitor all packages in the transit process. For distributed applications, processing data close to its origination may be preferable. For example, it may be inefficient and/or resource-consuming to send some or all real-time events from WTRUs (e.g., a massive amount of WTRUs) attached to logistics mail packages to a centralized management platform for processing. Large amounts of data are currently being generated at the edge and the system closest to the edge may be a communication infrastructure (such as an access network). A significant portion of that large amount of data currently relies on the communications network to be transmitted to the vertical application server, and that data may travel from or through an access network and through a core network before reaching its vertical application server. The BCF may be deployed in any of the access and core networks. For example, multiple BCFs may be deployed in the communications system, where, e.g., one BCF may be deployed on the access network and another BCF may be deployed in the core network. The BCF deployed in the core network may handle complex processing (such a BCF deployment may facilitate/optimize data transmission from the edge to the server-side), and the BCF deployed in the access network may handle less complex processing. The BCF may provide blockchain management functionalities and may assist application developers with identifying available blockchain services at the edge. The communications network may provide functionalities in addition to supporting data communication. For example, in the smart manufacturing and logistics use case, a real-time location of a WTRU attached to a package may be obtained from a communication network (e.g., from a base station thereof). The real-time location information may be essential for the processing of business logic along with being included in blockchain transactions. The BCF may include and/or perform at least some of the business logic processing and/or business logic policies (e.g., instead of and/or addition to all of the business logic processing being deployed on a back-end server (e.g., on a BNA)); especially if some of the processing is blockchain-related, e.g., to retrieve blockchain transactions.

The BCF may act as an interface for interaction between a communication infrastructure/system and a BCC and/or a BNA. As disclosed above, the communication infrastructure may provide functionalities in addition to transmitting data. When vertical applications are integrated with 3GPP networks, the BCAs/BNAs may interact with the 3GPP system efficiently. For example, to set up an application-specific policy in the communications system, a BNA may communicate and deploy the policy to the PCF for future use. The BNA may communicate with communications system to collect various information, including a current location of a specific WTRU, a current status of a WTRU (e.g., connected or offline), etc. For example, the BNA may need to obtain location information about a specific user or WTRU and the BNA may not have the capability to directly interact with the communications system. The BCF may assist BCAs/BNAs with conducting interactions with the communication system, e.g., for BCAs/BNAs that might not have capabilities to directly interact with the communications system.

Representative Operations of Blockchain-Enabled Wireless Applications

Figure 11:
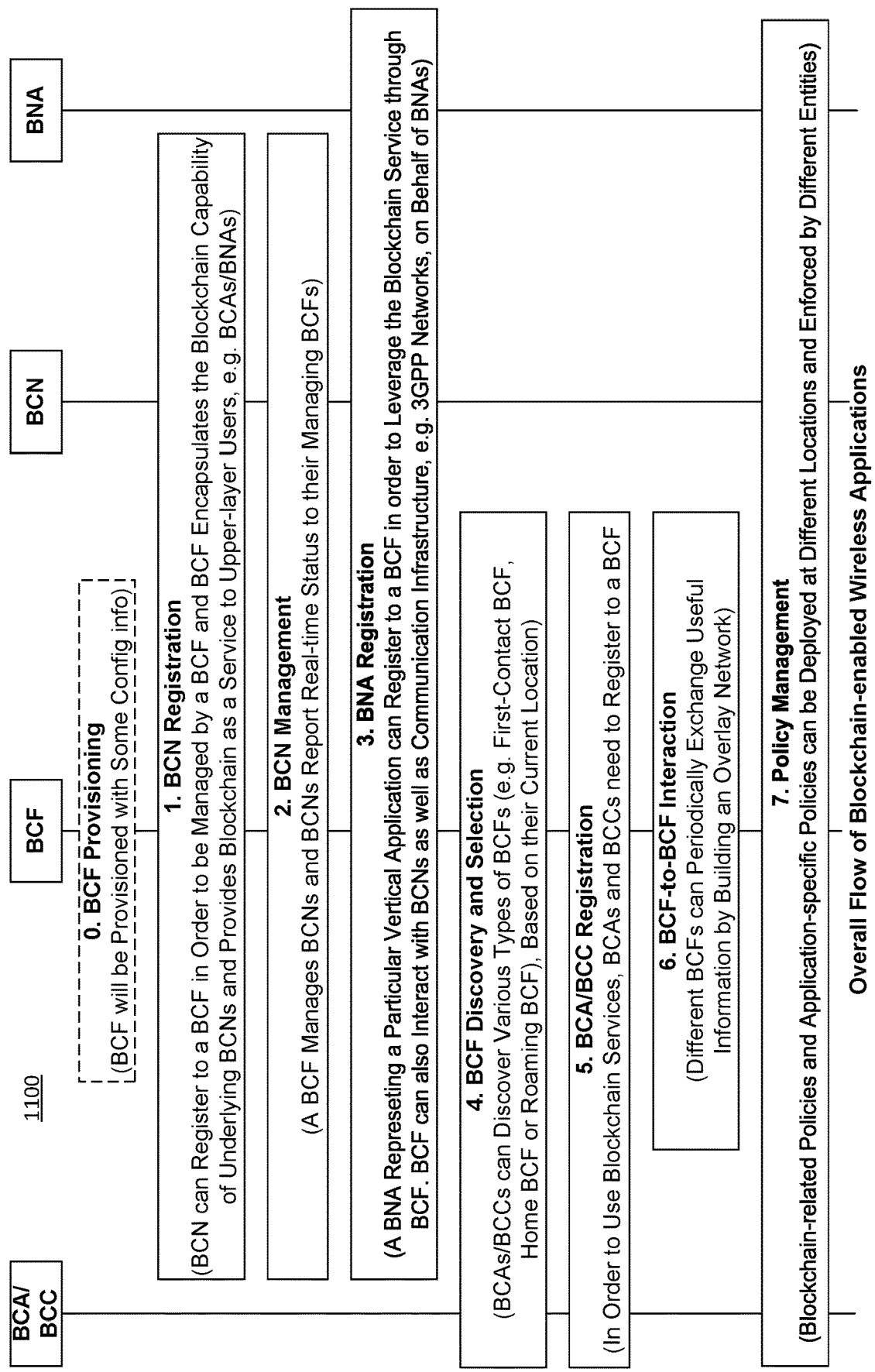
FIG. 11 illustrates example operations for blockchain-enabled wireless applications.

A BCF may carry out operations related to system setup and configurations for enabling blockchain-based wireless applications. FIG. 11 illustrates example operations for blockchain-enabled wireless applications 1100. The operations 1100 are described with reference to the BEWAs architecture 1000 (FIG. 10) and the communications system 100 (FIGS. 1 and 5) for convenience and simplicity of exposition. The operations 1100 may be carried out using different architectures as well. For convenience and simplicity of exposition, the reference numerals in the disclosures accompanying 11 are shown with the prefix "11:".

The operations may include BCF provisioning (11:0); BCN registration (11:1); BCN management (11:2); BNA registration (11:3), BCF discovery and selection (11:4); BCC/BCA registration (11:5); BCF-to-BCF interaction (11:6); and policy management (11:7).

BCF provisioning. The BCF provisioning operation may include certain set-up configurations, e.g., access details and instruction for a BCF regarding how to interact with communications infrastructure. This BCF provisioning operation may be carried out using existing solutions.

BCN registration. The BCN registration operation may relate to how BCNs may register to the blockchain application enablement layer. As disclosed above, different types of BCNs may be integrated into the system for supporting block-enabled wireless applications, and the BCF may facilitate interactions between the underlying BCNs and the upper-layer BNAs/BCAs. The BCNs may register to the BCF. After a BCN is successfully registered to a BCF, the BCF may manage the BCN. The BCF may be referred to as a managing BCF for that BCN, and the BCN may be referred to a managed BCN.

BCN management. After a BCN is registered to a BCF, the BCF may service various needs of the consumers, such as BNAs and BCAs. The BCF, for example, may provide a blockchain as a service to the consumers and may hide underlying details of the BCNs. The BCF may conduct certain management activities for the BCNs. For example, the BCF may monitor real-time performance for a BCN (or the global performance of an entire blockchain system). If continued performance by the BCN to support a BNA or other consumer, the BCF may use a different type of BCN for serving a particular BNA/BCA.

BNA registration. A blockchain-enabled system may support various vertical applications. A BCF may provide blockchain as a service to the vertical applications. When a new vertical application is deployed, a corresponding BNA may register to the BCF so that the blockchain service may be utilized. During registration, the BNA may specify its application-level requirements for the blockchain service, and the BCF may make arrangements and select a desired (e.g., an appropriate) BCN of the correct type for serving the BNA (BCNs may be from different types of blockchain systems). The BNA may specify one or more application-specific policies and/or one or more blockchain-related policies. The application-specific and/or blockchain-related policies may be enforced by the BCF and/or be deployed directly into the communications infrastructure for enforcement (e.g., deployed into PCF of a communications network).

BCF discovery and selection. This BCF discovery and selection operation relates to the WTRU/device side. Since WTRUs may be mobile, the BCAs/BCCs on WTRUs may discover available BCFs proximate to or within a measure of (e.g., close) proximity to their current locations if they want to use blockchain services (A BNA may directly connect to a BCF through pre-configurations if, for example, the BNA is relatively static). The disclosed BCF discovery solutions may also be used by BNAs. As an example, a WTRU may need to frequently interact with a blockchain network that might be deployed at an edge, e.g., from an access network, such as gNodeB. In such a case, the WTRU may want to discover a BCF deployed directly in the current access network of the WTRU and proximate to or within a measure of (e.g., close) proximity to a current location of the WTRU. This way, the BCF may easily and/or quickly obtain the information from the WTRU for interaction with blockchain systems.

BCC/BCA registration. The BCC is a client-side middleware entity for providing functionalities related to blockchain service. The BCA may be a client-side entity for supporting a specific vertical wireless application. In order to utilize the blockchain service provided by a BCF, the BCA on a WTRU may interact with a BCF via a BCC hosted on the same WTRU. The BCC/BCA registration operation is mainly related to how a BCC or a BCA register to a BCF (discovered during the BCF discovery operation) in order to use blockchain services.

BCF-to-BCF interaction. Multiple BCFs may exist in the system and each of them may manage a list of BCNs. The BCF-to-BCF interaction operation may relate to how different BCFs can exchange useful information to facilitate other operations. For example, two BCNs from the same underlying blockchain system may be managed by two different BCFs. The two BCNs may communicate with each other (e.g., not through the classical approach, i.e., using the P2P network in the underlying blockchain system), by relying on their managing BCFs for delivering messages (e.g., through the overlay network between BCFs at the blockchain application enablement layer).

Policy Management. The policy management operation may relate to how to manage blockchain-related and/or application-specific policies. The policies may be created by, deployed to, and enforced by different entities. For example, the policies may be enforced by a BCF for a blockchain-related policy and/or enforced by a PCF in a communications network (e.g., if policy enforcement collects data from the communications system).

Representative BCN Registration

Representative Basic Case for BCN Registration (One BCN Registers to One BCF)

A BCN may register to a BCF. The BCN and BCF, for example, may carry out a procedure to register the BCN to the BCF ("BCN registration procedure"). Once registered, the BCN may be managed by the BCF. The BCN may define capabilities, characteristics, basic information, etc. Since there may be many different types of blockchain systems that may be utilized, one or more of the capabilities, characteristics, basic information, etc. of the BCN may be defined in accordance with one or more of the blockchain systems. The BCF may be informed of the capabilities, characteristics, basic information, etc. of the BCN in connection with registering to the BCF, such as, during BCN registration.

Figure 12:
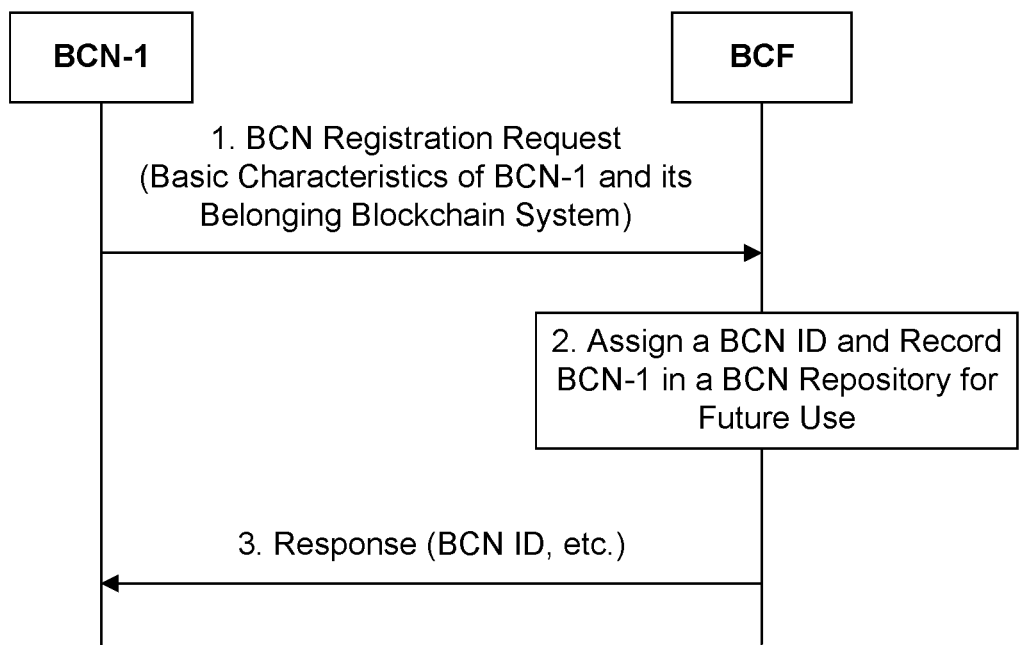
FIG. 12 illustrates an example BCN registration procedure.

FIG. 12 illustrates an example BCN registration procedure 1200. The procedure 1200 is described with reference to the BEWAs architecture 1000 (FIG. 10) and the communications system 100 (FIGS. 1 and 5) for convenience and simplicity of exposition. The procedure 1200 may be carried out using different architectures as well. The BCN registration procedure 1200 may be carried out by a BCN (e.g., BCN-1) and a BCF for supporting blockchain-based wireless applications. For convenience and simplicity of exposition, the reference numerals in the disclosures accompanying 12 are shown with the prefix "12:".

The BCN-1 may register itself to the BCF. The BCN-1 may be a node of a specific type of blockchain system, and it may have already discovered the BCF through a BCF provisioning operation (e.g., using an existing solution) (12:0). The blockchain system may be, e.g., a private/consortium blockchain system. The BCN-1 may know information about the entire blockchain system, including, for example, other BCNs of the blockchain system (e.g., as a function of P2P peering inherent in the blockchain system). The BCN-1 may be a manager node, controller node or other type of node, etc.

The BCN-1 may send a request to register ("registration request") to the BCF (12:1). The registration request may indicate and/or include various information, such as, for example, capabilities, specification, characteristics, basic information, parameters, etc. The registration request may include one or more (e.g., many) information elements. The BCN-1, for example, may convey information regarding (i) the blockchain system (e.g., as a whole) and (ii) the BCN-1 individually. The BCN-1 may use one or more (e.g., different) IEs of the request to convey the information regarding the blockchain system ("BCS information") and the information regarding the BCN-1 ("BCN-specific information").

The BCS information may include any of an affiliated blockchain system (ABS) identifier/identity (ID) (ABS-ID), an ABS type (ABS-TYPE), a consensus mechanism/protocol information element (IE), a supported cryptocurrency IE, an application programming interface (API) specification IE, a number of peer nodes of the ABS IE, a current size of a ledger of the ABS IE, peer node geographical distribution of the ABS IE, a capability for supporting a new chain of the ABS, one or more supported performance metrics of the ABS, and the like.

The ABS-ID may identify (e.g., uniquely identifies) the blockchain system The ABS-ID may be any ID, such as, any of a name, number, alphanumeric value, etc., and may be locally and/or globally unique. For example, the ABS-IDs for Bitcoin and Ethereum brands of blockchain systems for cryptocurrencies may be "Bitcoin" and "Ethereum", respectively.

The ABS-TYPE may indicate a type of blockchain system ("blockchain-system type") for the blockchain system. The blockchain-system type may be, for example, any of a public chain, a private chain and a consortium chain.

The consensus mechanism/protocol IE may indicate a type of consensus mechanism and/or protocol used for the blockchain system.

The supported cryptocurrency IE may indicate whether the blockchain system supports cryptocurrency (e.g., intrinsically supports cryptocurrency). For example, the supported cryptocurrency IE may indicate that the blockchain system supports cryptocurrency if blockchain system is the Bitcoin system.

Many blockchain systems provide user-friendly APIs to facilitate users with operating such blockchain systems (e.g., for retrieving transactions in the blockchain). The API specification IE may indicate API access details and/or instructions (e.g., usable by the BCF) for interacting with the blockchain system via the BCN-1.

The number of peer nodes IE may indicate how many peer nodes in the blockchain system. The information may give the BCF a sense regarding the scale of the underlying blockchain system that the BCN-1 belongs to. Especially, when the BCN-1 is a manager or controller node of a private/consortium blockchain system, it may provide this parameter to the BCF.

The current ledger size IE may indicate a current size of the ledger of the blockchain system.

The peer node geographical distribution IE may indicate where the peer nodes of the blockchain system are distributed. For example, the BCN-1 may be located in one geographical region and the other BCN in the blockchain system may be located the same or one or more other geographical regions. This information may be useful for the BCF for finding an available BCN in a specific region.

The new chain support IE may indicate whether the blockchain system support creation of a new chain. It is possible that for a given blockchain system, multiple chains may be created and maintained. In a case in which data related to the BNA-1 cannot be stored together with data related to the BNA-2, all the transactions related to the BNA-1 and all the transactions related to the BNA may be stored in respective chains hosted/run by the same set of blockchain nodes. The new chain support IE may indicate whether the BCN-1 can and/or may work with multiple chains, including creating a new chain, or storing transactions in a specific chain, etc.

The supported performance metrics IE may indicate performance metrics that may be provided by the system. Examples of the performance metrics may include any of blocks per hour (an indicator of how fast blocks are added to the blockchain); transactions per hour (an indicator of how many transactions are confirmed per hour); transaction latency (an indicator of the period between a time at which a transaction is created and a time at which the transaction has been confirmed in the blockchain system; etc.

The BCN-specific information may include one or more IEs for any of access details of the BCN, a node type of the BCN ("BCN node type"), a mobility type of the BCN ("BCN mobility type"), and an organization affiliated with the BCN.

The BCN access details may indicate access details (such as access address) of the BCN-1. The BCN access details may indicate how to interact with BCN-1 (e.g., to retrieve a current status of BCN-1).

The BCN node type may indicate the node type for the BCN-1. The BCN node type may indicate one of various node types for the BCN-1. The BCN node type may indicate that the BCN-1 may be partial node. As a partial node, the BCN does not hold an entire ledger, instead, it may hold part of the ledger (e.g., related to a specific vertical application). The BCN node type may indicate that the BCN-1 may be a basic full node. As a basic full node, the BCN1 may hold an entire ledger/blockchain. The BCN node type may indicate that the BCN-1 may be a basic full node with extra mining capability. As a basic full node with extra mining capability, the BCN-1 may hold and entire ledger/blockchain and may have mining capability of the belonging blockchain system of the BCN-1. The BCN node type may indicate that the BCN-1 may provide mining capability and may hold part of the ledger/blockchain.

The local performance metrics IE may indicate performance metrics of the BCN-1 The local performance metrics may include any of a number of confirmed on-chain blocks, local computing resources, a list of neighboring nodes, a BCN mobility, communication capabilities, a BCN-host capability and a BCN affiliated organization.

The number of confirmed on-chain blocks may indicate how many blocks that are submitted by the BCN-1 and have been successfully confirmed by the belonging blockchain system.

The local computing resources may indicate memory and CPU resources of the BCN-1 that are available.

The list of neighboring nodes may indicate a number of other BCNs and their information such as their addresses, which are next-hop neighbors of this BCN in the underlying P2P network as a part of the blockchain system as specified by ABS-ID.

The BCN mobility may indicate whether a physical node which hosts the BCN-1 has certain mobility. For example, the BCN-1 may be hosted on a mobile node such as a mobile vehicle with computing resources. The BCN-1 may be expected to be traveling across different geographical regions. Such information may be useful for the BCF to decide whether to use the BCN-1 as an interface node to interact with the underlying blockchain system.

The communication capabilities may indicate what type of communication capability/medium this BCN may use, such as Wi-Fi, cellular, local area network, etc.

The BCN-host capability may indicate 1) the device capability if the BCN-1 is hosted by an end device such as a mobile vehicle such as the computing and storage resources the device has; 2) the software instance capability such as the allocated computing and storage resources if the BCN-2 is a virtual software instance residing in some physical servers.

The BCN affiliated organization may indicate an affiliated organization of the BCN-1, (e.g., the party or organization to which the BCN-1 belongs).

The BCF may examine information sent from the BCN-1 and/or may validate the BCN-1 as a valid blockchain node for further operation. The BCF may hosts a local BCN repository. The BCF may create a record for the BCN-1 and add the related information (e.g., as denoted by (12:1) and disclosed above in connection therewith) for future use (12:2). The BCF may assign a BCN ID for the BCN-1 (12:2). The BCN ID may be an external ID and may be used in the middle layer (such as the BCF) and upper layer (including BNAs/BCAs). The BCN ID may be different from an ID of the BCN-1 to the BCN-1 as a participating node of the underlying blockchain system.

The BCF may send a response to the BCN-1 to confirm its registration (12:3). The response may include and/or indicate the assigned BCN-ID.

The BCF may be interested in other peer nodes of the BCN-1 (e.g., in certain geographical regions) and may ask the BCN-1 to trigger registration operations of the peer nodes (e.g., the BCF-1's neighbors in the underlying P2P network as a part of the blockchain system) when such are identified by the BCN-1. The BCN-1 may monitor availability of the peer nodes during broadcasting communications conducted in the underlying blockchain system. After the other BCNs are identified, the BCN-1 may send triggers to them through the underlying blockchain system or off-chain communications and/or may ask the BCNs to register to the BCF. The response may include any of the following parameters: (i) one or more types of interested BCNs, (ii) a number of interested BCNs, (iii) one or more performance requirements of interested BCNs, (iv) one or more desired regions of interested BCNs, (v) one or more other type of characteristics of interested BCNs and (vii) one or more desired reporting instructions. The types of interested BCNs may indicate one or more types of BCNs that the BCF is interested in, such as, a partial node, a full node, a node with mining capability only, or a full node with mining capability. The number of interested BCNs may indicate a number of interested BCNs to be identified by BCN-1. The performance requirements of interested BCNs may include respective memory and CPU resources of the BCNs. The desired regions of interested BCNs may indicate one or more desired geographical regions that the BCNs should be located in. Note that, this is just an example, other types of desired characteristics can also be included as requirements. The access details of the BCF may be instructions for the BCNs regarding where they should register. The desired reporting instructions may include detailed instructions that tell the BCN-1 how it should report its real-time status and performance metrics to the BCF in a defined manner. For example, to support the BCN management operation, the BCF may ask BCN-1 to periodically reports its real-time performance metrics.

The procedure 1200 of FIG. 12 may be suitable for one BCN to register to one BCF. As disclosed above, the blockchain system may include multiple (e.g., many) peer nodes distributed in various locations and each of the peer nodes may have a similar or equivalent capability. For example, all full nodes in the blockchain system may host a copy of the ledger and/or all full nodes with mining capability may participate in the mining process. Other procedures for BCN registration are disclosed herein below.

The procedure 1200 may be suitable for updating a registration record of a BCN that was already registered with the BCF, except that, instead of the registration request being sent to the BCF as denoted by (12:1), the BCN-1 may send a BCN registration update request to the BCF. The registration update request may include a BCN ID.

Representative Extension 1: A BCN May Register a Group of BCNs to a BCF.

Figure 13:
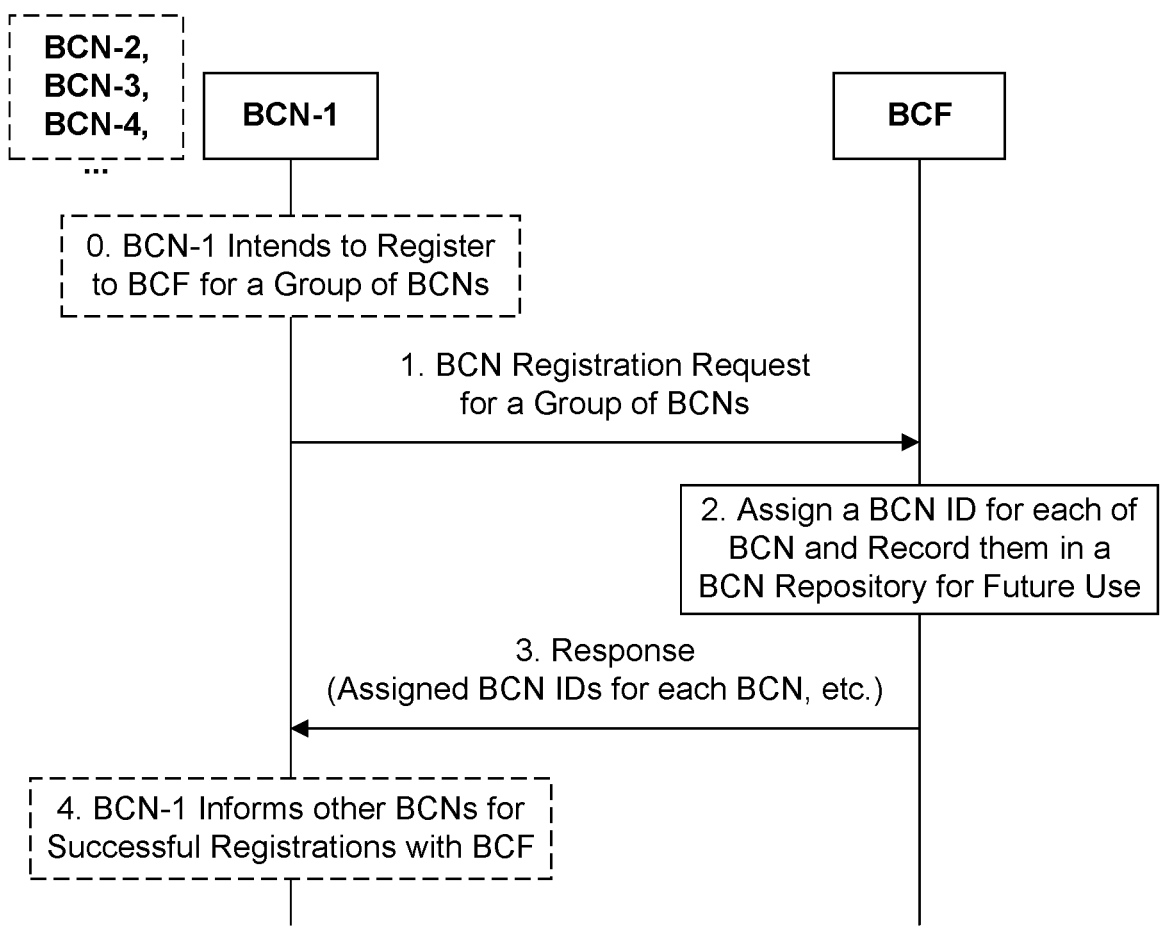
FIG. 13 illustrates an example BCN registration procedure.

FIG. 13 illustrates an example BCN registration procedure 1300. The BCN registration procedure 1300 is described with reference to the BEWAs architecture 1000 (FIG. 10) and the communications system 100 (FIGS. 1 and 5) for convenience and simplicity of exposition. The procedure 1300 may be carried out using different architectures as well. The BCN registration procedure 1300 may be suitable in scenarios in which a BCN may register a group of BCNs to a BCF.

A BCN (e.g., BCN-1) may be a node of a specific type of blockchain system and may have already discovered a BCF through a BCF provisioning operation, as denoted by (13:0). The BCN-1 may collect information from its peers in the blockchain system (e.g., based on exchanging information through broadcasting) that may indicate that there are other peer nodes of the blockchain system (e.g., BCN-2, BCN-3, BCN-4, etc.) and/or that may register to the BCF for supporting blockchain-based wireless applications (e.g., any of the other peer nodes that have not conducted a BCF provisioning operation and would like to rely on the BCN-1 for registration). The BCN-1 may know information about the entire blockchain system, including, for example, other BCNs of the blockchain system (e.g., as a function of P2P peering inherent in the blockchain system). The BCN-1 may be a manager node, controller node or other type node, etc.

As denoted by (13:0), the BCN-1 may send a registration request to the BCF. The registration request may be for registering a group of one or more BCNs. The registration request may indicate and/or include, for each BCN to be registered, various information, such as, for example, capabilities, specification, characteristics, basic information, parameters, etc. The registration request may include for each BCN to be registered any of the BCS information and BCN-specific information disclosed above.

In various embodiments, the group of BCNs might not have any collaboration when interacting with the BCF. It may be up to the BCF to decide which of the group of BCNs to interact with.

In various embodiments, the group of BCNs may support certain collaboration to guarantee the system performance of the underlying blockchain system to which they belong. The request may include any of the following in such embodiments:

BCN Priorities—may indicate priorities of all BCNs to be registered. If this IE is present, it may mean that the BCF may interact with the underlying blockchain system via the BCN having the highest priority. If the BCN having the highest priority is not available, then the BCF may check another BCN with the second-highest priority, and so on. By way of example, the BCN-1 may have the highest priority among the other three BCNs, i.e., BCN-2, BCN-3, BCN-4, and for any interaction with the underlying blockchain system (e.g., to retrieve current status of the blockchain system), the BCF may attempt to use BCN-1 to conduct a certain operation. If BCN-1 is unavailable (e.g., leaves the system), BCF may attempt to use BCN-2 due to it having the second-highest priority.

The operations of the procedure 1300 denoted by (13:2) are similar to the operations of the procedure 1200 (FIG. 12) denoted by (12:3). Each registered BCN may be assigned a BCN ID. The BCF may assign a group ID to the group of BCNs (or multiple group IDs and each group has different BCNs). The group ID may be used by other entities to search member BCNs included in the group identified by the group ID.

The operations of the procedure 1300 denoted by (13:3) are similar to the operations of procedure 1200 (FIG. 12) denoted by (12:3), except that the response may include and/or indicate any of the group ID(s) and the assigned BCN-ID.

As denoted by (13:4), the BCN-1 may inform other BCNs (via the underlying blockchain system) of successful and/or unsuccessful registrations with BCF. The BCN-1, for example, may inform each BCN of any of the following parameters: 1) an address and/or access details for the BCF; 2) a group ID of the group for each BCN; and 3) a priority of each BCN.

Representative Extension 2: A Group of BCNs May Register to Multiple BCFs.

Figure 14:
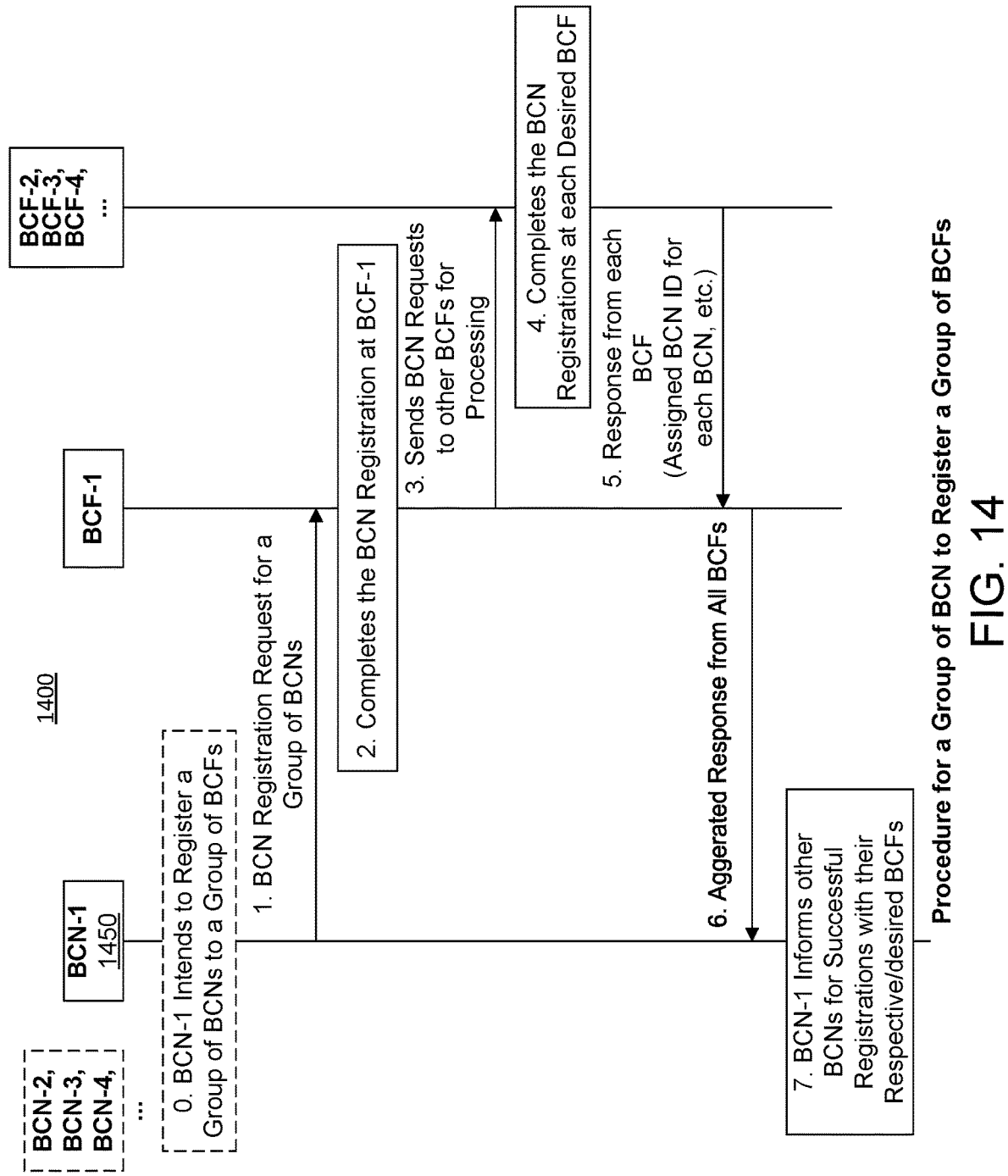
FIG. 14 illustrates an example BCN registration procedure.

FIG. 14 illustrates an example BCN registration procedure 1400. The BCN registration procedure 1300 is described with reference to the BEWAs architecture 1000 (FIG. 10) and the communications system 100 (FIGS. 1 and 5) for convenience and simplicity of exposition. The procedure 1400 may be carried out using different architectures as well. The BCN registration procedure 1400 may be suitable in scenarios in which a group of BCNs may register to a group of BCFs.

A BCN (e.g., BCN-1) may be a node of a specific type of blockchain system and may have already discovered a BCF through a BCF provisioning operation. The BCN-1 may collect information from its peers in the blockchain system (e.g., based on exchanging information through broadcasting) that may indicate that there are other peer nodes (e.g., BCN-2, BCN-3, and BCN-4, etc.) that may register to the BCF for supporting blockchain-based wireless applications (14:0). One or more of the groups of BCNs may want to register to different BCFs. The BCN-1 may know information about the entire blockchain system, including, for example, other BCNs of the blockchain system (e.g., as a function of P2P peering inherent in the blockchain system). The BCN-1 may be a manager node, controller node or other type node, etc.

As denoted by (14:1), the BCN-1 may collect registration needs of multiple BCNs (e.g., BCN-2, BCN-3, and BCN-4) within the blockchain system and may send a single registration request to the BCF-1. The registration request may be for registering several BCNs, where at least two BCNs may register with respective BCFs. The registration request may indicate and/or include, for each BCN to be registered, various information, such as, for example, capabilities, specification, characteristics, basic information, parameters, etc. The registration request may include for each BCN to be registered any of the BCS information and BCN-specific information disclosed above. Alternatively, and/or additionally, the request may indicate and/or include the following parameter for each BCN to be registered: a desired BCF, which may indicate a specific BCF that a particular BCN would like to register with.

As denoted by (14:2), the BCF-1 may receive the registration request. The BCF-1 may conduct the BCN registration for the BCNs to be registered with BCF-1, e.g., using the operations denoted by (12:2) of the procedure 1200 (FIG. 12).

As denoted by (14:3), the BCF-1 may send registration requests to other BCFs for any other registrations to be done at the other BCFs (e.g., based on the desired BCF parameter for each of the BCNs).

As denoted by (14:4), one or more of the other BCFs may process the corresponding registration requests (e.g., using the operations denoted by (12:2) of procedure 1200 (FIG. 12)).

As denoted by (14:5), registration responses may be sent from other BCFs to the BCF-1 and may be received by the BCF-1.

As denoted by (14:6), the BCF-1 may send a response, e.g., in accordance with the operations denoted by (12:3, 13:3) of the procedures 1200, 1300 (FIGS. 12 and 13), except that the response may include and/or indicate an aggregated response for all of the registration responses received from the BCFs and may include a list of BCN IDs. Each BCN ID may be assigned by the BCF-1 and/or other BCFs.

As denoted by (14:7), the BCN-1 may inform other BCNs (via the underlying blockchain system) of successful and/or unsuccessful registrations with their respective/desired BCFs, e.g., in accordance with the procedure denoted by (13:4) of FIG. 13.

Representative Extension 3: A BCN May Register to Multiple BCFs.

Referring again FIG. 14, an example BCN registration procedure 1450 is also shown. The BCN registration procedure 1450 may be suitable may for a BCN to register to a group of BCFs. The BCN registration procedure 1450 denoted by, and disclosed in connection with, FIG. 14 is similar to the BCN registration procedure 1400 denoted by, and disclosed in connection with, FIG. 14, except as disclosed herein. The BCN registration procedure 1450 denoted by, and disclosed in connection with, FIG. 14 may be useful when the BCN is hosted on a mobile node, such as a smartphone WTRU or a mobile vehicle.

A BCN-1 may register to multiple BCFs (e.g., BCF-1, BCF-2, BCF-3, and BCF-4) since the BCN-1 is hosted on a mobile host. Based on a planned trajectory of the BCN-1, the BCN-1 may plan to register to multiple BCFs during different time periods. For example, the BCN-1 may plan to register to the BCF-1 during a time period, 10 am-11 am, in a day when the BCN-1 is traveling in a geographical region A and then may plan to register to the BCF-2 during a time period, 11 am-2 pm, in a day when the BCN-1 is traveling in a different geographical region B.

The operations of the procedure 1450 denoted by (14:1) are similar to the operations of procedure 1400 denoted by (14:1). The BCN-1, for example, may indicate to the BCF-1 how it wants to register to the multiple BCFs (e.g., by including the time schedules).

The operations of the procedure 1400 denoted by (14:2)-(14:6) are similar for the BCN registration procedure 1450, except that such procedures are carried out for each BCF to be registered. The operations of the procedure 1400 denoted by (14:7) is not needed for the BCN registration procedure 1450.

Representative BCN Management

BCN management operation may be directed to how a BCF may conduct certain management activities for the BCNs registered to it. The BCF may monitor real-time performances for a specific BCN and corresponding blockchain system. An objective of BCN management may be to guarantee that the managed BCNs may satisfy needs of the upper layer users, such as BNAs and BCAs. In the case when the performance of a managed BCN (and its blockchain system) is not as expected, the BCF may conduct certain management tasks (e.g., find alternative BCNs or alternative blockchain systems), e.g., to serve (e.g., to best serve) the needs of BNAs and BCAs.

Examples of the BCN management operation may include a push-based procedure and a pull-based procedure. Pursuant to the push-based procedure, one or more of the BCNs may proactively report real-time performance metrics to their managing BCF. Pursuant to the pull-based procedure, the managing BCF may send a query to its managed BCNs to collect certain information.

Representative Push-Based Approach for BCN Management

Figure 15:
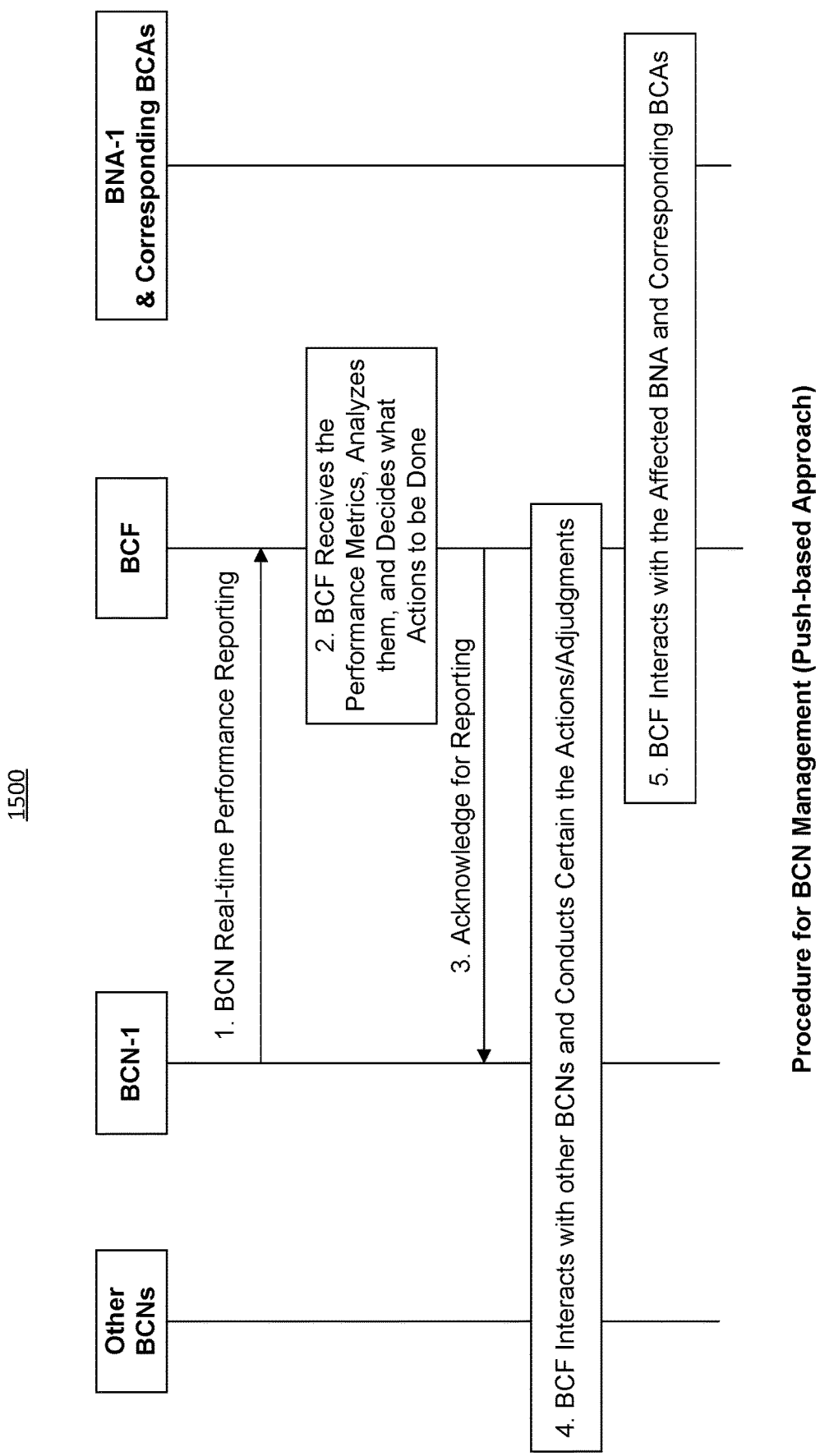
FIG. 15 illustrates a push-based BCN management procedure.

FIG. 15 illustrates a push-based BCN management procedure 1500. The BCN management procedure 1500 is described with reference to the BEWAs architecture 1000 (FIG. 10) and the communications system 100 (FIGS. 1 and 5) for convenience and simplicity of exposition. The procedure 1500 may be carried out using different architectures as well.

Prior to the operations denoted by (15:1), a BCN (e.g., BCN-1) may have already registered to a BCF, e.g., as disclosed herein. In a response message of the BCN registration, the BCF may indicate to BCN-1 about how BCN-1 should report real-time performance metrics to the BCF (e.g., using the desired reporting instructions parameter). For example, the BCF may make one or more subscriptions to BCN-1 for performance reporting.

As denoted by (15:1), the BCN-1 may send a performance reporting request to the BCF (e.g., due to a subscription made with BCN-1). The request may include the following parameter:

BCN ID—may indicate the BCN ID of BCN-1. The BCN ID may have been assigned to the BCN-1 by the BCF during the BCN registration.

The BCN-1 may report various performance metrics to the BCF. The BCN-1, for example, may convey performance metrics regarding (i) the blockchain system (e.g., as a whole) and/or (ii) the BCN-1 individually. The BCN-1 may use one or more (e.g., different) reports to report the performance metrics regarding the blockchain system ("BCS performance metrics") and the performance metrics regarding BCN-1 ("BCN-specific performance metrics").

The BCS performance metrics may include one or more of the following:

An affiliated blockchain system ID (ABS-ID): The ABS-ID may indicate the ID of the blockchain system that BCN-1 belongs to.

A latest number of peer nodes. The latest number of peer nodes may indicate how many peer nodes are in the blockchain system.

A latest ledger size: The latest ledger size may indicate a latest size of the ledger of the blockchain system.

A latest peer node geographical distribution. The latest peer node geographical distribution may indicate the latest geographical distribution of the peer nodes of the blockchain system.

Latest performance metrics: The latest performance metrics may indicate the latest performance metrics of the system. Examples of the latest performance metrics may include any of blocks per hour; transactions per hour; transaction latency, etc.

The BCN-specific performance metrics may include any of the following:

Latest local performance metrics: the latest local performance metrics may indicate the latest performance metrics of the BCN-1 itself. Examples of the latest local performance metrics may include any of the following:

A latest number of confirmed on-chain blocks per day (or per hour): The latest number of confirmed on-chain blocks per day (or per hour) may indicate how many blocks were submitted by BCN-1 and have been successfully confirmed by the blockchain system in the last day (or per hour).

The latest available computing resources, such as memory and CPU resources of BCN-1 that are available.

etc.

Latest geographical location: The latest geographical location may indicate a latest geographical location of BCN-1 (e.g., if BCN-1 is a mobile node).

Latest communication capabilities and performance: The latest communication capabilities and performance may indicate the latest communication capabilities of the BCN, such as Wi-Fi, local area network, or cellular, and/or current communication bandwidth/specifications.

As denoted by (15:1), the BCF may receive the performance metrics sent from BCN-1 and may conduct appropriate actions (15:2), if any. For example, the BCF may analyze the performance metrics and/or may decide what actions need to be done. The actions, for example, may include any of following:

Assuming that currently the BNA-1 and corresponding BCAs may be utilizing the underlying blockchain service provided by the BCN-1 via the BCF (e.g., pursuant to the BNA registration disclosed herein), the BCF may evaluate (e.g., compare) performance metrics received from the BCN-1 and desired performance needs of the BNA-1 (which may be indicated to the BCF by BNA-1 during the BNA registration operation). The BCF, based on the evaluation, may decide:

1) whether to make any adjustment for the underlying blockchain system that may serve the BNA-1. For example, the BCF may make one or more of the following decisions:

The BCF may decide that the local performance metric of the BCN-1 cannot meet the performance needs as specified by the BNA-1 and may determine whether to find another BCN (e.g., BCN-2) for serving the BNA-1.

The BCF may decide that the global performance metric of the entire blockchain system (e.g., having an ABS-ID-1) to which the BCN-1 belongs to cannot meet the performance needs as specified by the BNA-1. The BCF may determine whether to find another BCN (e.g., BCN-3) from a different blockchain system (e.g., having a different ABS-ID-2) for the serving BNA-1. The BCN-2 may be selected from a different underlying blockchain system.

2) whether to send any notification to the upper layer BNA or BCAs for their awareness.

As denoted by (15:3), the BCF may send an acknowledgment for the performance metrics reported by the BCN-1.

As denoted by (15:4), the BCF may interact with the BCN-1 and/or interact with other BCNs if the BCF decided to make certain adjustments, e.g., to select a different BCN for serving BNA-1.

As denoted by (15:5), the BCF may interact with the BNA-1 and/or its corresponding BCAs. For example, the BCF may send one or more notification messages for their awareness, if needed. For example, the BCF may inform the BNA-1 of whether the newly assigned BCN for the serving BNA-1 can and/or may meet its needs or not. The BCF may hide detailed characteristics of the newly assigned BCN from the BNA-1 (e.g., the parameters disclosed in with the operations of procedure 1200 (FIG. 12) denoted by (12:1)).

The BNA-1 and/or corresponding BCAs may make adjustments based on application logic, e.g., to use blockchain service in a different schedule.

The procedure 1500 of FIG. 15 may be suitable for updating a registration record of a BCN that was already registered with the BCF, except that, instead of the registration request being sent to the BCF as denoted by (12:1), the BCN-1 may send a BCN registration update request to the BCF. The registration update request may include a BCN ID and/or and the updated information about the BCN.

Representative Pull-Based Approach for BCN Management

Figure 16:
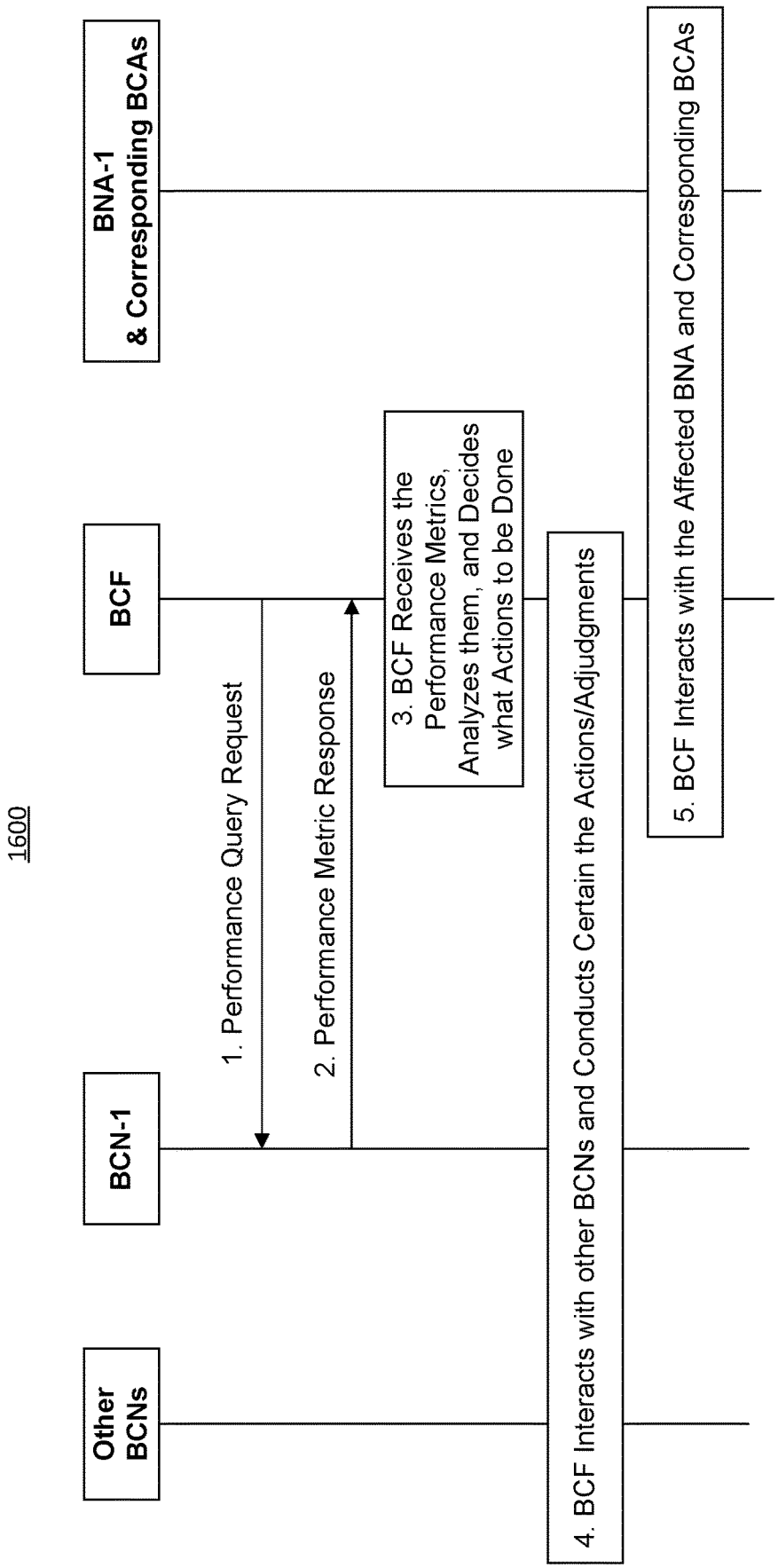
FIG. 16 illustrates a pull-based BCN management procedure.

FIG. 16 illustrates a pull-based BCN management procedure 1600. The BCN management procedure 1600 is described with reference to the BEWAs architecture 1000 (FIG. 10) and the communications system 100 (FIGS. 1 and 5) for convenience and simplicity of exposition. The procedure 1600 may be carried out using different architectures as well.

Prior to the operations denoted by (16:1), a BCN (e.g., BCN-1) may have already registered to a BCF.

As denoted by (16:1), the BCF may send a performance query request to the BCN-1. The request may include the following parameter:

BCN ID: The BCN ID may indicate the BCN ID of BCN-1. The BCN ID may have been assigned to the BCN-1 by the BCF during the BCN registration.

The BCF may query various performance metrics. The various performance metrics may include, for example, BCS performance metrics and/or BCN-specific performance metrics, such as disclosed above.

As denoted by (16:2), the BCN-1 may report one or more performance metrics to the BCF. The operations of the procedures 1600 denoted by (16:3)-(16:5) are similar to the operations of procedure 1500 (FIG. 15) denoted by (15:2)-(15:5)

Representative BNA/BCA-Triggered BCN Management

The BCN management may be triggered by BCNs, e.g., when performance of a BCN cannot meet the needs or requirements of the upper layer customers, i.e., a BNA and corresponding BCAs. The BCN management may be triggered by BNAs and/or BCAs responsive to receiving and/or determining updated requirements/needs for using blockchain service provided by BCNs. The previously-assigned BCN (a BCN is assigned for a vertical application during the BNA registration operation and the assigned BCN is to serve the BNA and its corresponding BCAs, see infra) may not meet the updated/new requirements. Accordingly, certain BCN management actions or adjustments may be done by a BCF.

Figure 17:
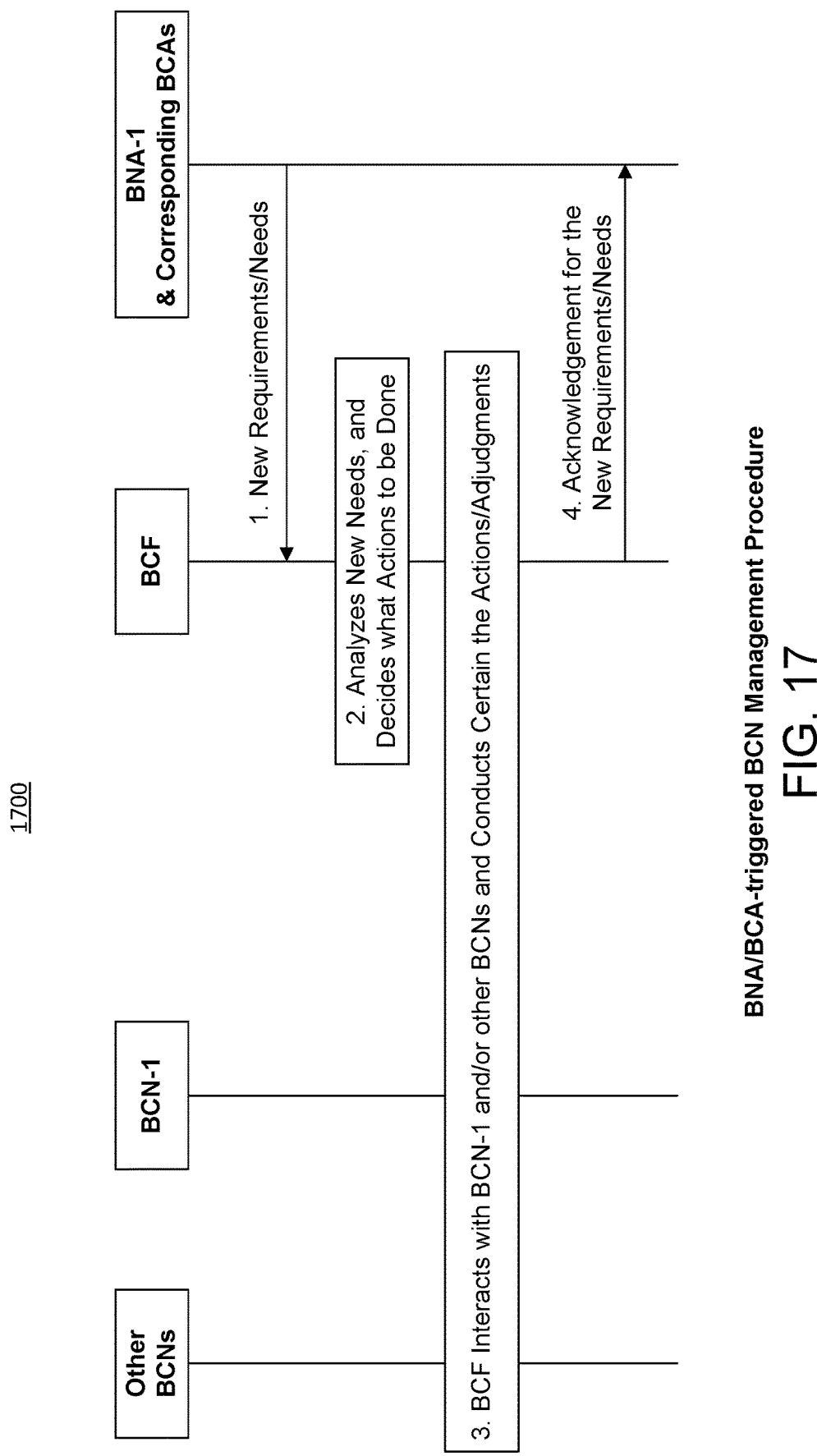
FIG. 17 illustrates an example procedure for BNA/BCA-triggered BCN management.

FIG. 17 illustrates an example procedure for BNA/BCA-triggered BCN management 1700. The management procedure 1700 is described with reference to the BEWAs architecture 1000 (FIG. 10) and the communications system 100 (FIGS. 1 and 5) for convenience and simplicity of exposition. The procedure 1700 may be carried out using different architectures as well. The term "step" as set forth in the disclosures accompanying the figures is understood to encompass "one or more operations" and the terms "step and "operation(s)" may be used interchangeably herein. Reference numerals accompanying operations set forth in the disclosures accompanying the figures may include a prefix consisting of the figure number and a colon.

Pre-condition(s): A BCN (e.g., BCN-1) may be registered to a BCF and may be currently serving a BNA-1 and one or more corresponding BCAs. The BNA-1 may be registered to the BCF.

Step 1: The BNA-1 obtains and/or determines an updated desired performance expectation for the serving BCN. The BNA-1 may send the updated requirements/needs to the BCF (17:1).

Step 2: The BCF may analyze the updated requirements/needs and may decide one or more actions that are to be carried out to satisfy the new requirements of the BNA-1 and corresponding BCAs (17:2). Operations similar of the operations of procedure 1500 (FIG. 15) denoted (17:2) may be carried out.

Step 3: The BCF may interact with BCN-1 and/or interact with other BCNs if the BCF decided to make certain adjustments, e.g., to select a new BCN for serving BNA-1 and its corresponding BCAs (17:3).

Step 4: The BCF may acknowledge whether the updated desired performance needs may be satisfied or not (17:4). The BCF may or may not hide the detailed characteristics of the newly-assigned BCN from the BNA-1 (e.g., the parameters disclosed in connection with the operations of procedure 1200 (FIG. 12) at (12:1)). The BNA-1 and/or corresponding BCAs may make adjustments based on application logic, e.g., to the use blockchain service in a different schedule, which may be a specific implementation.

Representative BNA Registration

A blockchain-enabled system can and/or may support various vertical wireless applications and the enablement layer including BCFs is a generic middleware for providing blockchain as a service to the vertical applications. Accordingly, when a new vertical application is deployed, its corresponding BNA may register to a BCF so that it can utilize the blockchain service. In general, a BNA may be regarded as the manager of a vertical wireless application, and it may provide application processing logic, a list of the associated BCAs, and related policies. Both the BNA and the associated BCAs may be the customers of one or more underlying blockchain systems managed by the BCF.

Representative BNA Registration with BCF for Full Arrangements

When a BNA registers to a BCF, the BNA may rely on the BCF to conduct full arrangements, including:

1) during registration of the BNA, the BNA may specify its application-level requirements for the desired blockchain services. Accordingly, the BCF may select a desired type of BCNs for serving this vertical application.
2) the BCF being responsible for deploying the application logic processing modules, e.g., deploying executable codes of actions (which are to be executed by certain actors).
3) if the BNA needs to interact with communication infrastructure (such as 3GPP system), e.g., to deploy a policy into the communication infrastructure, the BCF may interact with communication infrastructure on behalf of the BNA.

After the BNA registers to the BCF, the BCF becomes the home BCF of the BNA.

Figure 18:
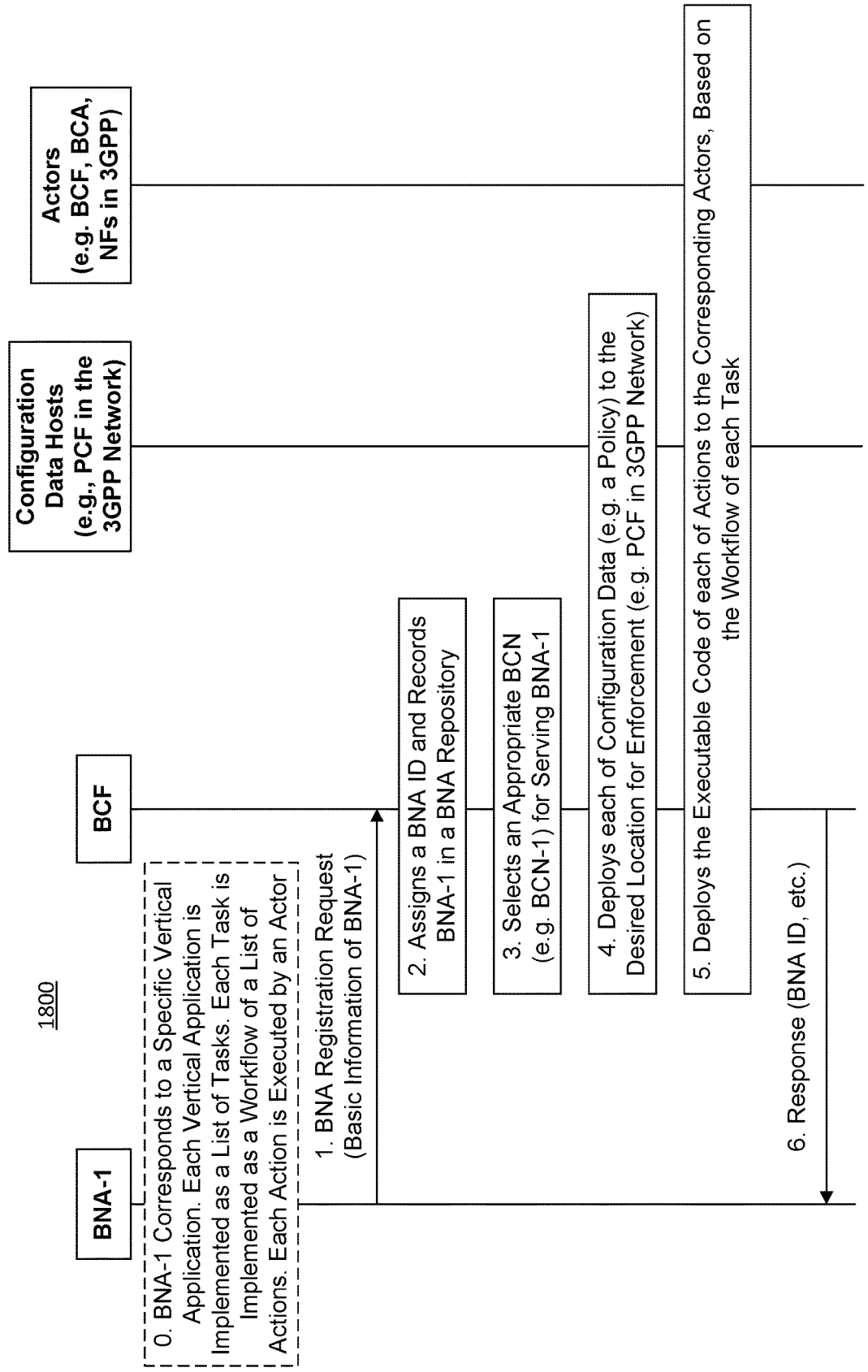
FIG. 18 illustrates an example BNA registration procedure.

FIG. 18 illustrates an example BNA registration procedure 1800. The procedure 1800 is described with reference to the BEWAs architecture 1000 (FIG. 10) and the communications system 100 (FIGS. 1 and 5) for convenience and simplicity of exposition. The procedure 1800 may be carried out using different architectures as well. The procedure 1800 may be suitable (used) for scenarios in which a BNA may register to a BCF with full BCF arrangements.

Pre-condition(s): A BNA (e.g., BNA-1) is a server/manager of a vertical wireless application, which has already discovered a BCF. The BNA-1 may register itself to a BCF for utilizing blockchain services. Each vertical application is implemented as a list of tasks. Each task is implemented as a workflow of a list of actions. Each action is executed by an actor. The actor may be a BNA, a BCA, a BCF or other network function entity in the communication system.

Step 1: The BNA-1 may send a registration request to the BCF along with information regarding the vertical wireless application (such as smart manufacturing and logistics). For example, the registration request may include the following parameters: a first set of information, a second set of information and a third set of information.

The first set of information may include information indicating, concerning, associated with, and/or corresponding to a BNA, corresponding vertical application and/or potential BCAs, such as:

Application Name: The application name parameter(s) may indicate a name of the vertical application.

Registration Credential: The registration credential parameter(s) may include information (e.g., essential information) that is needed for the BCF to validate and register the BNA-1.

Related BCAs: The related BCAs parameter(s) may indicate BCAs that belong to the same vertical application (e.g., the BCAs that may interact with the BCF and the BNA-1 for various processing related to this vertical application). The related BCAs parameter may be a list of identifiers of the related BCAs (e.g., a list of specific BCA-IDs, or a list of WTRU-IDs since BCAs may reside on WTRUs, or a list of manufacture production serial numbers). An example is that in a permissioned or private blockchain system, only the permitted users may access the blockchain serving a particular vertical application. Alternatively, the related BCAs parameter may include one or more filter criteria regarding what kind of BCAs can and/or may interact with the BCF or the BNA-1. In various embodiments, the related BCAs parameter may include a list of identifiers of the related BCAs obtained from a management server of the vertical application.

The second set of information may include indicating, concerning, associated with, and/or corresponding to interoperability, requirements, needs and/or performance (e.g., expected performance) of the desired BCN that the vertical application (e.g., BNA-1) may use, such as:

Desired Blockchain System Type: The desired blockchain system parameter(s) may indicate a desired type of the blockchain system of the BNA-1, such as public chain, private chain, or consortium chain.

Desired Consensus Mechanism: The desired consensus mechanism parameter(s) may indicate a desired type of consensus mechanism of the BNA-1.

Supported Cryptocurrency: The supported cryptocurrency parameter(s) may indicate whether the BNA-1 intends to use a blockchain system intrinsic cryptocurrency. For example, the Bitcoin system is one of the blockchain system supporting cryptocurrency.

Need for New Chain: The need for new chain parameter(s) may indicate whether all the transactions related to the BNA-1 should be stored on a new chain. It is possible that for a given blockchain system, multiple chains may be created and maintained. For example, the data related to the BNA-1 cannot be stored together with data related the BNA-2. In such a case, it may be desired that all the transactions related to the BNA-1 may be stored in a chain-A while all the transactions related to the BNA-1 may be stored in another chain-B and both chains may hosted/run by the same set of blockchain nodes. In an embodiment, if the value of this parameter is True, it may mean the BNA-1 needs a new chain to store its related data. Otherwise, it means BNA-1 does not needs a new chain.

Desired Performance Requirements: The desired performance requirements parameter(s) may indicate desired performance requirements of the blockchain system that the BNA-1 would like to use, such as (i) a desired number of confirmed blocks per hour, (ii) desired transactions per hour, (iii) desired transaction latency (iv) etc.

Number of Allowed BCAs: the number of allowed BCA parameter(s) may indicate a number of BCAs that are associated with BNA-1 and are allowed to use the blockchain system.

The third set of information may include information indicating, concerning, associated with, and/or corresponding to application logic processing, such as:

Application Task List: The application task list parameter(s) may indicate a list one or more of tasks related to the vertical application. The tasks that are listed on the list of tasks may form the application logic processing of a vertical application. In embodiment, for each of the tasks, the application task list parameter(s) may include the following information:

Task ID: The task ID parameter(s) may indicate a specific task ID of this vertical application.

Workflow and actors of the task: The workflow and actors of the task parameter(s) may indicate an entire workflow of a task, e.g., the first actor to take the first action (i.e., to trigger a task execution), and the subsequent actions to be done.

For each action, the application task list parameter(s) may include the following information (e.g., an action typically corresponds to processing conducted by an actor, which is realized by executable code):

Actor: The actor parameter(s) may indicate who is the actor of the action. This information may define the involved actor(s) for a given task. For example, an actor may be any of a BNA, a BCA, a BCF, a network function in the communication infrastructure, etc. As an example, an action-1 in a task flow A by a BCF may be processing a request and sending back a response to BCA-1. A subsequent action after action-1 in the task flow A may be action-2, which is to be done by the BCA-1 (as the actor of action-2). The action-2 includes receiving the response from the BCF and conducting some further processing (by BCA-1).

Executable Code: Each action (which may have an action ID), may be implemented as executable software code. The executable software code may be deployed to a corresponding actor, as defined in the workflow. The executable code parameter(s) may include the executable code and/or may indicate stored executable code and/or a URL for the BCF to download or retrieve the code.

Transaction Format: In the case where the action is to create a blockchain transaction, the transaction format information may indicate that for this particular action, a type of blockchain transaction is to be created if needed, and a format (e.g., an exact format) for the transaction related to this action. For example, the transaction format parameter(s) may include the following information:

Vertical application name or BNA ID: The vertical application name or BNA ID parameter(s) may indicate any of a name of a particular vertical application, an identifier of a vertical application, a pre-provisioned BNA-ID, and a BNA-ID assigned by a BCF.

Task ID: The Task ID parameter(s) may indicate an identifier of a task. Alternatively, the Task ID parameter(s) may be a specific task name. Overall, the information in this parameter is to show (may indicate) the transaction to be created is related to which specific process.

Action ID: The Action ID parameter(s) may indicate an identifier of an action of a task. Alternatively, the Action ID parameter(s) may be a specific action name. Overall, the information in this parameter is to show (may indicate) the transaction to be created is related to which specific action/operation.

Actor ID: In general, the actor ID parameter(s) may indicate an identifier of an actor, it may be an actor ID, an actor specific name, an actor unique serial number, an actor MAC address, a production manufacture serial number, etc. The actor may be, e.g., typically be a BCF given the BCF may interact with the underlying BCN to insert a new transaction into the blockchain.

Transaction creation time: The transaction creation time parameter(s) may indicate when a blockchain transaction is created.

Other application-specific data if applicable

Configuration Data: For a given action to be taken, it is possible that during the processing of this action, configuration data may be referenced. One example of the configuration data may be a policy and an action may refer to enforcing a policy. For each particular information element of configuration data, the configuration data parameters(s) may include any the following information:

Data Name: e.g., a certain policy name.

Data Contents: real data content. For example, it may be a detailed policy.

Data Deployment Location: e.g., a blockchain-related policy may be stored in a BCF (i.e., the policy may be enforced by the BCF) or the policy may be directly stored in communication infrastructure, e.g., in the PCF of the 3GPP network. For example, assuming a transaction is to describe a status of a BCA and one policy (e.g., policy-X) may be that a transaction should not be created if the BCA (hosted by a WTRU) is located in a specific region (due to the privacy issue). In such a situation, it may be desired if policy-X may be directly deployed into the 3GPP network (e.g., deployed to PCF) so that other 3GPP network functions may easily retrieve policy-X and enforce it automatically when the WTRU moves to the specific region as described in policy-X.

Step 2: The BCF may examine the information sent from the BNA-1 and may validate the BNA-1 as a valid BNA that represents a vertical application based on the registration credential parameter. The BCF may hosts a local BNA repository, and it may create a new BNA record for BNA-1 and add the related information as specified in step 1 for future use (18:2). The BCF may assign a BNA ID for BNA-1 (18:2).

Step 3: The BCF may analyze the desired performance requirements sent from the BNA-1, check its BCN repository, and select an appropriate BCN for serving the needs of the BNA-1 (18:3). For example, the BCN-1 may be selected as an appropriate BCN for serving all the blockchain-related processing of the BNA-1. In an advanced scenario, the BCF can and/or may choose an appropriate BCN for a specific task of a vertical application, or for a specific action of a task (e.g., more fine-grained approaches for using the blockchain services). In another advanced scenario, in case the BCF cannot find a desired BCN for serving BNA-1 in its own BCN repository, it may ask other BCFs for help to determine whether another BCF manages a certain BCN that can and/or may serve the BNA-1 (As a result, then BNA-1 may choose to register to the later BCF).

Step 4: For each of configuration data, the BCF conduct various deployments (18:4). For example, a particular information element of configuration data may be a policy, and such a policy needs to be deployed directly into the 3GPP network for enforcement. The BCF may conduct this task on behalf of BNA-1 to interact with the 3GPP network and deploy such a policy into a PCF of the 3GPP network, or to store in the UDM of the 3GPP network. In another example, the BCF may install such a policy locally, or to a BCC and/or another BCF. The BCF may generate new policy rules based on the configuration data and install these new policy rules to a BCN, a BCC, another BCF, and/or a PCF in the 3GPP network.

Step 5: For each of the tasks specified in the request message of step 1, the BCF may conduct certain deployments (18:5). For example, each task is involved with a workflow of actions, and the actions are done by different actors. Accordingly, the BCF may deploy the executable code of each action to the corresponding actor. If certain configuration data may be used during an action, the BCF also needs to configure the actor so that the actor knows where to obtain needed configuration data, which was deployed in step 4.

Step 6: The BCF may send a confirmation to BNA-1 in order to confirm its registration (18:6). The BCF becomes the home BCF of BNA-1, belonging to the same vertical application.

It can be seen that in the above procedure, the BCF has multiple roles, such as: 1) to manage and interact with BCNs for serving the BNA and corresponding BCAs; 2) to interact with communication infrastructure (e.g., deploy a policy to 3GPP network on behalf of BNA/BCAs); 3) to deploy executable code of each action to the corresponding actor; and 4) to conduct an action (e.g., executing an application-logic code, collecting certain data from 3GPP network, or storing a blockchain transaction in a BCN on behalf of a BNA). Alternatively, BNA-1 may send the third set of information (corresponding to application logic processing) to the BCF using separate steps after it registers with the BCF. After receiving the application logic processing information via the separate steps, BCF may perform step 4 and Step 5 as disclosed above.

Representative BNA Registration with BCF for Partial Arrangements

In this section, when a BNA registers to a BCF, it relies on the BCF to conduct partial arrangements. For example, during the BNA registration, it may (e.g., may only) specify its application-level requirements for the desired blockchain services. Accordingly, the BCF may select the desired type of BCNs for serving this vertical application. All other matters may be handled by the BNA itself, e.g., the BNA itself is responsible for deploying the application logic processing modules, e.g., deploying executable codes of actions (which are to be executed by certain actors). if the BNA needs to interact with communication infrastructure (such as 3GPP system), e.g., to deploy a policy into the communication infrastructure, the BNA may interact with communication infrastructure directly.

Figure 19:
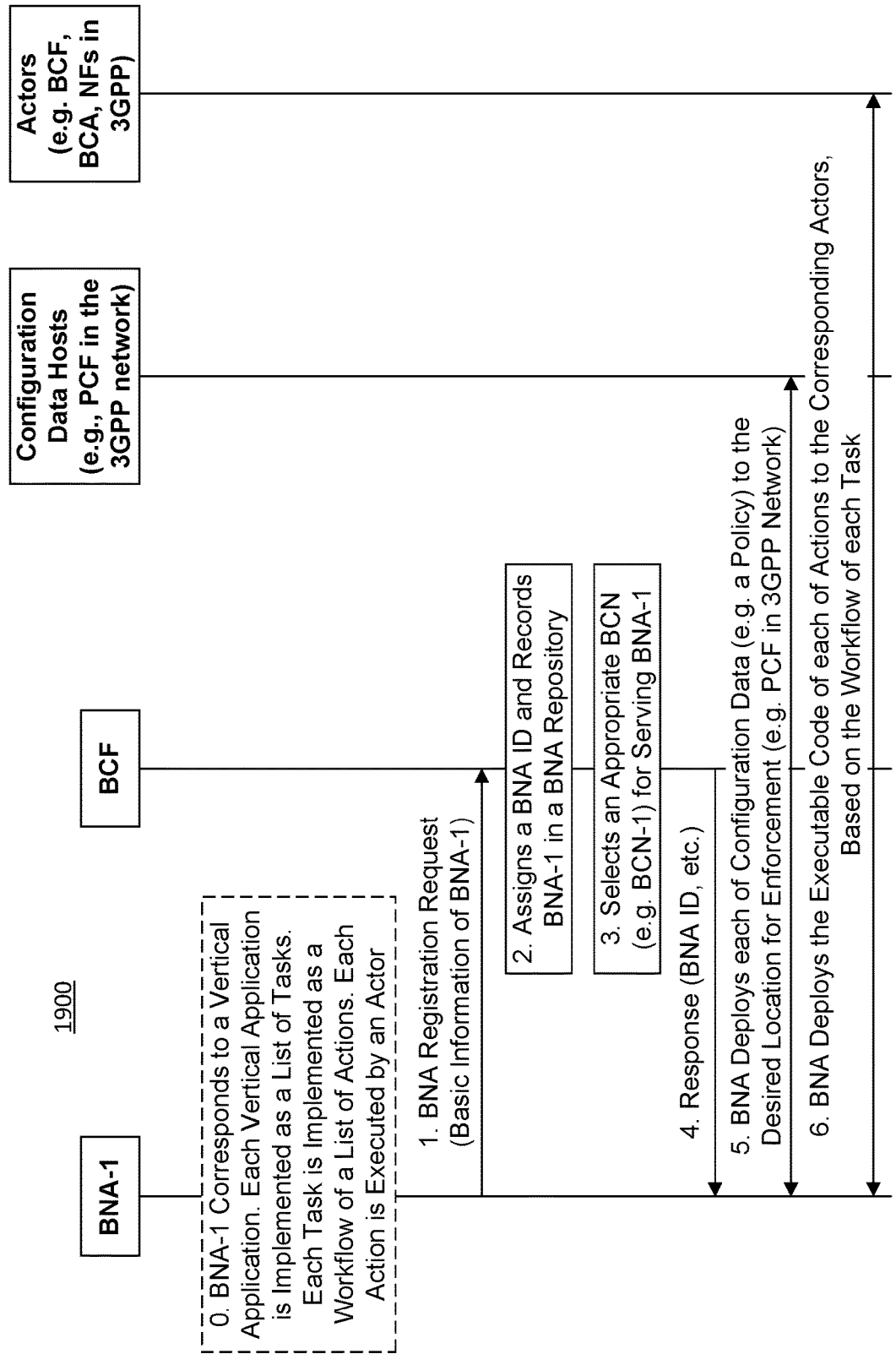
FIG. 19 illustrates an example BNA registration procedure.

FIG. 19 illustrates an example BNA registration procedure 1900. The procedure 1900 is described with reference to the BEWAs architecture 1000 (FIG. 10) and the communications system 100 (FIGS. 1 and 5) for convenience and simplicity of exposition. The procedure 1900 may be carried out using different architectures as well. The procedure 1900 may be suitable (used) for scenarios in which a BNA may register to a BCF with partial BCF arrangements.

Pre-condition(s): A BNA (e.g., BNA-1) is a server/manager of a specific vertical wireless application, which has already discovered a BCF. BNA-1 intends to register itself to a BCF for leveraging blockchain services. Each vertical application is implemented as a list of tasks. Each task is implemented as a workflow of a list of actions. Each action is executed by an actor. An actor may either be a BNA, a BCA, a BCF or any other network function entity in the communications system.

Step 1: The BNA-1 may send a BNA registration request to the BCF along with information regarding the vertical wireless application (such as smart manufacturing and logistics). For example, the registration request may include the following parameters:

A first set of information that may include information indicating, concerning, associated with, and/or corresponding to a BNA, corresponding vertical application (e.g., BNA-1) and/or potential BCAs, such as: as described in Step 1 of procedure 1800 (FIG. 18).

A second set of information that may include indicating, concerning, associated with, and/or corresponding to interoperability, requirements, needs and/or performance (e.g., expected performance) of the desired BCN that the vertical application (e.g., BNA-1) may use, such as described in Step 1 of procedure 1800 (FIG. 18).

The third set of information that may include information indicating, concerning, associated with, and/or corresponding to application logic processing, such as: third set of information described for Step 1 of FIG. 18 (except that the BNA-1 does not need to specify the "configuration data" part).

Step 2: Same as Step 2 of FIG. 18.
Step 3: Same as Step 3 of FIG. 18.
Step 4: The BCF may send a confirmation potentially with an assigned BNA ID for BNA-1 to the BNA-1 in order to confirm its registration.

Step 5: To run the vertical application, certain configuration data may be needed. Therefore, for each configuration data, BNA-1 may conduct certain deployments. For example, a piece of configuration data may be a policy, and such a policy needs to be deployed directly into the 3GPP network for enforcement. Accordingly, the BNA-1 may conduct this task to interact with the 3GPP network and deploy such a policy into PCF of the 3GPP network, or to store in the UDM of the 3GPP network.

Step 6: For each of the tasks, BNA-1 may conduct certain deployments. For example, each task is involved with a workflow of actions, and the actions are done by different actors. Accordingly, the BNA-1 may deploy the executable code of each action to the corresponding actor. In particular, if certain configuration data may be used during an action, the BNA-1 may configure the actor so that the actor knows where to obtain needed configuration data.

Representative BCF Discovery and Selection

There may be different system settings and assumptions for BCF discovery and selection. Therefore, this section proposes solutions to BCF discovery in three different scenarios and each of the scenarios has its own assumptions and settings.

Representative Scenario 1: When a BCA can Associate with Multiple BCFs for Different Purposes In this scenario, we consider the following system settings and assumptions:

A BCC-1 on a WTRU may register to a BCF, which is a first-contact BCF (to be defined next) for BCAs served by BCC-1 (e.g., based on its current location).

Any BCA (e.g., BCA-1) served by BCC-1 may register to its home BCF (to be defined next), which is the BCF that its corresponding BNA is registered with.

In addition, any BCA (e.g., BCA-1) served by BCC-1 may register to a visited BCF (to be defined next), which may be BCF on the edge or other places closer to BCA-1 and may provide the equivalent blockchain service to BCA-1 as its home BCF.

This operation is mainly related to WTRUs that hosts BCAs. Typically, for a given BCA (e.g., BCA-1), it may have a different type of discovery with various purposes, which are listed below:

Home BCF Discovery: In this type of discovery, the BCA-1 is going to find a qualified BCF as its home BCF for BCA Registration (this BCF is defined as the home BCF of BCA-1) if this is the first time that BCA-1 comes into the system.

Visited BCF Discovery: In this type for discovery, the BCA has already registered to a home BCF (which hosts the registration record of BCA-1), but now the BCA intends to find another BCF (which is defined as its visited BCF) for utilizing the blockchain service. For example, a visited BCF may be the one deployed closer to the edge, or closer to the current location of the BCA and may provide blockchain services to the BCA and help the BCA to conduct blockchain-related operations (e.g., the visited BCF is managing an underlying BCN, which is a desired BCN of the BCA).

Accordingly, for a given BCA-1 at its current location, there may be three different types of BCFs:

Home BCF: The home BCF (e.g., BCF-1) is the one that the corresponding BNA registered with. In this home BCF, it hosts a BNA registration repository, as well as a BCA registration repository. The home BCF may interact with underlying BCNs which provide blockchain services to BCA-1 and its corresponding BNA.

Visited BCF: Due to the movement of the BCA-1, the BCA-1 may be directly served by a visited BCF. The reason is that as mentioned earlier, the underlying blockchain system is a distributed system and has many peer BCNs. For example, the home BCF (e.g., BCF-1) is able to interact with BCN-1 for serving BCA-1, and BCN-1 is a node from the blockchain system 1 (i.e., having, an affiliated blockchain system ID ABS-ID-1). For the blockchain system having ABS-ID-1, it may have another peer node, e.g., BCN-2, which is managed by another BCF-2. In particular, BCF-2 is deployed at a location that is closer to the current location of BCA-1. Therefore, if BCA is to conduct any blockchain-related operation (e.g., retrieving transactions), it is desired that BCA-1 may try to discover BCF-2 (as its visited BCF) and try to use BCF-2 for conducting the blockchain related operations. In this way, it can save significant communication costs for communicating with its remote home BCF.

First-contact BCF: The first-contact BCF is the BCF that provides a first-hop connection to the BCA-1 at its current location. It is possible for a visited BCF to be at a location closer to the BCA-1 than its home BCF, but not be in an immediate proximity of the BCA-1. The BCA-1 may rely on its first-contact BCF deployed at its current location (or the corresponding geographical region) to further discover either its home BCF (for home BCA registration) or a visited BCF (for conducting blockchain-related operations). Alternatively, the role of the first-contact BCF may be replaced with other entities as long as it can help BCA-1 to find its home BCF or the visited BCF. Given a BCA-1, its first-contact BCF may be the one registered by its corresponding BCC. In other words, the BCC-1 hosting BCA-1 may register to a BCF in proximity and such a BCF may be regarded as the first-contact BCF of BCA-1. For example, BCC-1 may broadcast a discovery message to the network in order to discover an available BCF covering its current location (as shown in Step 0 of FIG. 20).

The home BCF, visited BCF, and first contact BCF are all logical roles, and may be co-located or act as the same physical BCF instance. For example, for a given BCA, it is possible that its first-contact BCF is also its visited BCF.

Home BCF Discovery for BCA Registration/Association Purpose

Figure 20:
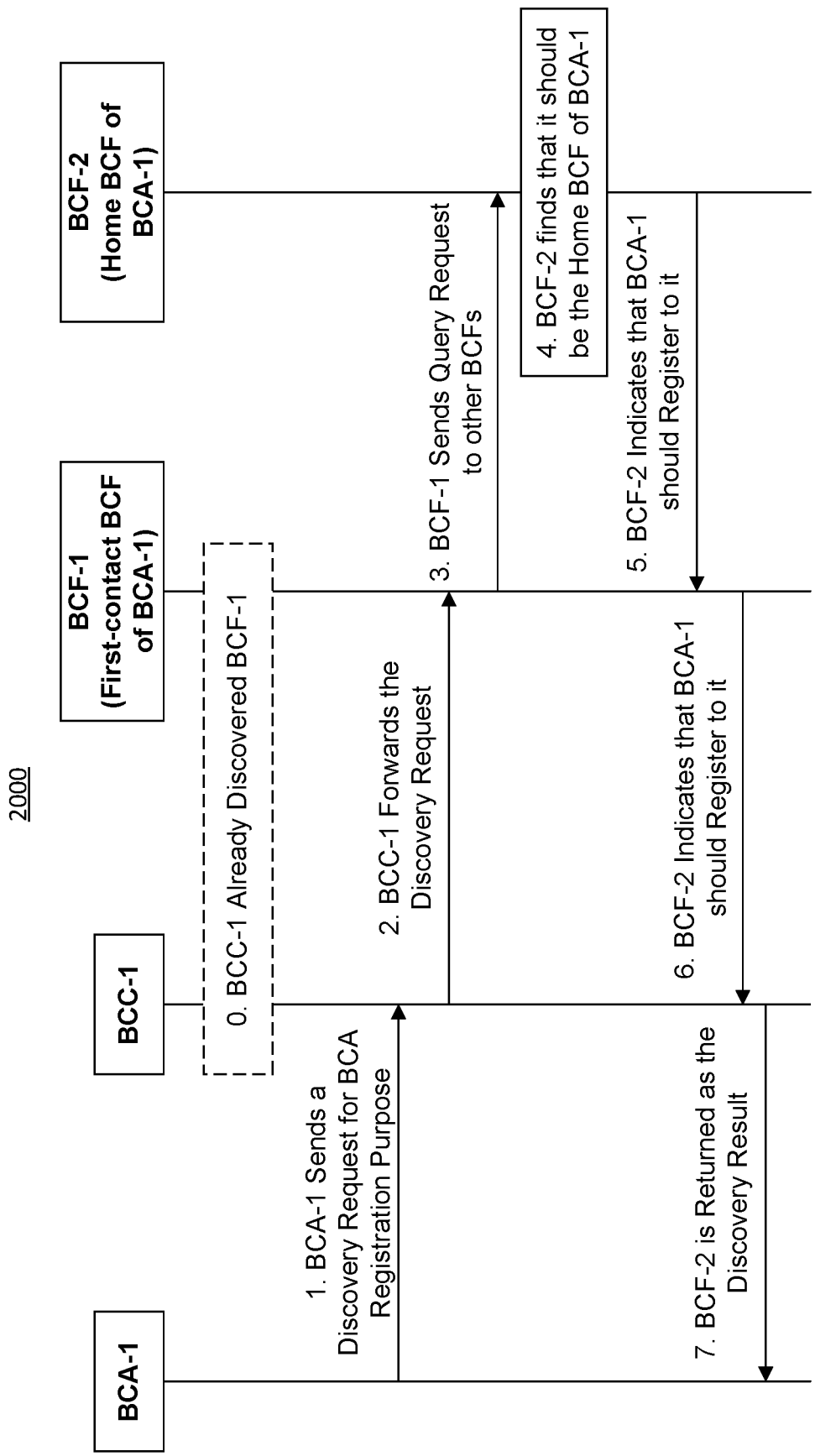
FIG. 20 illustrates an example procedure for home BCF discovery.

FIG. 20 illustrates an example home BCF discovery procedure 2000. The procedure 2000 is described with reference to the BEWAs architecture 1000 (FIG. 10) and the communications system 100 (FIGS. 1 and 5) for convenience and simplicity of exposition. The procedure 2000 may be carried out using different architectures as well. The procedure 2000 may be suitable (used) for scenarios in which home BCF discovery procedure for BCA registration purpose in Scenario 1 is illustrated in FIG. 20.

Pre-condition(s): A BCC (e.g., BCC-1) has already discovered a BCF and registered to it (e.g., BCF-1) based on the current location of the WTRU that is hosting a BCC-1 and a BCA-1. The BCF-1 may be a first-contact BCF for the BCA-1. There are multiple BCFs in the system and they are known to each other due to, e.g., periodic information exchanges.

Step 1: BCA-1 may send a discovery request to BCC-1 on the same WTRU (in a more general case, BCC-1 may be hosted on other places), and this request may include the following parameters:

Discovery Purpose: This is to indicate the purpose of the discovery. In this case, the purpose is "BCA registration". Therefore, BCF-1 knows that BCA-1 just comes into the system and intends to find its home BCF.

Identity Information: This parameter is to show the identity of BCA-1, i.e., indicate who is the BCA-1. For example, if the BCA-1 is pre-provisioned with a BCA ID, then it may indicate its BCA ID in this parameter so that this information may be utilized during the discovery in order to identify the home BCF of BCA-1.

Registration Credential: This parameter includes essential information (such as identification of BCA-1) that is needed for the home BCF to validate BCA-1.

Application Name: This is to indicate the name of the vertical application, such as smart manufacturing and logistics. A BCA and its BNA have the same application name. This information may be utilized during the discovery in order to identify the home BCF of BCA-1

BNA ID: This is to indicate the identifier of BCA-1's corresponding BNA. This information may be utilized during the discovery in order to identify the home BCF of BCA-1.

Step 2: BCC-1 may send (forward) the request to BCF-1.

Step 3: BCF-1 may send the query request to other BCFs, along with the identification information of BCA-1. Typically, BCF-1 may request other peer BCFs to check their respective BNA registration repositories and to identify whether BCA-1 is included in the "Related BCAs" of a vertical wireless application represented/registered by a BNA (e.g., BNA-1).

Step 4: BCF-2 may receive the query request from BCF-1 and may check its BNA registration repository. In particular, BCF-2 finds a match in the sense that BCA-1 is included in the "Related BCAs" parameter of a BNA-1 representing a particular vertical wireless application. Or the identification of BCA-1 meets the filter criteria as indicated in the "Related BCAs" parameter, and the identification of BCA-1 may refer to BCA-ID (when BCA may be pre-provisioned one), or a manufacture production serial number (when BCA does not have an assigned BCA-ID yet).

As a result, it means that BCA-1 is a client-side entity of this vertical application, and BCF-2 is the home BCF of BCA-1.

Step 5: BCF-2 may send back its response to BCF-1 and indicate that BNA-1 has been identified in its BNA registration repository and BCA-1 should register with BCF-2.

Step 6: BCF-1 may send a discovery response to BCC-1 and indicate that BCF-2 is identified, which should be the home BCF of BCA-1. BCA-1 may conduct the BCA registration process to BCF-2.

Step 7: BCC-1 may send (forward) the response to BCA-1.

Figure 21:
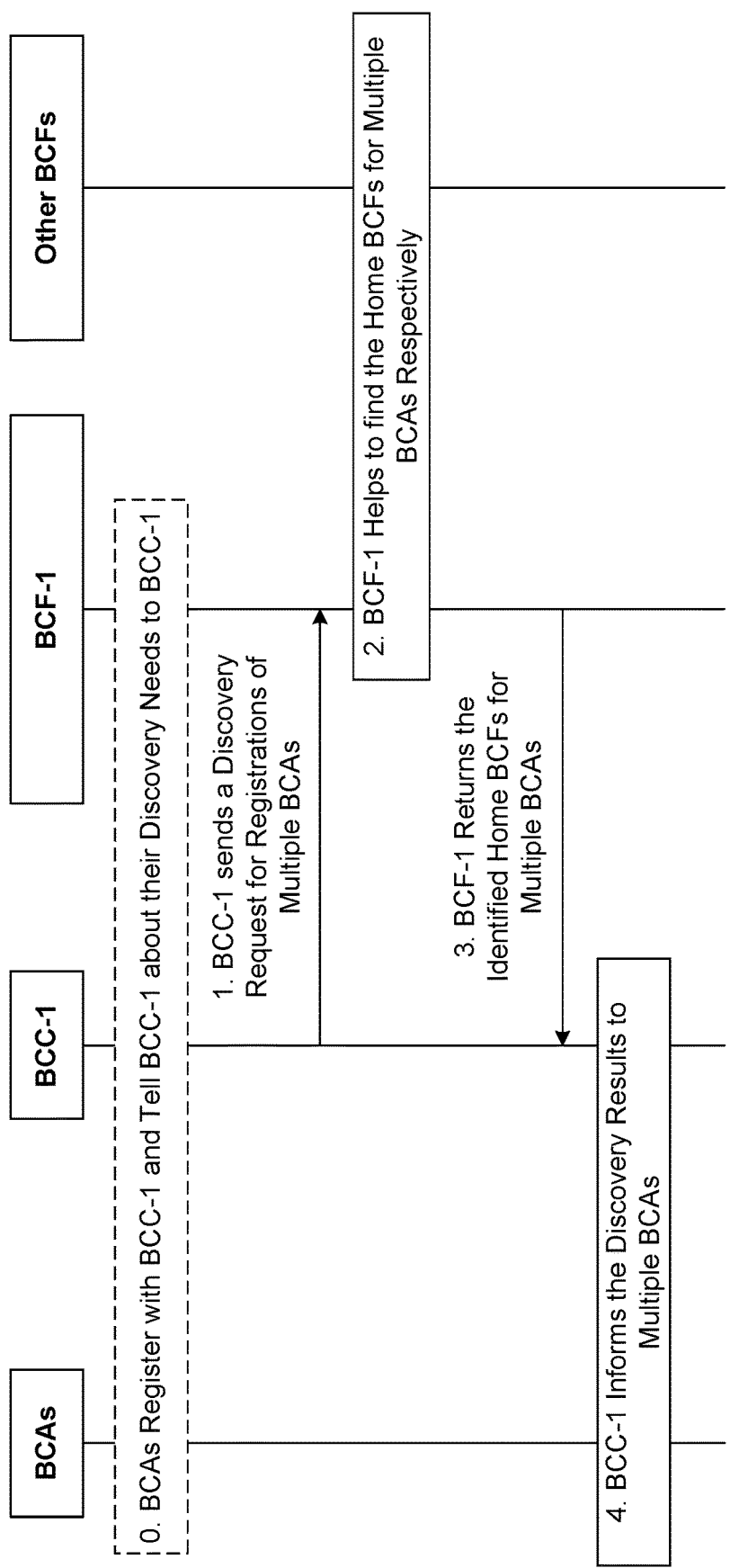
FIG. 21 illustrates an example procedure for home BCF discovery.

An alternate procedure is that in Step 1, the discovery request is initiated by BCC-1 and the detailed procedure is illustrated in FIG. 21. This applies to the case where BCC-1 may serve multiple BCAs (such as BCA-1, BCA-2, BCA-3, which are on the same WTRU and served by the same BCC-1) and each of them intends to discover their respective home BCFs. Accordingly, BCC-1 may issue a single discovery request to BCF-1, which is to identify multiple BCFs. In this case, Step 3-Step 5 shown in FIG. 20 may be conducted multiple times (i.e., the Step 2 in FIG. 21) and each time is to find a home BCF for a specific BCA.

Another way for a BCA to find its home BCF is that BCA may be pre-provisioned with the access address of its corresponding BNA. The BCA may contact its BNA to ask for home BCF registration instructions. Accordingly, BNA may provide BCA with the address of the home BCF. In this way, the BCA may find its home BCF.

Representative Visited BCF Discovery for using Blockchain Service Purpose

Figure 22:
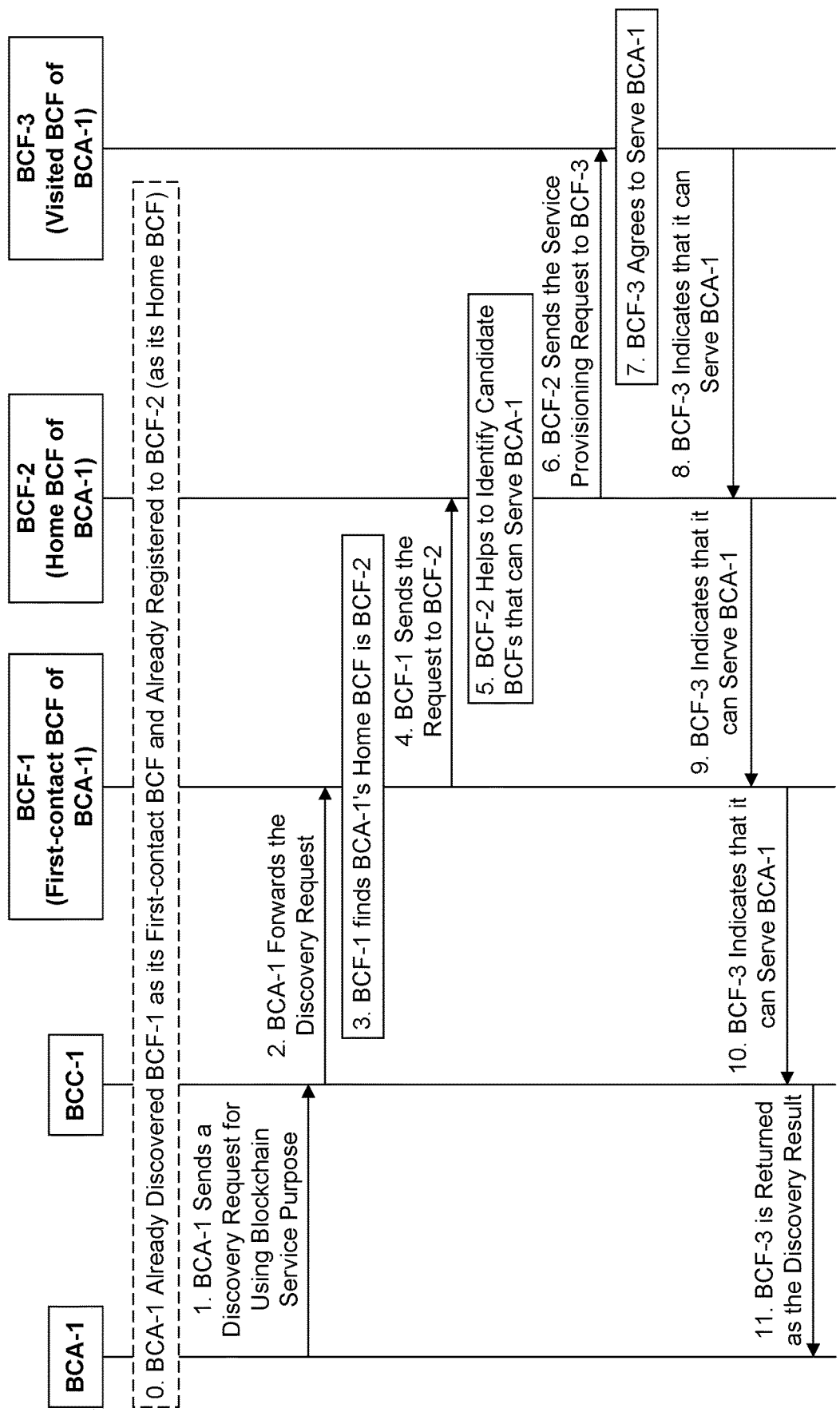
FIG. 22 illustrates an example procedure for visited BCF discovery.

The visited BCF discovery procedure for using blockchain service purpose is illustrated in FIG. 22.

Pre-condition(s): A BCC node (e.g., BCC-1) has already discovered a BCF and registered to it (e.g., BCF-1) based on the current location of the WTRU hosting BCC-1 and BCA-1. BCF-1 is the first-contact BCF to BCA-1. The BCA-1 may be registered with its home BCF (e.g., BCF-2).

Step 1: BCA-1 may send a discovery request to BCC-1 and this request may include the following parameters:

Discovery Purpose: This is to indicate the purpose of the discovery. In this case, the purpose is "Blockchain Service Utilization". Therefore, BCF-1 knows that BCA-1 may be registered with its home BCF and now intends to use blockchain service.

BCA ID: This parameter is to show the identity of BCA. In general, its home BCF may assign a BCA ID during the BCA registration process.

Blockchain-related Operations to be Conducted: This is to indicate the detailed information about what kinds of blockchain operations are to be conducted.

Home BCF: This is to indicate the home BCF of BCA-1 (e.g., BCF-2).

The Current Location: This is to indicate the current location of BCA-1.

Step 2: BCC-1 may send the request to BCF-1.

Step 3: BCF-1 may examine the request and may know that BCA-1 wants to use the blockchain service. BCF-1 may contact BCF-2 and let BCF-2 make further decisions. Optionally, it is possible that BCF-1 may have some information about other BCF in its proximity, therefore, BCF-1 may send information indicating one or more candidate BCFs for BCF-1 for selection. Step 4: BCF-1 may send a request to BCF-2 and request carries the information sent from BCA-1.

Step 5: BCF-2 may receive the request and conduct the following processing:

Decides whether the operations to be requested by BCA-1 is allowed or not. This may be based on the detailed information about application logic processing, which is obtained during the BNA registration.

Finds out which specific BCN managed by BCF-2 is responsible for serving the blockchain operations of BCA-1 (e.g., BCN-1). The BCF-2 may find out the affiliated blockchain system ID (ABS-ID) of the blockchain system that BCN-1 belongs to.

Based on the current location of BCA-1, it decides an appropriate BCF (e.g., based on its own information or based on some information sent from BCF-1 in the case that BCF-1 has sent a list of candidate BCFs in Step 3), e.g., the potential BCFs that are deployed in that proximity of BCA-1 and have the needed blockchain resources needed by BCA-1 (e.g., hosting the same type of BCN as BCN-1). It is also possible that BCF-2 may also decide that it can and/or may serve BCA-1 by itself. In this case, it means no visited BCF is needed for serving BCA-1 at this time. BCF-2 may serve BCA-1 by itself if such a BCF-3 cannot be identified.

Step 6: BCF-2 may send the service provisioning request to the potential BCFs, along with the following information:

BCA ID: This parameter is to show the identity of BCA-1.

The affiliated blockchain system ID (ABS-ID): This is to indicate what type of blockchain system that BCA-1 intends to use. For example, in the last step, it is identified that BCA should use the blockchain system having ABS-ID-1.

Blockchain Operations to be Conducted: This is to indicate the detailed information about what kinds of blockchain operations are to be conducted.

Step 7: BCF-3 may receive the request, check its BCN registration repository, and identify that one of its managed BCNs (e.g., BCN-2) is from the same blockchain system that BCA-1 intends to use. In other words, the affiliated blockchain system ID of BCN-2 is also ABS-ID-1. The BCF-3 may decide that it can serve the requests from BCA-1 for its blockchain-related operations.

Step 8: The BCF-3 may acknowledge to BCF-2 that BCA-1 can and/or may send its requests for blockchain-related operations to BCF-3 for processing.

Step 9: The BCF-3 may acknowledge to BCF-1 that BCA-1 can and/or may send its requests for blockchain operations to BCF-3 for processing.

Step 10: The BCF-1 may acknowledge to BCC-1 that BCA-1 can and/or may send its requests for blockchain operations to BCF-3 for processing.

Step 11: The BCC-1 may acknowledge to BCA-1 that BCF-3 has been identified and BCA-1 can and/or may send its requests for blockchain operations to BCF-3 for processing.

In the above procedure, it is the home BCF to find an appropriate visited BCF (as shown in Step 5). Alternatively, BCF-1 may just retrieve essential information from BCF-2 and let BCF-1 find an appropriate visited BCF for BCA-1. In that case, Step 6 may be conducted by BCF-1 once it identified an appropriate visited BCF.

In addition, once the visited BCF (i.e., BCF-3) starts to serve BCA-1, it may report the service status/data/performance to the home BCF of BCA-1 and let the home BCF of BCA-1 to conduct some management, such as charging. The home BCF may collaborate with the visited BCF. For example, certain access control processing may still have to be done by the home BCF and the visited BCF only conducts blockchain-related processing. Another example, if visited BCF cannot serve BCA-1 temporarily for certain blockchain operations, and such requests may still be sent back to the home BCF for processing.

Figure 23:
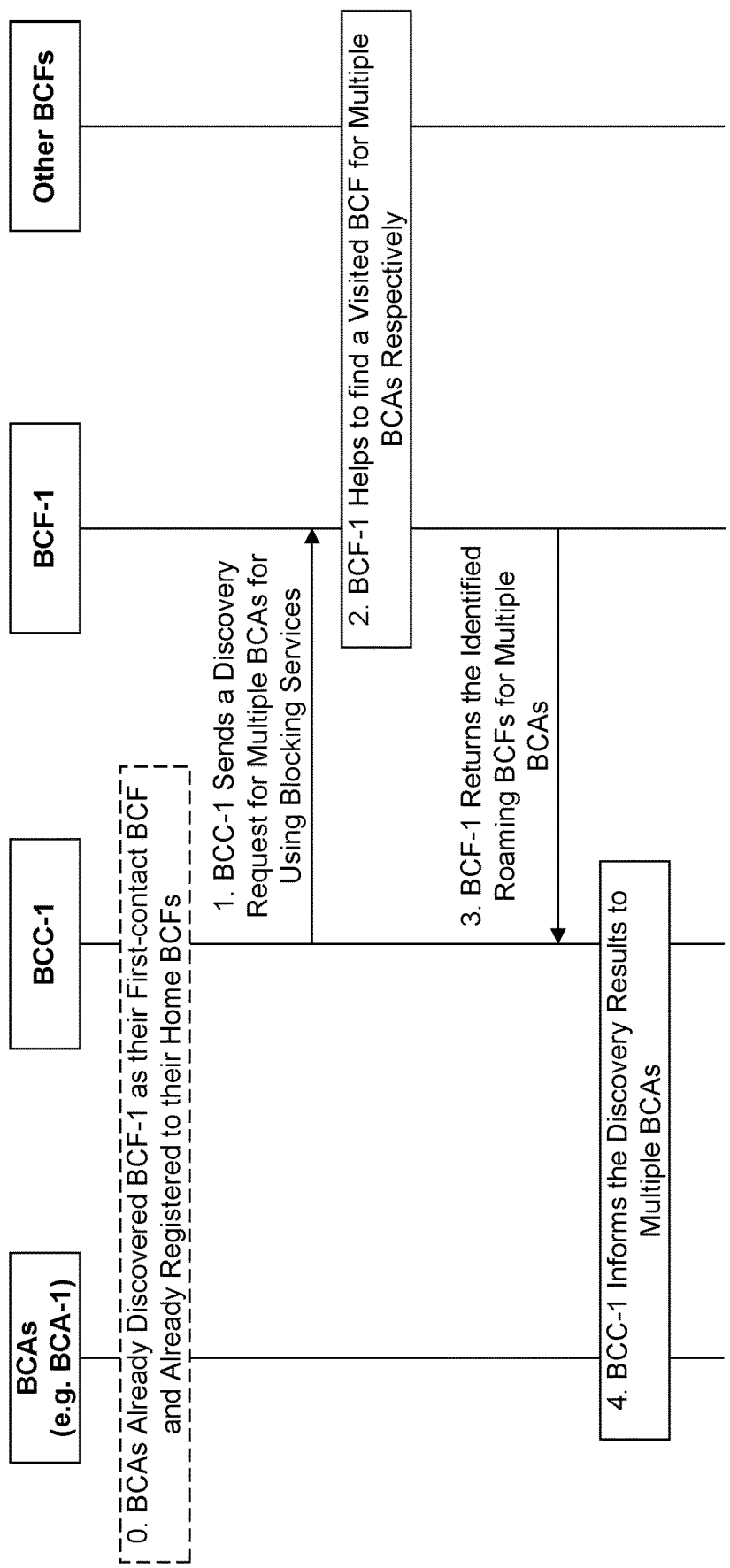
FIG. 23 illustrates an example procedure for visited BCF discovery.

An alternate procedure is that in Step 1, the discovery request is initiated by BCC-1 and the detailed procedure is illustrated in FIG. 23. This applies to the case where BCC-1 may serve multiple BCAs (such as BCA-1, BCA-2, BCA-3 which are on the same WTRU and served by the same BCC-1) and each of them intends to discover their respective visited BCFs. Accordingly, BCC-1 may issue a single discovery request to BCF-1, which is to identify multiple visited BCFs. In this case, Step 3-Step 9 shown in FIG. 22 may be conducted multiple times (i.e., the Step 2 in FIG. 23) and each time is to find a desired visited BCF for a specific BCA.

FIG. 23: illustrates an example for Visited BCF Discovery (For using Blockchain Service Purpose) (BCC-initiated Discovery).

Representative Scenario 2: When a BCA can Associate with Only One BCF at a Time

In this scenario, the following are examples of system setting and assumptions:

A BCC on a WTRU (e.g., BCC-1) does not have a registration to a BCF.

A BCA served by BCC-1 may register to a BCF in order to use the blockchain service.

A BCA can and/or may only register or associate with one BCF at a time. In particular, the BCA can or may associate with the BCF (e.g., BCF-1), with which its corresponding BNA has been registered, for all the time. If that is the case, it means that BCF-1 may always be the only BCF for providing blockchain service for all the BCAs and the BNA of a particular vertical wireless application. Alternatively, a decoupled approach is also possible, in which BCA-1 does not have to register with the same BCF registered by its corresponding BNA. Instead, BCA-1 may associate with a different BCF (e.g., BCF-2), e.g., BCF-2 may provide the same blockchain service (e.g., the same type of BCN) as BCF-1 and/or BCF-2 is deployed closer to BCA-1.

BCC-1 just help in forwarding the requests from hosted BCA to their targeted BCFs.

In Scenario 2, BCF discovery is only for BCA registration, i.e., the BCA-1 is going to find a qualified BCF for BCA Registration. In other words, the logical roles such as "first-contact BCF", "home BCF" and "visited BCF" do not exist in Scenario 2.

Figure 24:
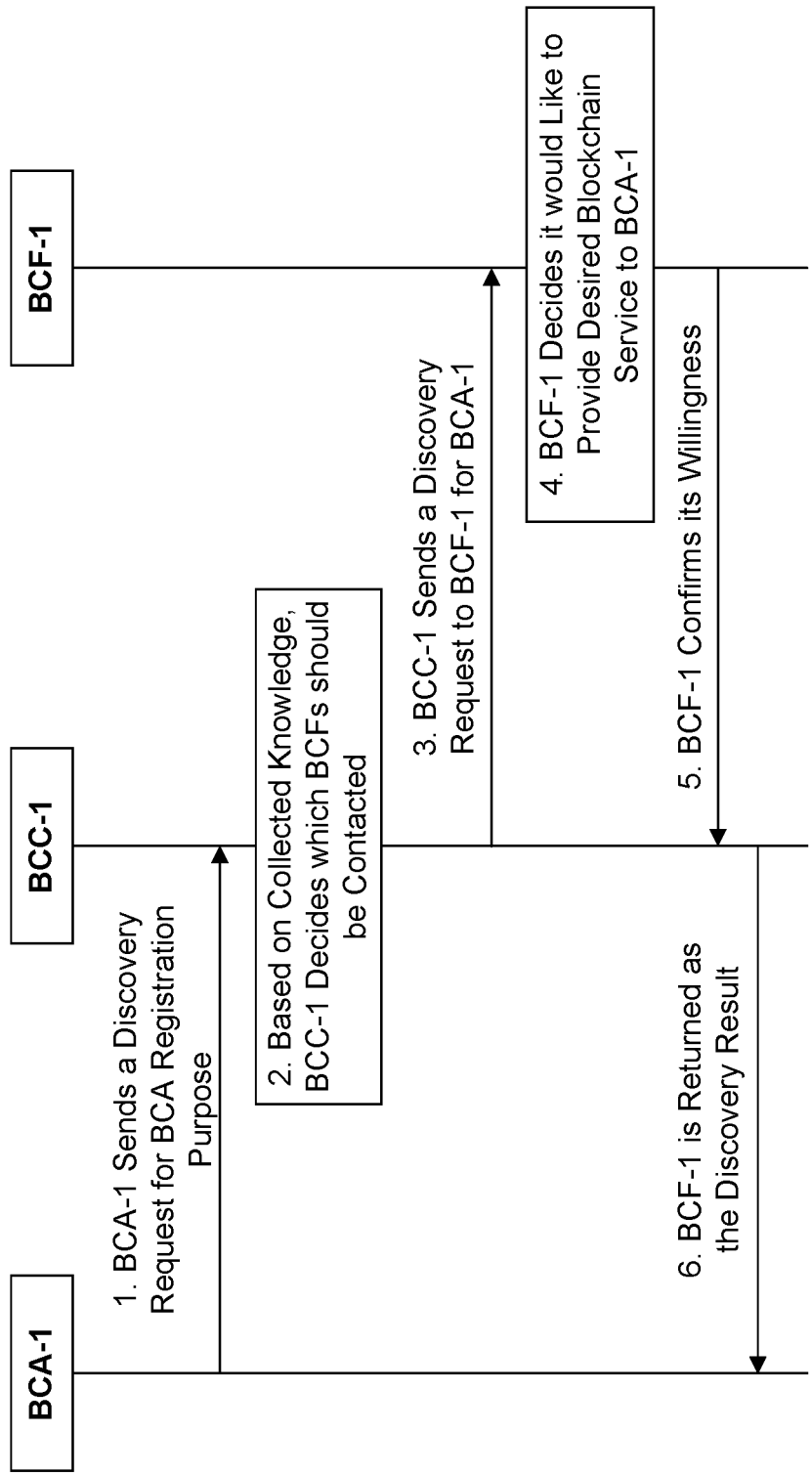
FIG. 24 illustrates an example procedure for BCF discovery.

The BCF discovery procedure for BCA registration purpose in Scenario 2 is illustrated in FIG. 24.

Step 1: BCA-1 may send a discovery request to BCC-1 on the same or different WTRU and this request may include the following parameters:

Identity Information: This parameter is to show the identity of BCA, i.e., indicate who is the BCA-1. For example, if the BCA-1 is pre-provisioned with a BCA ID, then it may indicate its BCA ID in this parameter so that this information may be utilized during the discovery in order to identify a BCF which BCA-1 can and/or may register itself to.

If BCA-1 already knows the basic information of its corresponding vertical application (e.g., through pre-provisioning, or a previous registration with another BCF), the following information may be indicated:

Application Name: This is to indicate the name of the vertical application that BCA-1 belongs to.

Corresponding BNA ID: This is to indicate who is the server-side BNA of BCA-1.

If BCA-1 already knows what type of blockchain service it needs (e.g., through pre-provisioning, or through a previous registration with another BCF), it may indicate the following information regarding the desired BCN it would like to use:

BCN Type: This is to indicate what type of BCN that was selected to provide the blockchain service to BCA-1 and its corresponding BNA (this was decided during the BNA registration process).

Registered BCF of the Corresponding BNA: This is to indicate the ID of the BCF that the corresponding BNA of BCA-1 has registered with (through the BNA registration process).

Step 2: BCC-1 may host a BCF list, which stores the available BCFs at the current location (such a list may be pre-provisioned or obtained through local BCF broadcasting received by BCC-1 at its current location).

Step 3: BCF-1 may send the query requests to other BCFs (e.g., BCF-1) in the list, along with the information indicated in Step 1.

Step 4: BCF-1 may receive the query request from BCC-1. In particular, BCF-1 may manage the same type of BCN (as indicated by the BCN Type parameter in Step 1) that was used to serve its corresponding BNA of BCA-1. Optionally, the BCF-1 may first contact the registered BCF of the Corresponding BNA of BCA-1 (as indicated by the "Registered BCF of the Corresponding BNA" parameter in Step 1) for more information. BCF-1 may decide that it would like to serve BCA-1 since it can and/or may provide equivalent blockchain service to BCA-1.

Step 5: BCF-1 may send back its response to BCC-1 and indicates that it is willing to accept the registration of BCA-1.

Step 6: BCF-1 may send a discovery response to BCC-1 and indicate that BCF-1 is identified.

Figure 25:
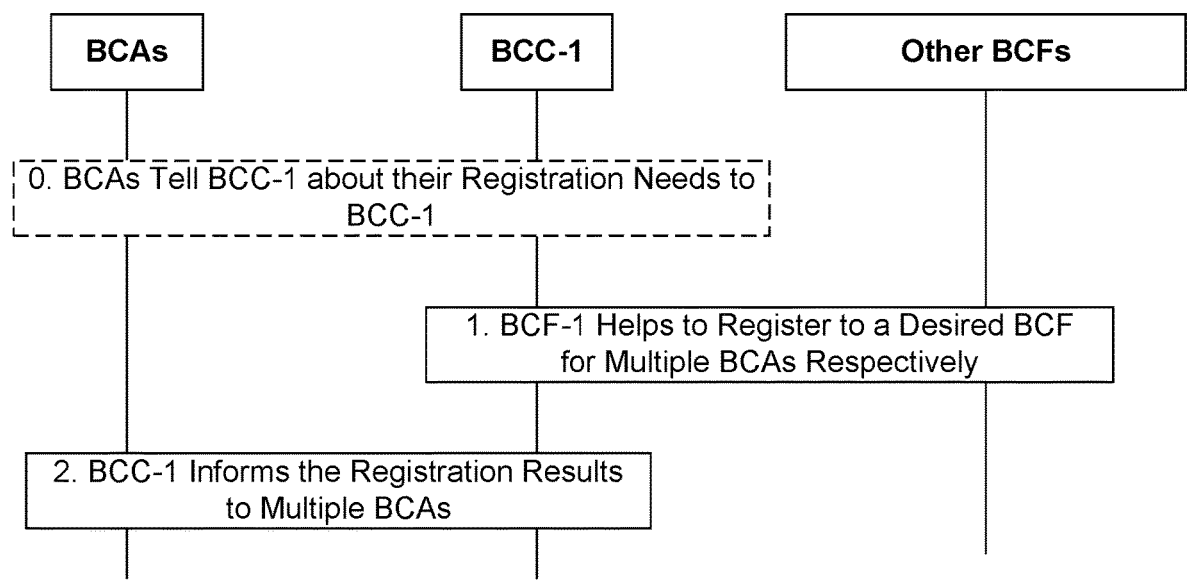
FIG. 25 illustrates an example procedure for BCF discovery.

FIG. 25 illustrates an example procedure for BCF Discovery (For BCA Registration/Association Purpose) in Scenario 2-BCC Initiated.

An alternate procedure is that the discovery request is initiated by BCC-1 and the detailed procedure is illustrated in FIG. 25. This applies to the case where BCC-1 may serve multiple BCAs (such as BCA-1, BCA-2, BCA-3 are served by the same BCC-1) and each of them intends to discover a desired BCF (remember that in Scenario 2, each BCA may only associate with one BCF at a time but there may be multiple BCAs, and therefore each of them may need to identify a desired BCF). Accordingly, BCC-1 can and/or may help to find a desired BCF for each of BCAs. In this case, Step 3-Step 5 shown in FIG. 24 may be conducted multiple times (i.e., the Step 1 in FIG. 25) and each time is to find a desired BCF for a specific BCA. If there is one BCF that can and/or may serve all these BCAs, Step 1 in FIG. 25 may just be performed once.

Scenario 3: When a BCC can Associate with Only One BCF at a Time

In this scenario, we consider the following system settings and assumptions:

A BCC (e.g., BCC-1) may conduct an existing broadcasting approach to discover an available BCF.

BCC-1 on a WTRU can and/or may only register to a BCF at a time (e.g., based on its current location).

BCC-1 may register to a BCF based on its own decision (e.g., BCC-1 may select BCF-1 for registration).

A BCA does not have to register with a BCF.

Any BCA (e.g., BCA-1) served by BCC-1 may either use the blockchain service provided by BCF-1 (which is registered by BCC-1) if BCF-1 manages a desired BCN for the BCA-1. Or, if BCF-1 does not manage a desired BCN for the BCA-1, the BCA-1 may request BCF-1 to communicate with the home BCF of its corresponding BNA, which hosts a desired BCN for BCA-1.

In scenario 3, the BCC-1 may just do a local broadcast to discover a near-by available BCF and the procedure is not shown for space-saving.

BCC/BCA Registration

A BCA may register itself to a BCC and become a service BCA of this BCC. Once a BCF is discovered, a BCC may register itself and/or its served BCAs to the BCF. Likewise, a BCA may register itself to a discovered BCF, which may be a regular BCF, a home BCF, or a visited BCF. There may be different system settings and assumptions for BCC/BCA registration. Therefore, solutions to BCC/BCA registration in three different scenarios are proposed and each of the scenarios has its own assumptions and settings.

Representative Scenario 1: When a BCA can Associate with Multiple BCFs for Different Purposes In Scenario 1, we consider the following system settings and assumptions:

A BCC-1 on a WTRU may register to a BCF, which is a first-contact BCF for BCAs served by BCC-1 (e.g., based on its current location).

Any BCA (e.g., BCA-1) served by BCC-1 may register to its home BCF, which is the BCF that its corresponding BNA is registered with.

In addition, any BCA (e.g., BCA-1) served by BCC-1 may register to a visited BCF, which may be BCF on the edge or other places closer to BCA-1 and may provide the equivalent blockchain service to BCA-1 as its home BCF.

In this section, BCC registration and BCA Registration are discussed:

BCC registration is to register a BCC to a BCF. Normally, such a BCF is the first-contact BCF of BCAs served by the BCC on the same WTRU (at their current location).

The BCA registration has two types of BCA registration:

This first type of registration is for a BCA to register to its home BCF, which has been identified in home BCF discovery operation for BCA registration purpose.

This second type of registration is for a BCA to register to a visited BCF registration in order to use blockchain service, which has been identified in visited BCF discovery operation for using blockchain service purpose).

Representative BCC Registration to First-Contact BCF

Figure 26:
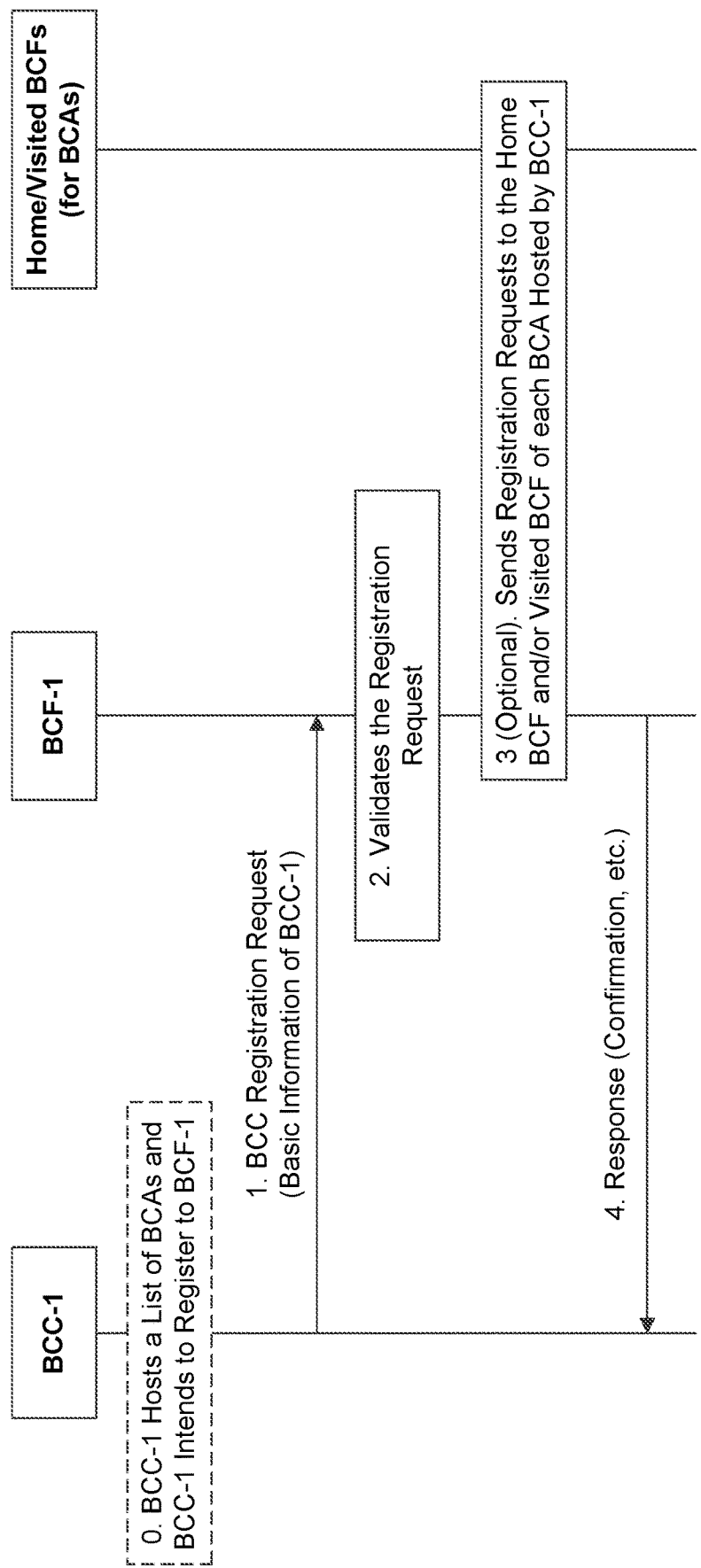
FIG. 26 illustrates an example BCC registration procedure.

FIG. 26 illustrates an example BCC registration procedure (e.g., in Scenario 1).

Pre-condition(s): A WTRU may host a BCC-1, which may serve upper-layer BCAs. Through pre-provision or local broadcasting, the BCC-1 already identified a BCF (e.g., BCF-1) and intends to register itself to this BCF. Note that, to the upper-layer BCAs, BCF-1 is their first-contact BCF at the current location.

Step 1: BCC-1 may send a registration request to BCF-1 and this request may include the following parameters:

BCC ID: This is the identification of a BCC ID. In general, for a given BCC on a WTRU, it may have a global unique BCC ID, or it may have a local unique BCC ID for the current first-contact BCF. In the case that BCC-1 already has a global BCC ID (which means it has registered to other BCF before or has been pre-provisioned with a BCC-ID), then this parameter may indicate this BCC ID.

Registration Credential: This parameter includes essential information that is needed for the BCF-1 to validate and register BCC-1.

Other basic information about BCC-1, e.g.:

The basic information about the hosting WTRU, such as WTRU's computing resources, communication capability, current location, mobility/path planning, available battery, etc.

The communication capabilities: e.g., how BCC-1 wants to communicate with BCF-1, e.g., Wi-Fi, Cellular, or local area network.

Information about Hosted BCAs: Optionally, BCC-1 may carry certain information regarding its hosted BCAs. For example, the following information may be carried:

The name list or the identification list of the BCAs hosted or served by BCC-1.

The registration credential of each of BCAs served by BCC-1 if the BCAs intend to register themselves to their respective home/visited BCFs.

The respective home BCF ID of each BCAs (which is identified during the BCF discovery stage)

The respective visited BCF ID of each BCAs (which is identified during the BCF discovery stage)

Note that, if the "information about hosted BCAs" is included, it means that Step 1 intends to initiate multiple types of registrations, i.e.:

To register BCC-1 itself to the first-contact BCF, i.e., BCF-1

To register BCAs served by BCC-1 to their respective home BCFs (home BCF registrations), or their respective visited BCFs (visited BCF registrations).

Step 2: BCF-1 may validate the BCC-1 and may create a registration record for BCC-1. If BCC-1 does not indicate its BCC ID, then BCF-1 may assign a new BCC ID to BCC-1, either a global BCC ID or a locally unique ID.

Step 3. Optional step. In the case where the "information about hosted BCAs" is included, then BCC-1 may send individual registration requests to the home BCF and/or visited BCF of each BCA served by BCC-1 in order to register the BCAs to their home/visited BCF respectively. The procedure may be as same as the one presented in FIG. 27 or in FIG. 28.

Step 4: BCF-1 may send a response message to BCF-1 for the successful registration of BCC-1, along with other useful information, such as an assigned BCC ID. In the case where the "information about hosted BCAs" is included, then BCC-1 may also be informed that whether the BCAs have been successfully registered with their respective home BCFs or visited BCFs plus the assigned identifier for each registered BCA.

The above procedure can and/or may be used for updating the registration record of a BCC that was already registered with the first-contact BCF. They may differ in that Step 1 may be the registration update request.

BCA Registration to Home BCF

Figure 27:
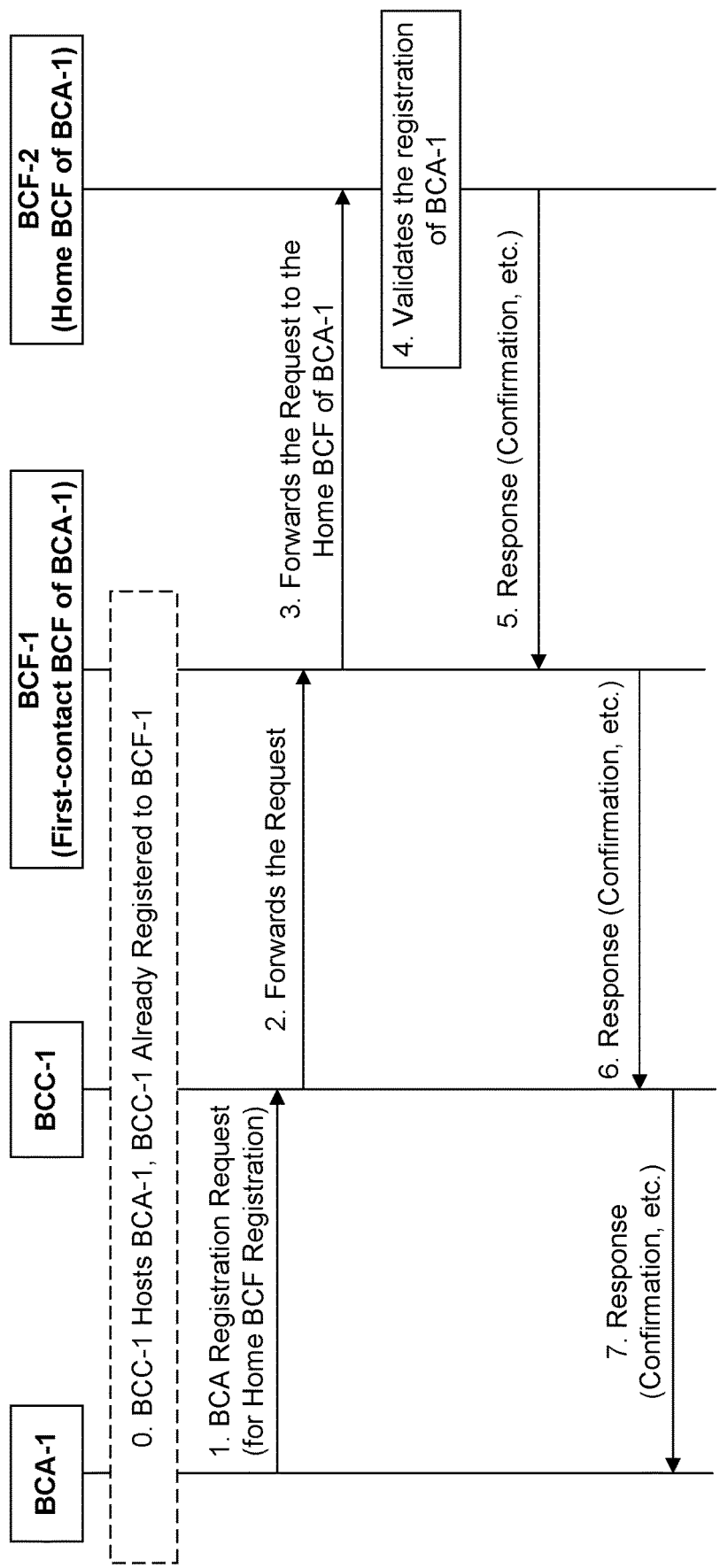
FIG. 27 illustrates an example procedure for BCA registration to its home BCF.

BCA registration to home BCF can and/or may be conducted individually. FIG. 27 illustrates an example procedure for BCA registration to its home BCF (e.g., in Scenario 1).

Pre-condition(s): A WTRU may host a BCC-1, which may be registered with a BCF-1. A BCA-1 is hosted on top of BCC-1 and during the BCF discovery stage, BCA-1 may be identified that BCF-2 is its home BCF. Note that, to the upper-layer BCA-1, BCF-1 is its first-contact BCF at the current location.

Step 1: BCA-1 may send a registration request to BCC-1 and this request may include the following parameters:

BCA ID: This is the identification of a BCA-1 if such an ID has already been pre-provisioned.

BCA Name: This is to indicate the name of BCA-1.

Application Name: The name of the vertical application which BCA-1 belongs to.

Registration Credential: This parameter includes essential information that is needed for the home BCF of BCA-1 to validate and register BCA-1.

The Name of the Home BCF: This is to show the name of the home BCF of BCA-1.

The BCF ID of the Home BCF: This is to show the ID of the home BCF of BCA-1.

Step 2: BCC-1 may send this registration request to BCF-1.

Step 3: BCF-1 may analyze the request and may send the request to the BCF having the BCF ID indicated in the "The BCF ID of the Home BCF" parameter of Step 1. In this case, the BCF-ID is BCF-2 for example.

Step 4: BCF-2 may receive the request and validate the registration request sent from BCA-1. For example, the BCF-2 may check its BNA registration repository and validate that BCA-1 is indeed a permitted BCA of a specific vertical application (corresponding to a BNA). The BCF-2 may create a registration record for BCA-1 for its successful registration (i.e., BCF-2 may also host a BCA registration repository).

Step 5. BCF-2 may send an acknowledgment to BCF-1 for the successful registration of BCA-1 to its home BCF.

Step 6. BCF-1 may send the acknowledgment to BCC-1.

Step 7. BCC-1 may send the acknowledgment to BCA-1.

The above procedure can and/or may be used for updating the registration record of a BCA that was already registered with its home BCF. They may differ in that Step 1 may be the registration update request.

Representative BCA Registration to Visited BCF

Figure 28:
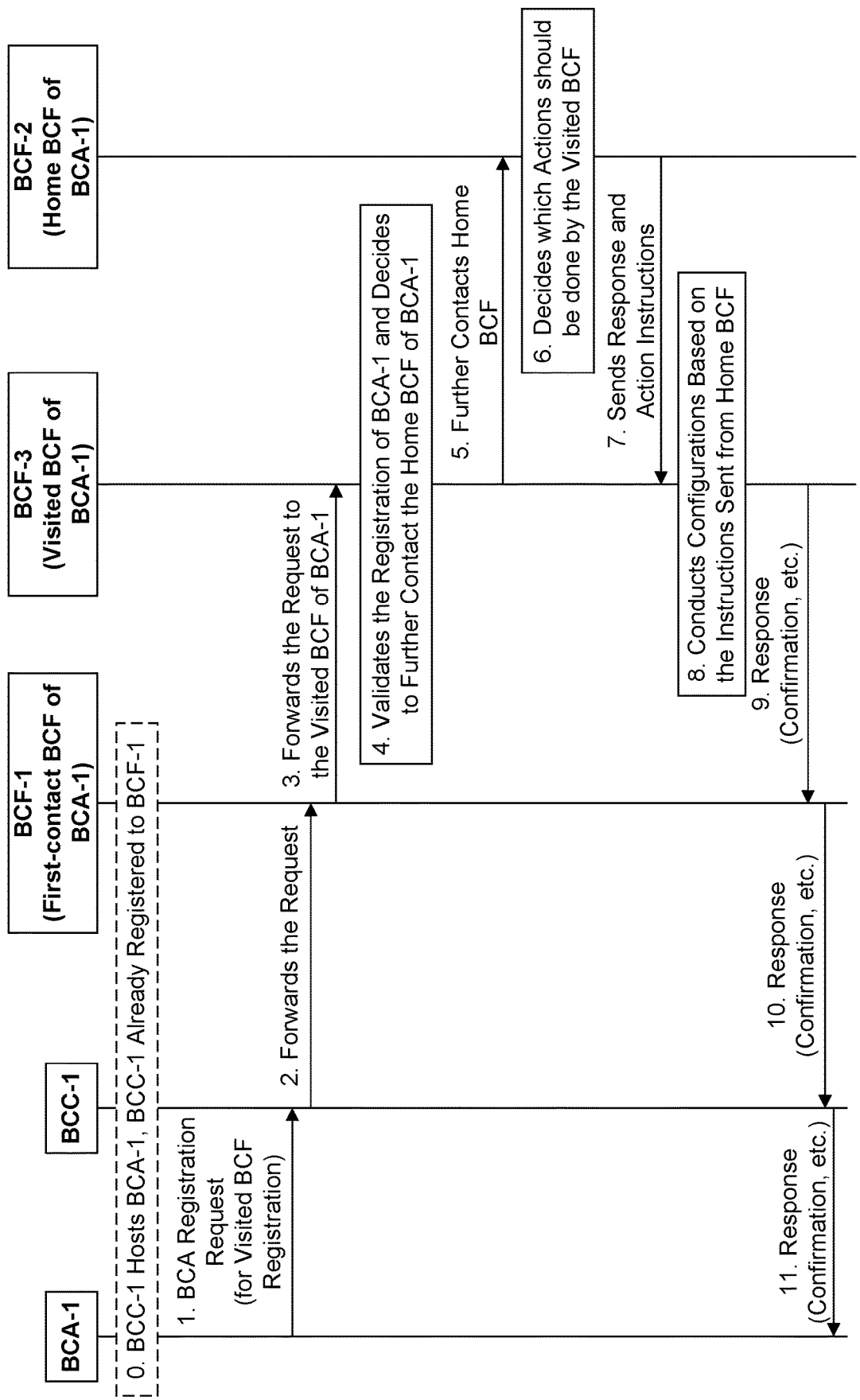
FIG. 28 illustrates an example procedure of BCA registration to its visited BCF.

In the case where a BCA intends to use the blockchain service provided by a visited BCF, the BCA may first register to the visited BCF. BCA registration to a visited BCF may be conducted individually, which is discussed in this section. FIG. 28 illustrates an example procedure of BCA registration to its visited BCF (e.g., in Scenario 1).

Pre-condition(s): A WTRU may host a BCC-1, which may be registered with a BCF-1. A BCA-1 is hosted on top of BCC-1 and may be registered to its home BCF (e.g., BCF-2). During the BCF discovery stage for using blockchain service at its current location, BCA-1 may be identified that BCF-3 may be its visited BCF.

Step 1: BCA-1 may send a registration request to BCC-1 for registering to BCF-3 and this request may include the following parameters:

BCA ID: This is the identification of a BCA-1.

BCA Name: This is to indicate the name of BCA-1.

Registration Credential: This parameter includes essential information that is needed for the visited BCF of BCA-1 to validate and register BCA-1.

The Name of the Home BCF: This is to show the name of the home BCF of BCA-1, e.g., BCF-2 for example.

The BCF ID of the Home BCF: This is to show the ID of the home BCF of BCA-1.

Step 2: BCC-1 may send this registration request to BCF-1.

Step 3: BCF-1 may analyze the request, may send the request to the BCF-3.

Step 4: BCF-3 may receive the request and validate the registration request sent from BCA-1. For example, the BCF-3 may contact BCF-2 (the home BCF of BCA-1) for more information about BCA-1. Alternatively, BCF-3 may also ask BCC or BCA-1 to submit more information.

Step 5: BCF-3 intends to agree with the registration of BCA-1; therefore, it may send a request to contact BCF-2 for more information. When contacting BCF-2, the BCF-3 may indicate its own capabilities so that the BCF-2 may make better decisions regarding which actions should be done at BCF-3.

Step 6: The home BCF of BCA-1, i.e., BCF-2, may check the following information (assuming that the corresponding BNA of BCA-1 is BNA-1 and the detailed information about BNA-1 and its related BCAs is stored in the BNA registration repository during the BNA registration process):

Check the Application Task List: This is a list of tasks related to the vertical application that BCA belongs to. In other words, the tasks constitute the application logic processing.

In particular, for each of the tasks, it has a corresponding workflow, which is constituted by several actions. Each action is done by one or more actors. For each action, the BCF-2 may decide which actions are to be done by BCF-3 based on the following information stored in the BNA registration repository:

Actor: this indicates who is the actor of the action. The BCF-2 may re-evaluable whether the actor should be the visited BCF-3 at this time, or the action may still be done by BCF-2 itself.

Executable code: For each action, it may be implemented as a piece of executable software code, and such code may be deployed to a corresponding actor, as defined in the workflow. If the action is to be done by the visited BCF now, then the corresponding code may also be deployed to the visited BCF.

Transaction format: In the case where the action is to create a blockchain transaction, this information is to show that for this particular action, what transaction is to be created if needed, and what is the exact format of the transaction related to this action. For example, the transaction format may include the following basic information:

Vertical application name or BNA ID: This is to indicate the name of a particular vertical application, or an identifier of a particular vertical application, or a pre-provisioned BNA-ID, or a BNA-ID assigned by a BCF.

Task ID: This is to indicate the identifier of a task. Alternatively, it may be (e.g., also be) a specific task name. Overall, the information in this parameter is to show the transaction to be created is related to which specific process.

Action ID: This is to indicate the identifier of an action of a task. Alternatively, it may be (e.g., also be) a specific action name. Overall, the information in this parameter is to show the transaction to be created is related to which specific action/operation.

Actor ID: In general, actor ID is showing the identifier of an actor, it may be actor's ID, actor's specific name, actor's unique serial number, actor's MAC address, production manufacture serial number, etc. In this case, the actor is normally a BCF since it is mainly the BCF that may interact with the underlying BCN in order to insert a new transaction into the blockchain.

Transaction creation time

Other application-specific data

The visited BCF may also need to know the transaction format if certain blockchain transaction is to be created at the visited BCF.

In general, the BCF-2 may check each of action and decide whether this action should still be done by the home BCF (i.e., BCF-2 itself), or should be done by BCF-3. On one hand, if a specific action may be done by the visited BCF (i.e., BCF-3), then BCF-2 may inform the details of the action to BCF-3. For example, BCF-2 may decide that instead of letting BCF-2 help BCA-1 to interact with a blockchain system, BCA-1 can and/or may use BCF-3 (i.e., its visited BCF) since BCF-3 may also manage a BCN, which is the same type of BCN that is managed by BCF-2 and is to serve BCA-1. On the other hand, it is possible that after evaluating the BCF-3 capabilities, BCF-2 may decide that the BCF-3 may not provide desired blockchain service to BCA-1 and therefore rejects BCF-3's request to serve BCA-1.

Step 7: BCF-2 informs BCF-3 of the detailed instructions regarding how to serve BCA-1. For example, the following information may be included:

The task list that BCA-1 is involved in.

The workflow of each task.

The actions that need to be done by BCF-3 (based on the re-evaluation in Step 6).

Any executable code that is needed for executing an action.

Step 8: BCF-3 conducts certain configurations and creates a registration record for BCA-1.

Step 9. BCF-3 may send an acknowledgment to BCF-1 for the successful registration of BCA-1 (as its visited BCF).

Step 10. BCF-1 may send the acknowledgment to BCC-1.

Step 11. BCC-1 may send the acknowledgment to BCA-1.

The above procedure can and/or may be used for updating the registration record of a BCA that was already registered with the visited BCF. They may differ in that Step 1 may be the registration update request. The BCA-1 may also send a de-register request to a visiting BCF if it does not want to use the blockchain service provided by that visited BCF.

Representative Scenario 2: When a BCA can Associate with Only One BCF at a Time

In this scenario, we consider the following system setting and assumptions:

A BCC on a WTRU (e.g., BCC-1) does not have a registration to a BCF.

A BCA served by BCC-1 may register to a BCF in order to use the blockchain service.

A BCA may only register or associate with one BCF at a time. In particular, the BCA may just associate with the BCF (e.g., BCF-1), with which its corresponding BNA has been registered, for all the time. If that is the case, it means that BCF-1 may always be the only BCF for providing blockchain service for all the BCAs and the BNA of a particular vertical wireless application. Alternatively, a decoupled approach may be also possible, in which BCA-1 does not have to register with the same BCF registered by its corresponding BNA. Instead, BCA-1 may associate with a different BCF (e.g., BCF-2), e.g., BCF-2 may provide the same blockchain service (e.g., the same type of BCN) as BCF-1 and/or BCF-2 is deployed closer to BCA-1.

BCC-1 just help in forwarding the requests from hosted BCA to their targeted BCFs.

In Scenario 2, BCF discovery is only for BCA registration, i.e., the BCA-1 is going to find a qualified BCF for BCA Registration. In other words, the logical roles such as "first-contact BCF", "home BCF" and "visited BCF" do not exist in Scenario 2.

Figure 29:
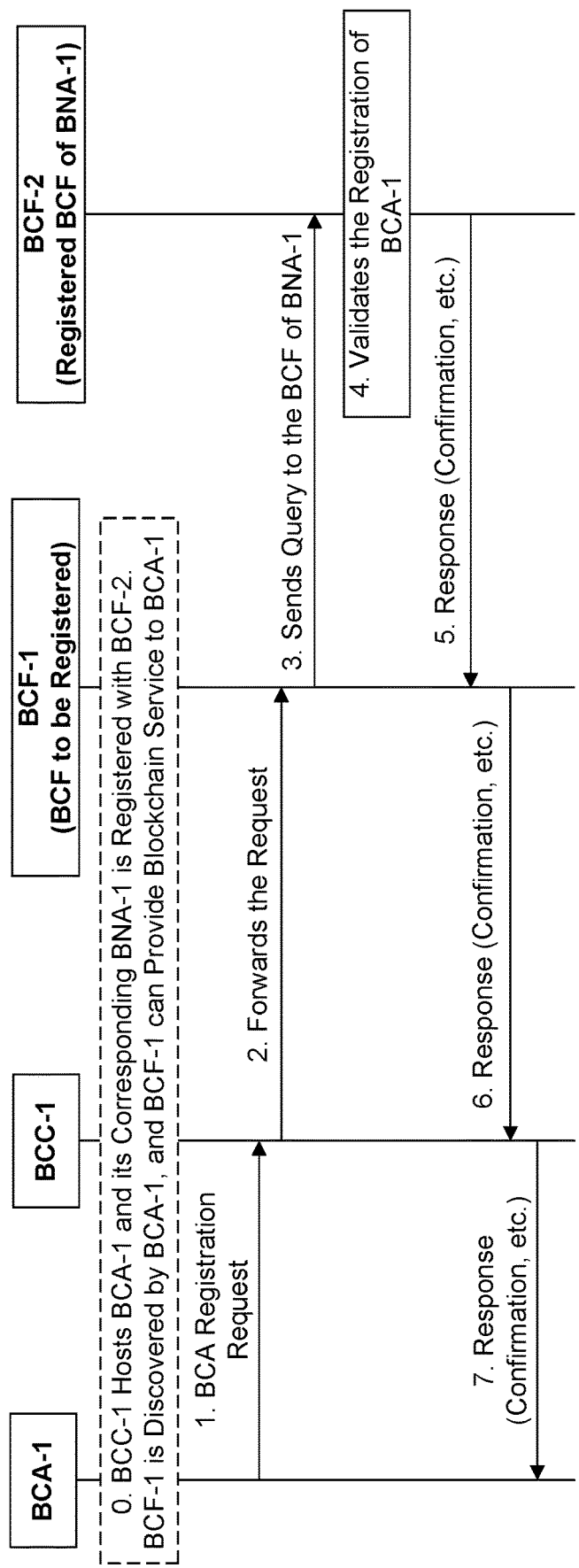
FIG. 29: illustrates an example procedure for BCA registration to a BCF.

FIG. 29: illustrates an example procedure for BCA Registration to a BCF (in Scenario 2).

The procedure of BCA registration to its home BCF is illustrated in FIG. 29.

Pre-condition(s): A WTRU may host a BCC-1. A BCA-1 is hosted on top of BCC-1 and during the BCF discovery stage, BCA-1 may be identified that BCF-1 at its current location. The corresponding BNA of BCA-1 is BNA-1, which is registered with BCF-2.

Step 1: BCA-1 may send a registration request to BCC-1 and this request may include the following parameters:
  BCA ID: This is the identification of a BCA-1 if such an ID has already been pre-provisioned.
  BCA Name: This is to indicate the name of BCA-1.
  BNA ID: this is to show the ID of the corresponding BNA, e.g., BNA-1.
  Registration Credential: This parameter includes essential information that is needed for the home BCF of BCA-1 to validate and register BCA-1.
  The Name of the BCF registered by its corresponding BNA: This is to show the name of the BCF registered by BNA-1.
  The BCF ID of the BCF registered by its corresponding BNA: This is to show the ID of the BCF registered by BNA-1, e.g., BCF-2.
  The name and/or BCF ID of last registered BCF: if BCA-1 has registered to another BCF before, this is to show the last BCF registered by BCA-1.

Step 2: BCC-1 may send this registration request to BCF-1.

Step 3: BCF-1 may analyze the request and may send a query request to BCF-2 for validation (based on the "The BCF ID of the BCF registered by its corresponding BNA" parameter in Step 1). Alternately, BCF-1 may also send the query request to the last BCF registered by BCA-1 (based on the "The name and/or BCF ID of last registered BCF" parameter in Step 1).

Step 4: BCF-2 may receive the request and validate the registration request sent from BCA-1. For example, the BCF-2 may check its BNA registration repository and validate that BCA-1 is indeed a permitted BCA of a specific vertical application (represented by BNA-1).

Step 5. BCF-2 may send an acknowledgment to BCF-1 that BCA-1 is validated. In the case that validation is done by the last BCF registered by the BCA-1 (e.g., BCF-3), BCF-3 may move information related to BCA-1 from BCF-3 to BCF-1, if that information may be re-used.

Step 6. BCF-1 may send the acknowledgment to BCC-1. The BCF-1 may create a registration record for BCA-1 and prepare to provide blockchain service to BCA-1.

Step 7. BCC-1 may send the acknowledgment to BCA-1.

Figure 30:
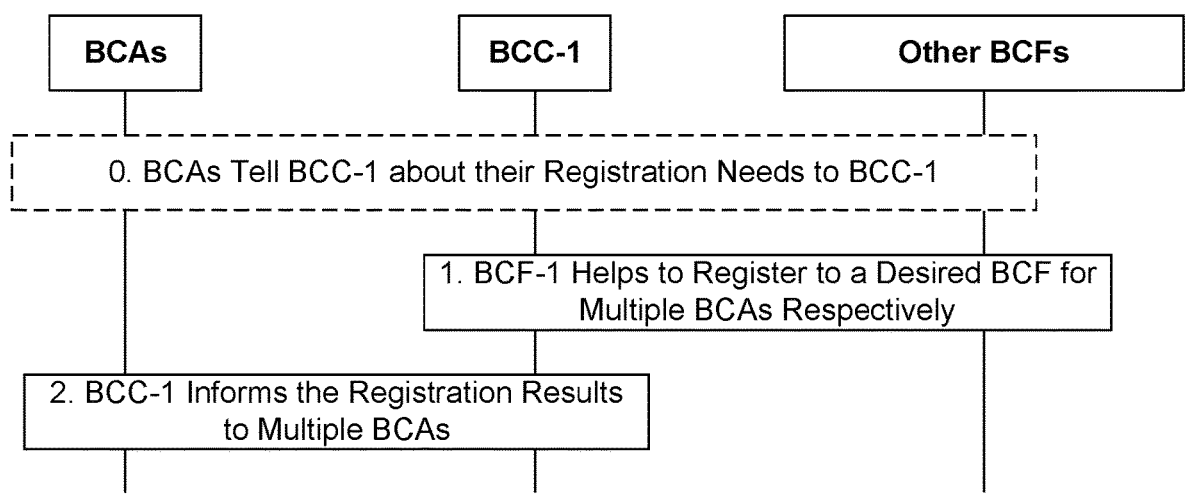
FIG. 30: illustrates an example procedure for BCF registration.

FIG. 30: illustrates an example procedure for BCF Registration in Scenario 2-BCC Initiated.

An alternate procedure is that the discovery request is initiated by BCC-1 and the detailed procedure is illustrated in FIG. 30. This applies to the case where BCC-1 may serve multiple BCAs (such as BCA-1, BCA-2, BCA-3) and each of them intends to register a desired and potentially different BCF. Accordingly, BCC-1 can and/or may help to find a desired BCF for each of BCAs. In this case, Step 2-Step 6 shown in FIG. 29 may be conducted multiple times (i.e., the Step 1 in FIG. 30) and each time is to register to a desired BCF for a specific BCA. If there is one BCF that can serve all these BCAs, Step 1 in FIG. 30 may just be performed once.

Scenario 3: When a BCC can Associate with Only One BCF at a Time

In this scenario, we consider the following system settings and assumptions:
  A BCC (e.g., BCC-1) may conduct an existing broadcasting approach to discover an available BCF.
  BCC-1 on a WTRU may only register to a BCF at a time (e.g., based on its current location).
  BCC-1 may register to a BCF based on its own decision (e.g., BCC-1 may select BCF-1 for registration).
  A BCA does not have to register with a its corresponding BNA, which hosts a desired BCN for BCA-1.
  Any BCA (e.g., BCA-1) served by BCC-1 may either use the blockchain service provided by BCF-1 (which is registered by BCC-1) if BCF-1 manages a desired BCN for the BCA-1. Or, if BCF-1 does not manage a desired BCN for the BCA-1, the BCA-1 may ask BCF-1 to communicate with the home BCF of its corresponding BNA, which hosts a desired BCN for BCA-1.

Figure 31:
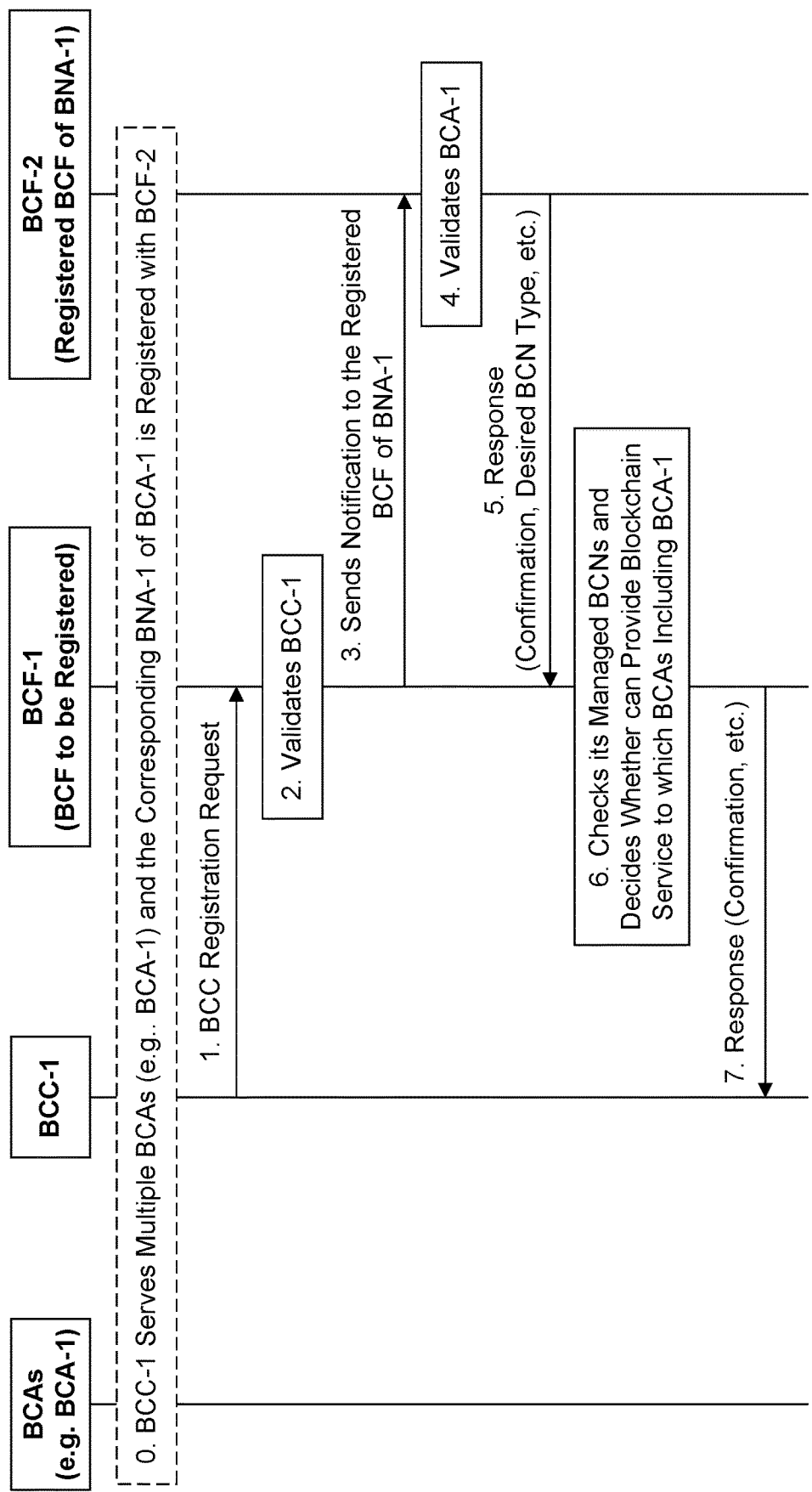
FIG. 31 illustrates an example procedure for BCC Registration to a BCF.

FIG. 31 illustrates an example procedure for BCC Registration to a BCF (in Scenario 3). The procedure of BCC registration to a BCF is illustrated in FIG. 29.

Pre-condition(s): BCC-1 may serve multiple BCAs (e.g., BCA-1) and the corresponding BNA of BCA-1 is BNA-1, which is registered with BCF-2.

Step 1: BCC-1 may send a registration request to BCF-1 and this request may include the following parameters:
  BCC ID: This is the identification of BCC-1 if such an ID has already been pre-provisioned.
  BCC Name: This is to indicate the name of BCC-1.
  The name and/or BCF ID of last registered BCF: if BCC-1 has registered to another BCF before, this is to show the last BCF registered by BCC-1.
  List of Hosted BCAs: This is to show a list of BCAs served by BCC-1.
  For each BCA (e.g., BCA-1), the following information is included:
    BNA ID: this is to show the ID of the corresponding BNA, e.g., BNA-1.
    The Name of the BCF registered by its corresponding BNA: This is to show the name of the BCF registered by BNA-1.
    The BCF ID of the BCF registered by its corresponding BNA: This is to show the ID of the BCF registered by BNA-1.

Step 2: BCF-1 may validate the BCC-1. If BCC-1 has registered with a previous BCF before (e.g., BCF-2), then BCF-1 may move BCC-1 related information from BCF-2 to BCF-1 if the information may be re-used.

Step 3: For each BCA (e.g., BCA-1), it does not have to register to a BCF. Instead, it may directly interact with the BCF registered by its corresponding BNA (e.g., BNA-1). As an example, in this step, BCF-1 may send a notification to BCF-2, which is registered by BNA-1 and informs it that BCA-1 is online now.

Step 4: BCF-2 may receive the request and validate the BCA-1. For example, the BCF-2 may check its BNA registration repository and validate that BCA-1 is indeed a permitted BCA of a specific vertical application (corresponding to a BNA).

Step 5. BCF-2 may send an acknowledgment to BCF-1 that BCA-1 is validated. The BCF-2 may indicate what desired type of BCN that is to be used by BCA-1 (which was decided during the BNA registration process).

Step 6. BCF-1 may check its managed BCNs to see whether it has the desired type of BCN that is to be used by BCA-1. If so, BCF-1 may directly provide blockchain service to BCA-1. Otherwise, for any blockchain-related service requests sent from BCA-1, the BCF-1 may forward the request to BCF-2 for processing.

Note that, Step 3 to Step 6 may be conducted multiple times for each of BCAs served by BCC-1.

Step 7. BCF-1 may send the acknowledgment to BCC-1.

Representative BCA Registration to BCC

In the previous sections, the proposed registration procedures are mainly related to BCA/BCC registration to BCF. The BCA may register to a BCC in order to use BCC to communicate with other BCFs via BCC (especially the BCA and BCC are not hosted on the same WTRU/device).

Figure 32:
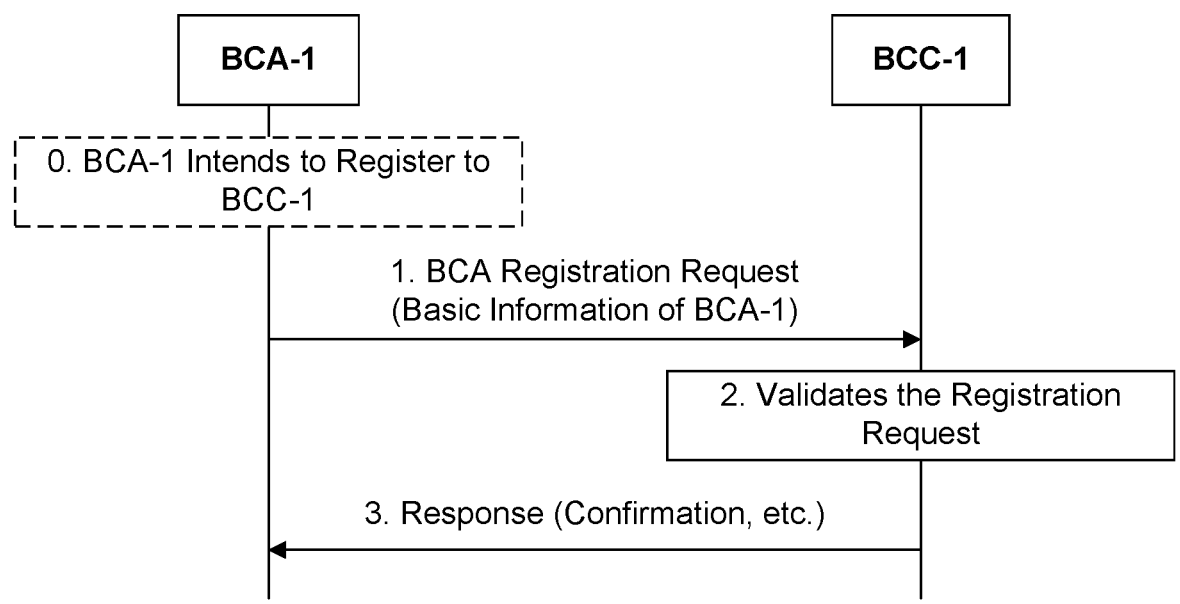
FIG. 32: illustrates an example procedure for BCA Registration to a BCC.

FIG. 32: illustrates an example procedure for BCA Registration to a BCC.

Pre-condition(s): BCA-1 has discovered BCC-1 and intends to register with BCC-1.

Step 1: BCA-1 may send a registration request to BCC-1 and this request may include the following parameters:

- BCA-ID: This is the identification of a BCA-1 if such an ID has already been pre-provisioned. If BCA-ID is not available, BCA-1 may provide its manufacture production serial number.
- BCA Name: This is to indicate the name of BCA-1.
- Application Name: The name of the vertical application which BCA-1 belongs to.
- Registration Credential: This parameter includes essential information that is needed for BCC-1 to validate and register BCA-1.

If BCA-1 wants to ask BCC-1 to help it to register to the home BCF of BCA-1, the following information may be included:

- The Name of the Home BCF: This is to show the name of the home BCF of BCA-1.
- The BCF ID of the Home BCF: This is to show the ID of the home BCF of BCA-1.
- Application Requirements on Blockchain: This is to indicate some requirements on blockchain systems that BCA-1 may have. For example, BCA-1 may need to interact with a private or a public blockchain. Also, BCA-1 may indicate via this parameter its performance requirement on blockchain systems such as transaction creation speed, etc.
- BNA-ID: If BCC-1 knows its BNA already, it may indicate the identifier of this BNA to BCC-1.

Step 2: BCC-1 may receive the request and validate the registration request sent from BCA-1. If BCA-1 wants to ask BCC-1 to help it to register to the home BCF of BCA-1, the BCC-1 may decide whether agrees to do so. For example, if BCC-1 still did not register itself to any BCF, the BCC-1 may choose to help BCA-1 to register to the home BCF of BCA-1 during its own BCF registration of BCC-1 (See Step 3 in FIG. 26). BCC-1 may assign a BCA-ID to BCA-1 if its request from Step 1 is validated and approved. BCC-1 may maintain a BCA Repository to record all successfully registered BCAs. The BCA repository may include a BCA record for each registered BCA. Each BCA record may describe a registered BCA and may include some parameters included in Step 1.

Step 3. BCC-1 may send an acknowledgment to BCA-1 for the successful registration of BCA-1 and now BCC-1 acts as the client-side middleware entity for providing blockchain-related functionalities to BCA-1. Optionally, if BNA-ID is included in Step 1, BCC-1 may send a notification to the BNA that BNA-ID stands for to inform it that BCA-1 has registered to BCC-1.

Representative BCF-to-BCF Interactions

Representative BCF-to-BCF Communication

Certain communications between BCFs are proposed. As previously mentioned, there may be multiple BCFs in a system and each BCF is to serve a certain geographical region. For a given BCF, it may manage a list of underlying BCNs, and each BCN is from a particular blockchain system. When the system is running, BCFs may communicate with each other periodically in order to exchange useful information such as BNA registration repository, BCA registration repository, and BCN registration repository. Such information exchange may be beneficial for facilitating other operations, such as BNA registration, BCC registration, BCA registration, BCF discovery, etc.

Figure 33:
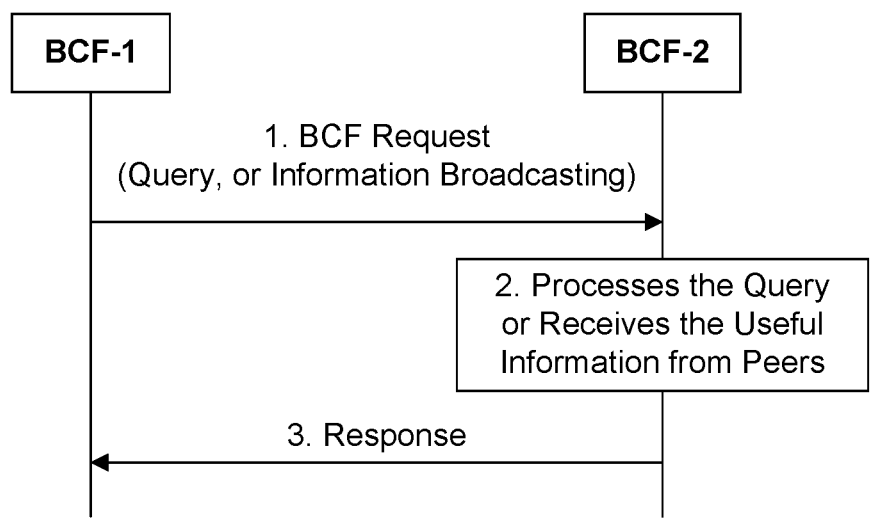
FIG. 33: illustrates an example procedure for BCF-to-BCF communication.

FIG. 33: illustrates an example procedure for BCF-to-BCF communication.

Pre-condition(s): Two BCFs know each other (either through pre-configuration/pre-provisioning, or through discovery using a common/shared repository/directory). For example, in the context of 5GS, BCF may be implemented as a 5G control plane network function. Each BCF may register itself to an NRF. The very first BCF can and/or may find a second BCFs from the NRF. After that, both BCFs may start to communicate with each other to discover more BCF directly without going to the NRF.

Step 1: BCF-1 may send a request to BCF-2 and this request may have different forms, for example (not an exhaustive list):

- A request may be a BCF network topology discovery request. In such a case, two BCFs may communicate with each other regarding the peer BCFs they know (e.g., BCF-1 knows and connects to two other BCFs, i.e., BCF-5 and BCF-6. BCF-2 knows and connects to three other BCFs, i.e., BCF-9 and BCF-10 and BCF-11). Through this periodical discovery, a BCF may gradually know all other peer BCFs in the system and the network topology between BCFs.
- A request may be a BNA information exchange request. In such a case, two BCFs may communicate with each other regarding the information stored in their BNA registration repository. For example, through this periodical information exchange, a BCF may quickly find out that for a given/new BCA to be registered, which BCF is the home BCF of this new BCA.
- A request may be a BCA information exchange request. In such a case, two BCFs may communicate with each other regarding the information stored in their BCA registration repository. For example, through this periodical information exchange, a BCF may quickly find out that for a given BCA to be registered, which BCF is the home BCF of this BCA.

A request may be a BCN information exchange request. In such a case, two BCFs may communicate with each other regarding the information stored in their BCN registration repository. For example, through this periodical information exchange, a BCF may quickly find out that for a given blockchain system, which BCFs are managing the BCNs of a specific blockchain system.

A request may be an action assignment request. In such a case, a BCF may ask another BCF to conduct a specific action. For example, a BCF-1 may ask another BCF-2 to help to store transactions into a BCN managed by BCF-2.

A request may be a subscription request. In such a case, a BCF-1 may be interested in certain events or information that may be captured by another BCF-2. Therefore, the BCF-1 may make subscriptions to BCF-2 and get notifications.

A request may be a management-related information exchange request. For example, in the scenario where a BCA can and/or may have a home BCF and a visited BCF, once the visited BCF starts to serve a BCA, the visited BCF may report the service status/data/performance to the home BCF and let the home BCF to conduct some management, such as charging, etc.

Step 2: Depending on the different cases as listed in Step 1, the BCF-2 may conduct certain processing.

Step 3: Depending on the different cases as listed in Step 1, the BCF-2 may send back the corresponding response. For example (not an exhaustive list):

A response to a previous BCF network topology discovery request. In such a case, the response may include a peer/neighbor BCF list.

A response to a previous BNA information exchange request. In such a case, they may exchange any information e.g., regarding the information stored in their BNA registration repository.

A response to a previous BCA information exchange request. In such a case, the response may include the information stored in their BCA registration repository.

A response to a previous BCN information exchange request. In such a case, the response may include the information stored in their BCN registration repository.

A response to a previous action assignment request. In such a case, a BCF may receive a confirmation whether the action is assigned successfully or not.

A response to a previous subscription request. In such a case, a BCF-1 may receive confirmation whether the subscription is successful or not. In particular, if successfully, the BCF-1 may receive subsequent notifications due to this subscription.

Representative BCN-to-BCN Communication Via BCFs

A BCF can and/or may manage a list of underlying BCNs. In particular, for two (or more) different BCFs, it is possible that each of BCFs may manage a particular BCN and the two BCNs may come from the same blockchain system. Although two BCNs generally communicate with each other via the P2P network in the underlying blockchain system, this disclosure proposes a new way for two BCNs to communicate via the overlay network between BCFs. This is a new functionality or a value-added service provided by BCFs. In the proposed approach, all the communications/interactions between two BCNs do not have to rely on the P2P network in the underlying blockchain system. Instead, they may rely on BCF for exchanging the information via the communication channel between BCFs which may not be using the same communication mediums used in the underlying blockchain network.

Figure 34:
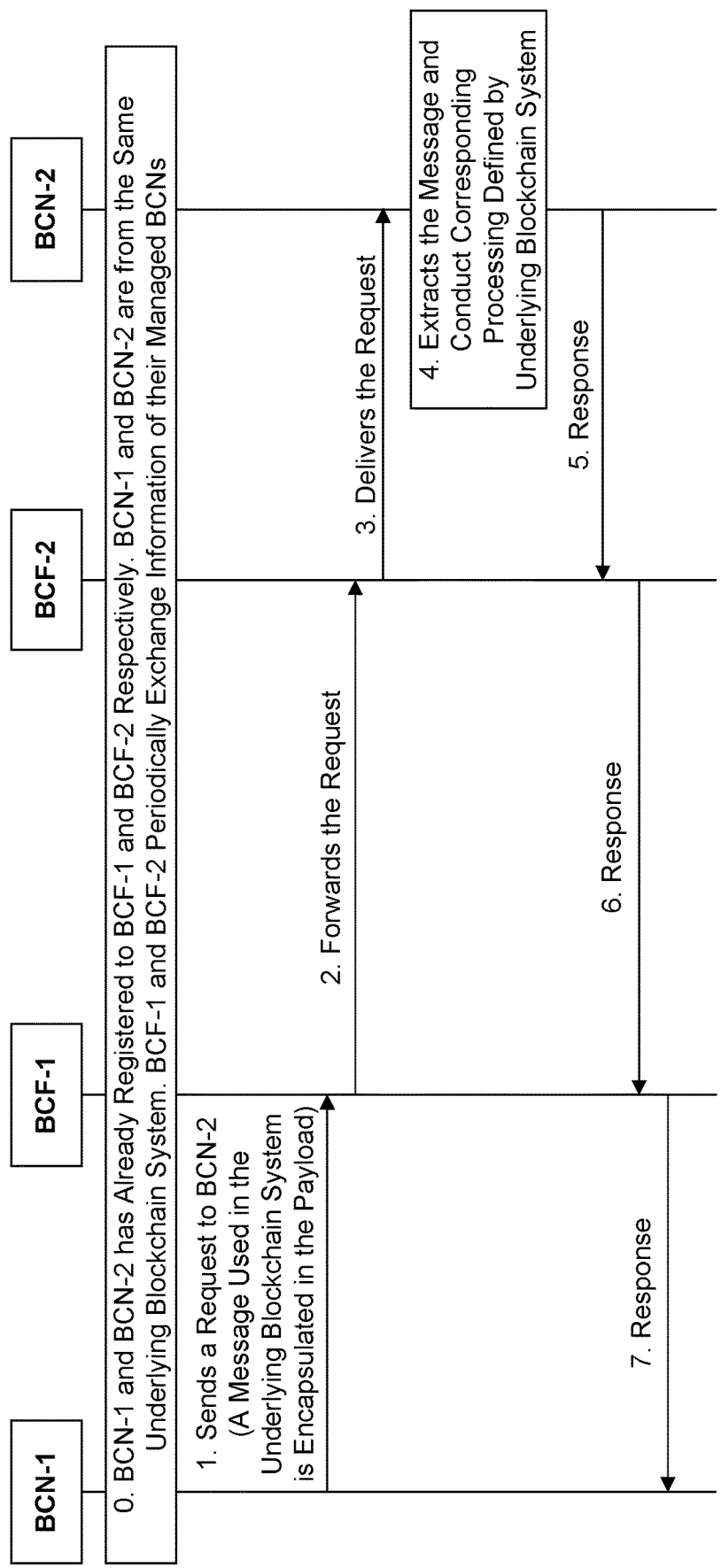
FIG. 34: illustrates an example procedure for BCN-to-BCN Communication via BCF.

FIG. 34: illustrates an example procedure for BCN-to-BCN Communication via BCF.

Pre-condition(s): BCF-1 may manage a BCN-1 which is from underlying blockchain system A, and BCF-2 may manage a BCN-2 which is also from the same underlying blockchain system A. BCF-1 and BCF-2 periodically exchange information with each other.

Step 1: BCN-1 intends to send a message to BCN-2 and this message is mainly used in the underlying blockchain system A. Note that, such a message may be any message that is used in the underlying blockchain system and is originally sent through the P2P network in the underlying blockchain system A. However, now BCN-1 intends to send this message to BCN-2 through communication channel between BCFs. The message may carry all the possible parameters used in the underlying blockchain system A. Therefore, the message may be encapsulated in the payload of the request sent from BCN-1 to BCF-1. The BCN-1 may just need to indicate that this message is towards BCN-2, which is currently managed by BCF-2.

Step 2: BCF-1 may receive the request and it may add some additional data to the request and the data is to be sent to BCF-2 (In other words, the additional data is piggybacked). The BCF-1 may send the request to BCF-2.

Step 3: BCF-2 may receive the request and then extract the data that are targeted to it (which is sent from BCF-1). After that, the BCF-2 may deliver the request (only having the data from BCN-1) to BCN-2.

Step 4: BCN-2 may receive the request and extract the original message from the payload of the request. BCN-2 may conduct certain processing as defined by the underlying blockchain system A.

Step 5: BCN-2 may send a response to BCF-2 for the delivery of the request. Similarly, the processing result of BCN-2 may be encapsulated in the payload of the response message.

Step 6: BCF-2 may send the response to BCF-1 for the delivery of the request. The BCF-2 may acknowledge to BCF-1 that the data sent from BCF-1 was also delivered to BCF-2.

Step 7: BCF-1 may receive the response and knows that its own data have been delivered to BCF-2. The BCF-1 may send the response to BCN-1 and BCN-1 may extract the processing result sent from BCN-2.

Although the above procedure uses an example in which BCN-1 and BCN-2 are managed by two different BCFs, i.e., BCF-1 and BCF-2, the proposed procedure may be used in the case that BCN-1 and BCN-2 are managed by the same BCF.

Overall, the BCF-to-BCF communication can and/or may support the follow scenario:

When a BCN-1 (managed by BCF-1) wants to send a message to a BCN-2 (managed by BCF-2), the BCN-1 may send the message to BCF-1, and the message may go through BCF-2 and then reach BCN-2. In particular, at BCF-1, it may add additional data to the original message request and the data is to be delivered to BCF-2, or any other intermediate BCFs on the way to BCF-2. In summary, in this scenario, BCF-1 may piggyback certain data in the original message sent from BCN-1 and this scenario was already illustrated in FIG. 34.

As a BCF-1, if it wants to send certain messages to another BCF-2, BCF-1 may inquiry the BCNs managed by itself to see if any BCN intends to send data to any BCN managed by BCF-2 (or any BCF on the way to BCF-2). If so, BCF-1 may ask the BCNs to submit their data to BCF-1. At BCF-1, it may integrate all the data together in a message request, i.e., data from its managed BCNs (the destination of such data is a BCN) and the data from itself (the destination of such data is a BCF, e.g., BCF-2). The BCF-1 may send out the message, and data may be delivered to the destination BCF and destination BCNs when the message is traveling from BCF-1 to BCF-2 in the BCF overlay network.

When a BCN-1 (managed by BCF-1) intends to rely on BCF-1 to send a data to another BCN-2 (managed by BCF-2), BCF-1 may check the data and collect the useful information if it is allowed. For example, by looking that the messages from an underlying blockchain system, the BCF-1 may conduct certain statistics or analytics, e.g., what is the average size of messages used in an underlying blockchain system, which BCNs have the most blocks being created, confirmed, etc.

Representative Policy Management

As mentioned in the previous section, a policy may be regarded as a type of configuration data as discussed in BNA registration. The policy deployment and policy management may be regarded as two policy-related actions, which are referred to as policy management.

Representative Policy Deployment

There are different types of policies. For example, some policies may be related to how to utilize BCNs. In such a case, it may make sense to deploy a policy to a BCF since BCF is the managing entity of BCNs. Another case is that some policies may be involved with the communication infrastructure, e.g., for a given application-specific action, how much bandwidth should be allocated to transmit the blockchain transactions from a BCA (creating the transactions) to a BCN (storing the transactions into blockchain system). In this example, it may be desired if such a policy may be stored in the communication infrastructure so that it can and/or may facilitate the policy management since it is the communication infrastructure (such as 3GPP network) to eventually allocate, monitor and regulate the bandwidth between a BCA and BCF/BNA. Another example is that in order to enforce a policy, certain data may need to be collected from or provided by communication infrastructure. In such a case, it is desired to deploy such a policy directly in the communication infrastructure.

Figure 35:
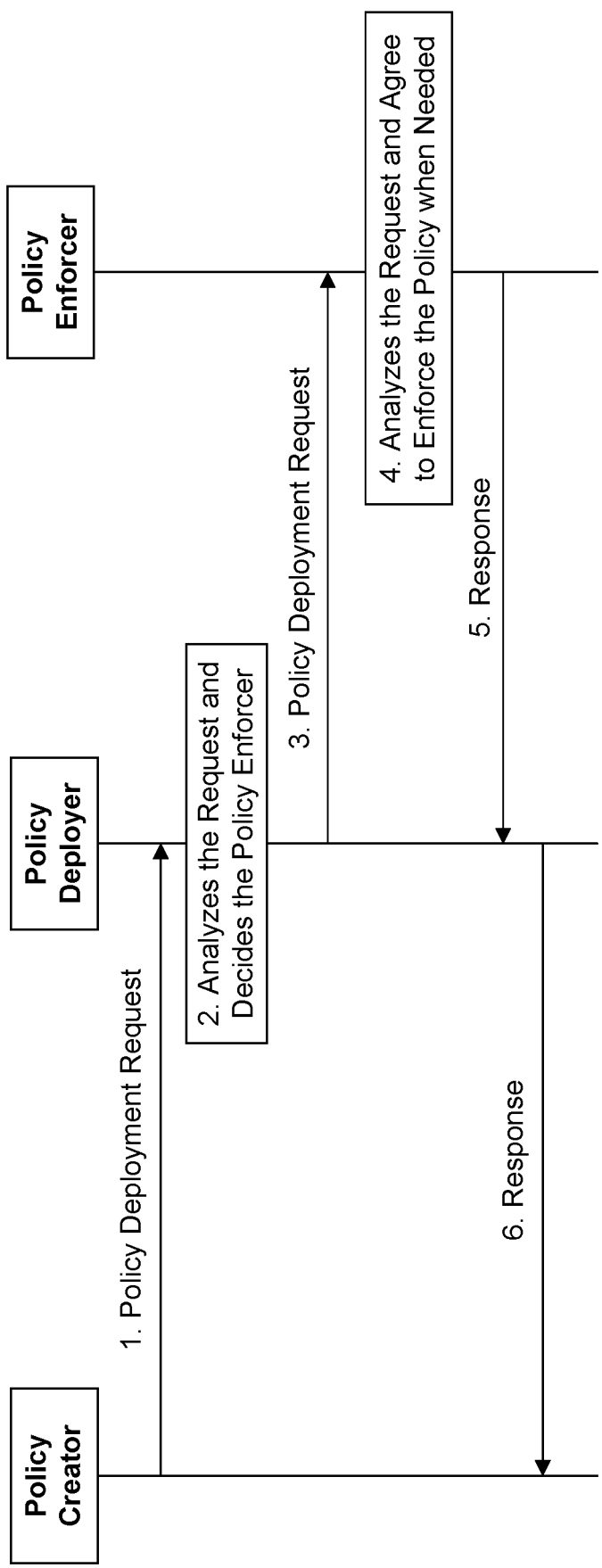
FIG. 35 illustrates an example procedure for policies deployment.

FIG. 35 illustrates an example procedure for policies deployment.

Step 1: A policy creator (e.g., a BNA-1) may send a request to a policy deployer for deploying a policy. For example, this step may be realized by a previous BNA registration procedure (i.e., Step 1 of FIG. 18) in which BNA-1 may send a registration request to a BCF. In particular, in this registration request, the BNA includes all the necessary information about the business logic processing, such as task list, the workflow of each task, each action in the workflow, and the corresponding actors. Here, an action may be related to a policy.

Step 2: The policy deployer may analyze the request and decide who is the policy enforcer. Still using the previous example related to BNA registration, during a BNA registration to a BCF, the BCF is the policy deployer, and BCF may decide who will be the policy enforcer. For example, the BCF may decide whether a particular policy should be deployed in the 3GPP network, in a BCN, and/or just on the BCF itself.

Step 3: The policy deployer deploys the policy to the policy enforcer. The policy enforcer is the one who will enforce the policy.

Step 4. The policy enforcer may receive the policy and may agree to enforce the policy when needed.

Step 5. The policy enforcer may send a response to the policy deployer.

Step 6. The policy deployer may send a response to the policy creator.

Note that the above entities such as policy creator, policy deployer, policy enforcer are all logical roles, and may be taken by different real entities. For example, a policy creator may be a BNA or a BCF, while a policy deployer may be a BCF, a policy enforcer may be a BCN, a BCF itself and/or a 3GPP network function.

Another alternative procedure is that the policy creator may directly create and deploy policies to a policy enforcer.

The above procedure can and/or may be used for updating a policy that was already deployed. They may differ in that Step 1 may be a policy update request including the updated policy content as well as the corresponding policy ID.

Representative Policy Management

The policy management is to manage the policies, e.g., to apply a certain deployed policy. The following policy management flow as well as the involved entities are discussed. These involved entities are logical entities not physical ones; as such, an actual physical entity instance can and/or may act as the role of multiple different logical entities.

1. A policy has been deployed to a policy enforcer. For example, a policy may be a policy related to how to use the blockchain service provided by a BCF. For example, for a given BCA, how many transactions it may ask BCF to store in the desired BCN for a given period of time, what is the largest data size of each transaction, etc.
2. A policy management initiator may send a trigger to the policy enforcer in order to kick off the policy management, based on certain inputs. For example, a BNA or a BCA may be a policy management initiator and it may send a trigger to a BCF to kick off a blockchain-related policy. The policy management initiator may be the policy enforcer.
   a. For example, a policy management initiator may retrieve/collect some data and send the data (as a trigger) to the policy enforcer, in order to trigger the policy management. For example, the BNA may send its own data to the BCF, which takes the role of a policy enforcer. Alternatively, the BNA may ask the BCF to collect certain related data from the communication infrastructure.
3. The policy enforcer starts to enforce the policy due to the received trigger, based on the data inputs. The consequence is that certain executable operation rules may be generated by applying the policy to the data inputs. For example, the BCF (as the policy enforcer) may enforce the policy, and create specific operation rules, e.g., blockchain transaction creation rules, blockchain transaction size control rules, BCN access control rules, etc.
4. The policy enforcer may send the generated executable operation rules to one or more operation execution entities, which may be BCNs, other BCFs, or NFs in the 3GPP system. It is worth noting that for a given BCF, it not only may be a policy enforcer, but also an operation execution entity for conducting blockchain-related operations (since policy enforcer and operation execution entity are all logical roles).

5. The operation execution entities receive the operation rules and apply the rules when executing their corresponding operations. For example, when the applications (such as BCAs or BNAs) send requests to a BCF for a particular blockchain-related operation, the BCF may use the previously-generated policy rules to decide the operation is permitted or meet the certain requirements, etc.

Figure 36:
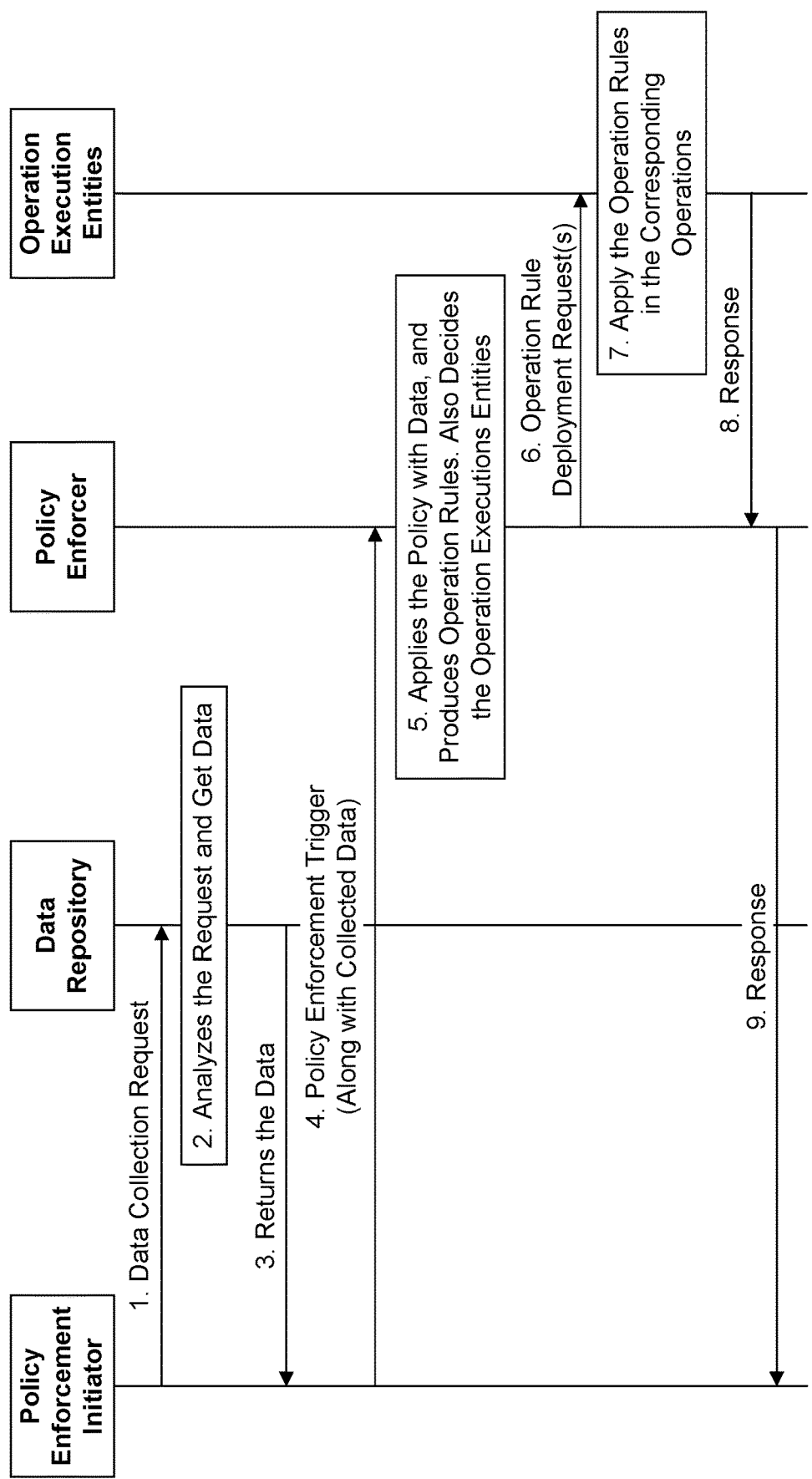
FIG. 36 illustrates an example procedure for policies enforcement.

FIG. 36 illustrates an example procedure for policies enforcement.

Step 1: A policy management initiator may send a data collection request to a data repository.

Step 2: The data repository returns the data to the policy management initiator.

Step 3: The policy management initiator may send a policy trigger to a policy enforcer, along with the data collected in Step 2 as well as the ID of the policy to be enforced. In the case where data collection is not needed, Step 1 to Step 3 may be skipped.

Alternatively, the policy enforcer may be triggered to apply a policy by certain events monitored by the policy enforcer. Also, the enforcer may collect certain data by itself, which is to be used when enforcing a policy.

Step 4: The policy enforcer may validate the request and decide whether to enforce the policy as requested. If so, the policy enforcer starts to enforce the policy, e.g., by applying the policy with the needed data inputs.

Step 5: The policy enforcer may work out a set of operation rules, as the result of enforcing the policy. The policy enforcer may decide who are the operation execution entities. The generated operation rules may be deployed to the operation execution entities.

Step 6: The policy enforcer may send the generated operation rules to one or more operation execution entities.

Step 7: The operation execution entities receivers the operation rules and start to execute the rules in the corresponding operations when needed.

Step 8: The operation execution entities send acknowledgments to the policy enforcer.

Step 9. The policy enforcer may send a response to the policy management initiator.

It is worth noting that the procedure of policy deployment and policy management can and/or may also be triggered by other types of requests. For example, a BNA registration request to a BCF may also trigger a policy deployment and policy management process as illustrated in FIG. 35 and FIG. 36. In such a case, the BNA is both a policy creator and a policy management initiator.

Figure 37:
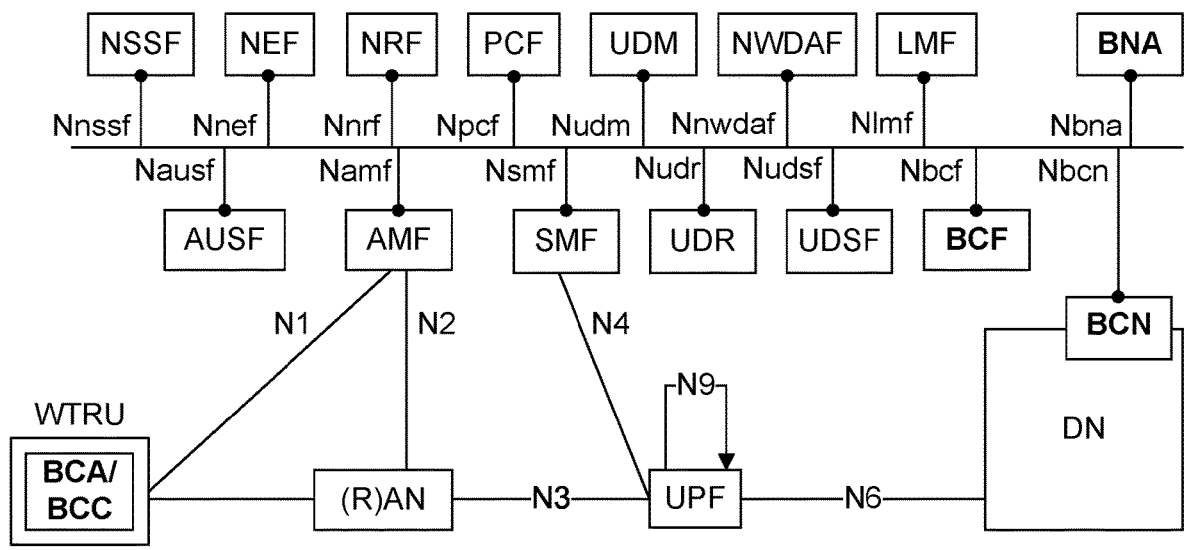
FIG. 37 illustrates an example 5G system architecture extension with blockchain applications enablement.

Representative Blockchain Application Enabler Architecture in 5G System Architecture FIG. 37 shows the embodiment of the proposed blockchain-related logical entities in the context of 5G and beyond system architecture. The core network refers to either a 5G core network or a future wireless core network.

BCF may be implemented as a new control plane Network Function (NF) or an Application Function (AF). BCF may reside in a core network or an edge network. BCF may interact with existing core network functions. For example, BCF may register itself to a NRF so that it may discover or be discovered by other network functions. The BCF may use AUSF to authenticate any received blockchain-related request or message from WTRUs (i.e., from BCAs/BCCs). The BCF may check with PCF for any blockchain-related policies (in case the policy is to be enforced by PCF). The BCF may use UDR or UDSF to store some blockchain-related policies. The BCF may be exposed to and accessed by third-parties as facilitated by NEF. The BCF may use NWDAF to analyze transactions and/or other features of a blockchain.

BCF may also be implemented as a part of an existing network function such as NEF or AUSF.

BCN may be a new network function within the core network or outside of the core network as provided by a third-party. If BCN is provided by a third-party, BCF may access the 3GPP core network via NEF.

BNA may be implemented as a server-side network function entity corresponding to a particular vertical wireless application. If BNA is provided by a third-party, it cannot interact with BCF directly, but via NEF (in case that BCF is deployed in the core network of 3GPP network).

BCA and BCC may be implemented within a WTRU. Alternatively, a constrained WTRU such as a narrowband IoT device may host BCA only, and BCC may be hosted by other powerful WTRUs such as a vehicle, a gateway, an edge server, etc.

Alternatively, there may be some other possible embodiments of the proposed blockchain-related logical entities in the context of 5G and beyond system architecture, which are listed as below:

For a BCC, it may also be deployed at an AMF. In this way, one BCC may serve multiple BCAs hosted by WTRUs. A potential benefit is that it may simplify the implementation of WTRU in the sense that WTRUs just need to install specific vertical applications. It may also save certain computing resources for the WTRUs since BCC may be deployed with an AMF and WTRUs do not have to run tasks related to blockchain-related operations to be done by a BCC. In such a case, most of the communications between a BCA and a BCC may be implemented through the N1 reference point and the proposed parameters for BCA-BCC communications in this disclosure may also be carried by the messages over the N1 reference point.

Another possible embodiment is that the proposed BCF may be realized by an AMF. In other words, the proposed BCF is a new value-added service provided by the existing AMF. In such a case, all the proposed procedures and new parameters related to BCF may be related to AMF in the 5G system.

In addition, any current network function (e.g., an AMF) may need to interact with BCF directly for utilizing the service provided by BCF. To the end, BNA functionality may be implemented inside a network function; thus, the network function with an embedded BNA may interact with BCF directly. The proposed interaction between BNA and BCF in this disclosure may be implemented as new procedures between a current network function and BCF.

FIG. 39 describes a few cases/choices for deploying the proposed blockchain-related entities in 5G and beyond system architecture. Again, the core network refers to either a 5G core network or a future wireless core network.

In FIG. 39 (a), BCA and BCC are implemented within a WTRU. Thus, the interface between BCA and BCC collapses to an internal API. Both BCF and BCN are implemented as a core network function, while BNA is implemented as a network application that may be within the core network or outside of it. For this type of deployment, it may be regarded as the deployment embodiment of the Scenario 2 and Scenario 3 discussed in BCF discovery and BCC/BCA registration.

In FIG. 39 (b), there is an edge network, a relay node, and/or a small cell network between the WTRU and the core network. BCA is still implemented within the WTRU, but the edge network (or the relay node/small cell) hosts BCC. The core network still hosts BNA, BCF, and BCN. BCA on the WTRU uses BCC in order to interact with BNA, BCF, and BCN in the core network. For this type of deployment, it may be regarded as the deployment embodiment of the Scenario 2 and Scenario 3 discussed in BCF discovery and BCC/BCA registration.

In FIG. 39 (c), there is an edge network, a relay node, and/or a small cell network between the WTRU and the core network. For this type of deployment, it may be regarded as the deployment embodiment of Scenario 1, Scenario 2, and Scenario 3 discussed in BCF discovery and BCC/BCA registration. For Scenario 1, BCA and BCC are still implemented within the WTRU. The core network hosts BNA, BCF1, and BCN1. Furthermore, the edge network (or the relay node/small cell) hosts another BCF2 and BCN2. BCC on the WTRU may talk to BCF1 directly (i.e., BCF1 is the home BCF of the WTRU in Scenario 2), or indirectly via BCF2. The BCC may (e.g., may only) talk to BCF2 (i.e., BCF2 is the first-contact or visited BCF of the WTRU in Scenario 1) since it is located closer to the WTRU. In this case, it also shows BCF-to-BCF communication. For Scenario 2 and Scenario 3, we can have the following deployment, for example: BCC on the WTRU may talk to BCF1 directly (i.e., BCF1 is the registered BCF of a BCA-1 and BCF2 is the registered BCF of a corresponding BNA of BCA-1 in Scenario 2), or indirectly via BCF2. The BCC may (e.g., may only) talk to BCF2 (BCF-2 is the registered BCF of a BCC in Scenario 3) since it is located closer to the WTRU.

In FIG. 39 (d), the WTRU not only hosts BCA/BCC but also BCF2. The edge network (or the relay node/small cell) only hosts BCN2. The core network still hosts BNA, BCF1, and BCN1. In order to access a blockchain, the WTRU may use BCF2 to talk to BCN2 directly or let BCF2 access BCN1 indirectly via BCF1 in the core network. In this case, it also shows BCF-to-BCF communication. Same as Case 3, for this type of deployment, it may be regarded as the deployment embodiment of the Scenarios 1-3 discussed in BCF discovery and BCC/BCA registration.

FIG. 38 illustrates example blockchain-enabled wireless applications deployment scenarios in 5GS.

FIG. 39 describes a few cases/choices for realizing the proposed entities (such as BCF, BCC and BNA) by using the existing function entities in the 5G system, such as AMF:

In case 1 shown in FIG. 39 (a), BCF is implemented as a new value-added service of the AMF.
Accordingly, the BCA/BCC may communicate with the AMF through the N1 interfaces, in which the new parameters proposed in this disclosure may be carried.
In case 2 shown in FIG. 39 (b), BCC is implemented by the AMF. In such a case, the communication between BCA and BCC may go through the existing N1 interface between WTRU and AMF.
In case 3 shown in FIG. 39 (c), BNA is implemented by the AMF. Accordingly, when the BCA/BCC intends to communicate with the BCF, BCA/BCC may need to first go through AMF over the N1 interface, and then it is the AMF to help BCA/BCC to interact with BCF.

In this embodiment, if AMF itself intends to use blockchain services, it may also act as a BNA to interact with BCF directly by using the proposed procedure in this disclosure.

Representative Blockchain Policy Management

Figure 40:
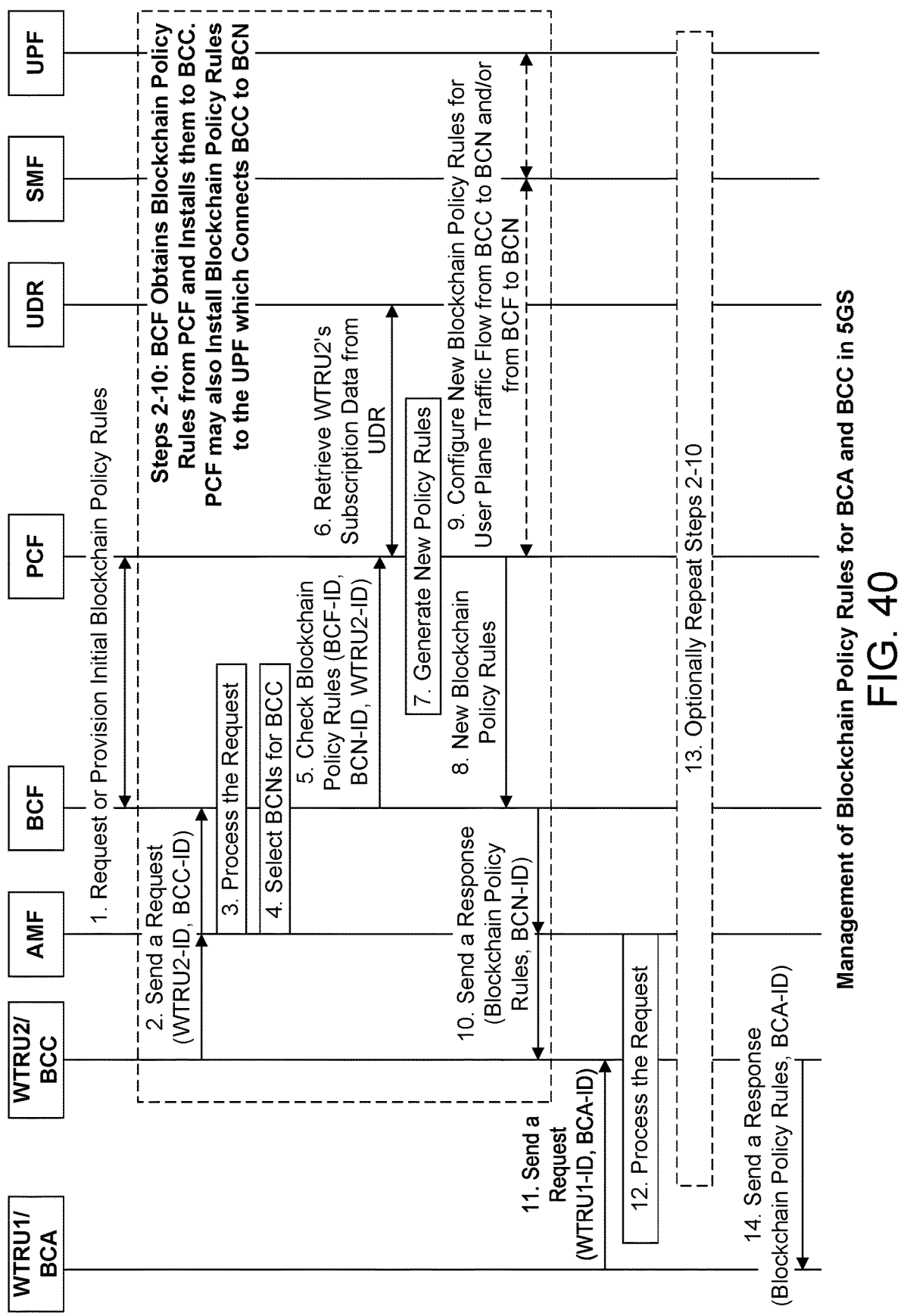
FIG. 40 illustrates an example management of blockchain policy rules for BCA and BCC in 5GS.

FIG. 40 illustrates a procedure for managing blockchain policy rules for a BCA and/or a BCC in 5GS, which may be regarded as a 3GPP embodiment of the procedure shown in FIG. 36. Although it is shown in the figure that the BCA resides in WTRU1 and the BCC is hosted by WTRU2, both the BCA and the BCC may be co-located within the same WTRU.

Pre-condition(s): A BCC may discover a BCF, and the BCC is discovered by a BCA. The BCF may discover a PCF, for example via an NRF. The BCF knows one or multiple blockchain networks and corresponding BCNs. WTRUs that host the BCA and the BCC have established a connection with their serving AMF. Comparing the entities between FIG. 40 and FIG. 36, we can see the following role assignment:

Policy management initiator in FIG. 36: BCC in FIG. 40
Policy enforcer in FIG. 36: PCF in FIG. 40
Data repository in FIG. 36: UDR in FIG. 40.
Operation execution entities in FIG. 36: UPF, SMF, BCC in FIG. 40

Step 1: The BCF may request some initial blockchain policy rules from the PCF. Alternatively, the BCF may have made a subscription to PCF. As a result, the PCF may provision some initial blockchain policy rules to the BCF. For example, an initial blockchain policy rule may be: A WTRU is not allowed to access a list of blockchain networks in specific service areas to avoid generating extra blockchain traffic to these service areas. Another example may be: The BCF may (e.g., may only) allowed to serve a list of specific BCAs/UEs.

Step 2: The BCC (as a policy management initiator) may send a request to the BCF via WTRU2's serving AMF. The request may be a BCC registration request (during which BCC can and/or may help BCA to register to BCF if BCC knows certain information of BCA) or a simple request for enforcing a policy in order to create/checking new blockchain policy rules. This request may include the BCC's identifier (i.e., BCC-ID) and WTRU identifier (i.e., WTRU2-ID). If the BCC has been provided with any blockchain policy rule, the BCC may also include a list of identifiers of existing blockchain policy rules in this request. Such information may allow the BCF to avoid configuring the same blockchain policy rules to the BCC again.

Step 3: The BCF may processes the request. The BCF may directly reject the request based on any local blockchain policy rules such as initial rules received from the PCF, especially when the request is a registration request for registering the BCC to the BCF.

Step 4: The BCF may select one or multiple BCNs for the BCAs hosted by WTRU in case the Step 2 is a BCC registration request (during which BCC can and/or may also help BCA to register to BCF if BCC knows certain information of BCA). Or, if BCA has already been assigned with a BCN due to a previous registration, this step may just select the previously-assigned BCN to BCC/BCA.

Step 5: The BCF may send a request to the PCF for checking if there are any new blockchain policy rules for the BCC. This request may include the BCF's identifier (i.e., BCF-ID), the identifier of selected BCNs in Step 4 (i.e., BCN-ID), and/or WTRU2-ID, BCC-ID, BCA-ID. The BCF may also inform the PCF if it and/or the BCC/BCA may use 5G control plane or data plane to store data (i.e., create blockchain transactions) to target blockchain networks as represented by BCN-ID. If the BCF or the BCC may use data plane, Step 9 may be required. If the BCF or the BCC may use control plane, Step 9 may be skipped.

Step 6: The PCF may process the request from Step 5. The PCF may retrieve WTRU2's subscription data from a UDR using WTRU2-ID. The WTRU2's subscription data may include some specifications and/or restrictions (service area restrictions), which may be used to generate new blockchain policy rules for WTRU2. If a target blockchain network is defined and supported by 5GS as a LADN. WTRU2's subscription data may include a LADN service area, which implies that WTRU2 may only access the target blockchain network when it stays in this LADN service area.

Step 7: Based on the response (i.e., subscription data) from the UDR, the PCF may generate some new blockchain policy rules.

Step 8: The PCF may send new blockchain policy rules generated in Step 7 to the BCF.

Step 9: The PCF may configure some blockchain policy rules to a UPF via a SMF. Using WTRU2-ID, the PCF may determine WTRU2's SMF from the UDM. The configured policy rules may be used by the UPF to regulate and manage data plane blockchain traffic between the BCC and a selected BCN. This step is skipped if the BCC does not use data plane for communication with the BCN.

Step 10: The BCF may send a response back to the BCC via WTRU2's serving AMF. This response may include new blockchain policy rules and BCN-ID.

Note that Steps 2-10 are used for the BCF to create new blockchain policy rules and may configure them (or some of them) to the BCC. The PCF may install blockchain policy rules to the UPF which connects the BCC to BCNs. Besides, without any request from the BCC, the BCF may trigger to perform Steps 4-9 to get some new blockchain policy rules. After that, it can and/or may configure and install them to one or more BCCs.

Step 11: Instead of initiating a policy management by a BCC, BCA may initiate a policy management in order to create policy rules. The BCA may send a request to the BCC by giving WTRU1-ID and BCA-ID. The request may be a BCA registration request or a simple request for checking new blockchain policy rules. WTRU1 may reach WTRU2 directly using device-to-device communications or relayed by their serving AMF (either the same one or different ones).

Step 12: The BCC may process the request from the BCA and may generate a new BCA-ID when the request is a BCA registration request.

Step 13: The BCC may repeat Steps 2-10 by registering itself and/or BCA to the BCF or just simply requesting for new blockchain policy rules from the BCF.

Step 14: The BCC may send a response to the BCA, which may include new blockchain policy rules and BCA-ID if the BCC generates a BCA-ID in Step 12. WTRU2 may reach WTRU1 directly using device-to-device communications or relayed by their serving AMF (either the same one or different ones).

Figure 41:
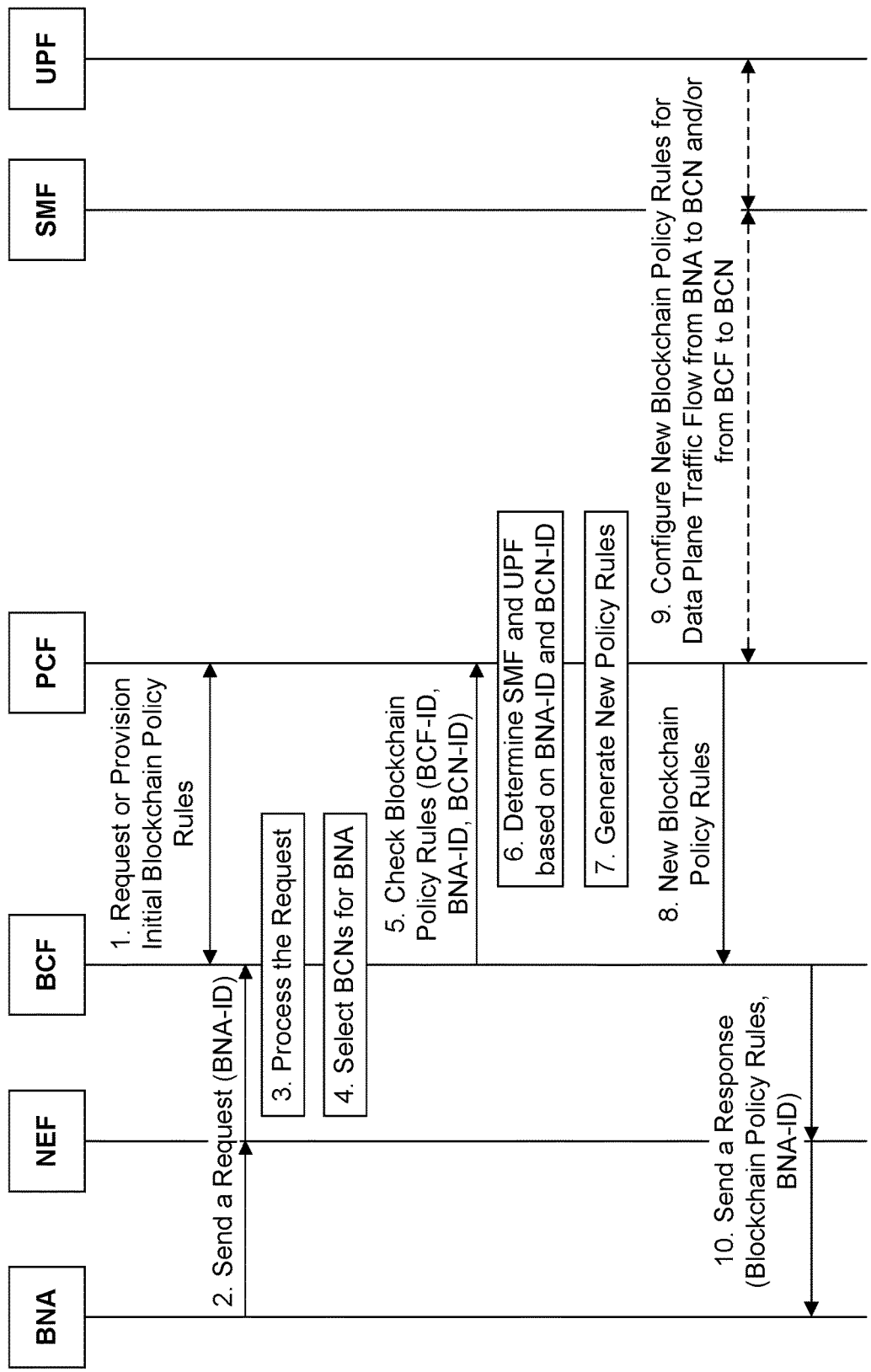
FIG. 41 illustrates an example management of blockchain policy rules for BNA in 5GS

FIG. 41 illustrates a procedure for managing blockchain policy rules for a BNA in 5GS. This embodiment corresponds to the case where BCF does full arrangements for BNA and BNA has no capability to directly interact with PCF and all interaction may be helped by the BCF.

Pre-condition(s): A BNA may discover a BCF. The BCF may discover a PCF, for example via an NRF. The BCF knows one or multiple blockchain networks and corresponding BCNs.

Step 1: The BCF may request some initial blockchain policy rules from the PCF. Alternatively, the BCF may have made a subscription to PCF. As a result, the PCF may provision some initial blockchain policy rules to the BCF. For example, an initial blockchain policy rule may be: The BCF is only allowed to serve a list of specific BNAs.

Step 2: The BNA may send a request to the BCF, which may be relayed by a NEF. The request may be a BNA registration request or a simple policy management request for checking new blockchain policy rules. This request may include the BNA's identifier (i.e., BNA-ID). If the BNA has been provided with any blockchain policy rule, the BNA may also include a list of identifiers of existing blockchain policy rules in this request. Such information may allow the BCF to avoid configuring the same blockchain policy rules to the BNA again.

Step 3: The BCF may processes the request. The BCF may directly reject the request based on any local blockchain policy rules such as initial rules received from the PCF, especially when the request is a registration request for registering the BNA to the BCF. When the request is a registration request, the BCF may generate a new BNA identifier (i.e., BNA-ID).

Step 4: The BCF may select one or multiple BCNs for the BNA.

Step 5: The BCF may send a request to the PCF for checking if there are any new blockchain policy rules for the BCC. This request may include the BCF's identifier (i.e., BCF-ID), the identifier of selected BCNs in Step 4 (i.e., BCN-ID), and/or BNA-ID. The BCF may the inform PCF if it and/or the BNA may use 5G control plane or data plane to store data (i.e., create blockchain transactions) to target blockchain networks as represented by BCN-ID. If the BCF or the BNA may use data plane, Step 6 and Step 9 may be required. If the BCF or the BNA may use control plane, Step 6 and Step 9 may be skipped.

Step 6: The PCF may process the request from Step 5 and may determine a SMF and a UPF for the data path between the BNA (or the BCF) and BCNs.

Step 7: The PCF may generate some new blockchain policy rules.

Step 8: The PCF may send new blockchain policy rules generated in Step 7 to the BCF.

Step 9: The PCF may configure some blockchain policy rules to the UPF via the SMF. The configured policy rules may be used by the UPF to regulate and manage data plane blockchain traffic between the BNA and a selected BCN (or the BCF). This step is skipped if the BNA (or the BCF) does not use data plane for communication with the BCN.

Step 10: The BCF may send a response back to the BNA, which may include new blockchain policy rules and BNA-ID if the BCF generates a BCA-ID in Step 3. This response may be relayed by the NEF.

Figure 42:
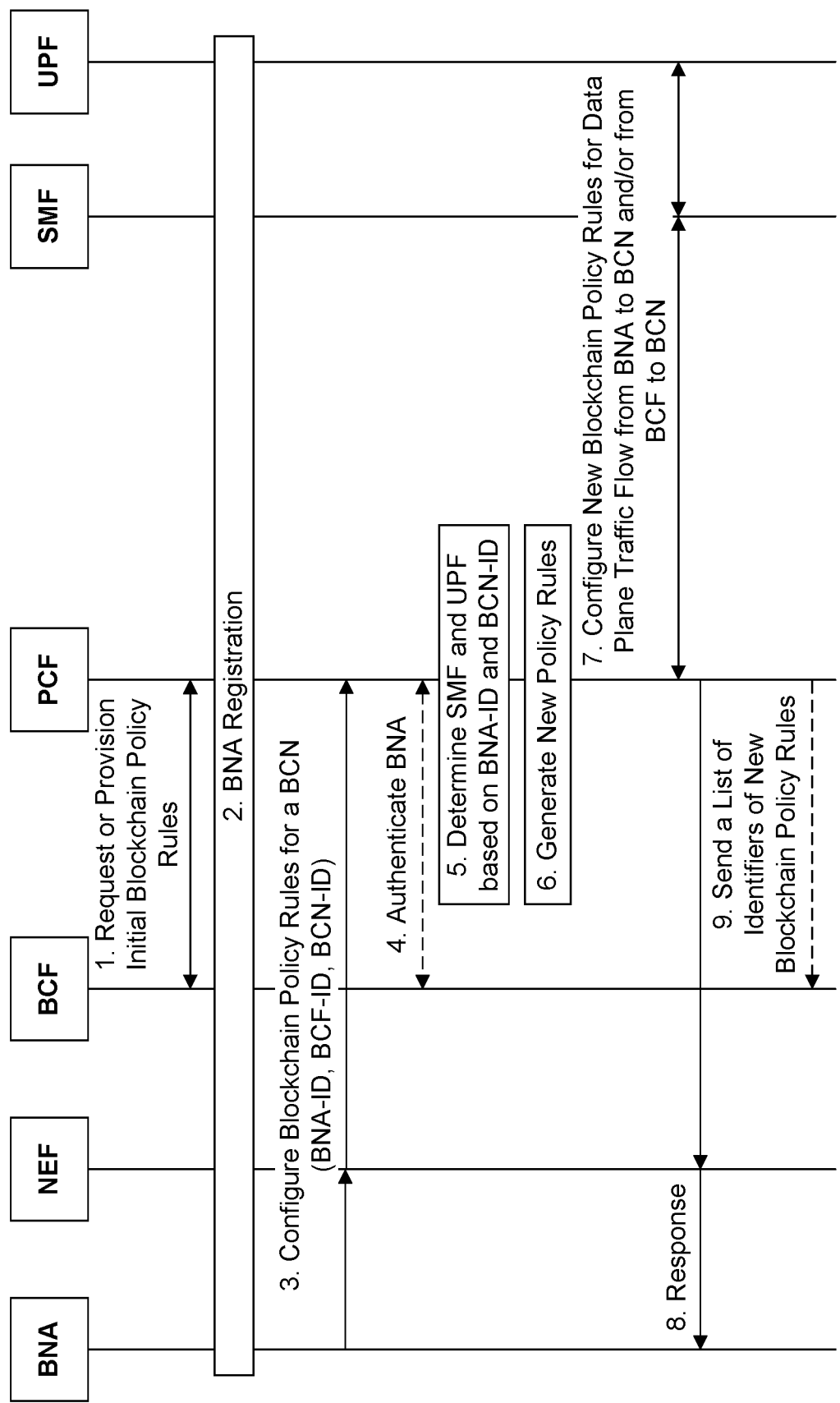
FIG. 42 illustrates an example BNA-triggered blockchain policy update in 5GS.

FIG. 42 illustrates a procedure for configuring blockchain policy rules for data plane traffic from/to one or more blockchain networks. This embodiment corresponds to the case where BCF only does partial arrangements for BNA and BNA has the capability to directly interact with PCF.

Pre-condition(s): A BNA may discover a BCF. The BNA also may discover a PCF, for example via an NEF/NRF. The BCF knows one or multiple blockchain networks and corresponding BCNs.

Step 1: The BCF may request some initial blockchain policy rules from the PCF. Alternatively, the BCF may have made a subscription to PCF. As a result, the PCF may provision some initial blockchain policy rules to the BCF. For example, an initial blockchain policy rule may be: The BCF is only allowed to serve a list of specific BNAs.

Step 2: The BNA may register itself to the BCF. As a result, the BNA may know a list of blockchain networks (i.e., one or multiple BCNs).

Step 3: The BNA may send a request to the PCF and asks the PCF to configure some blockchain policy rules to one or more BCNs. This request may include the identifier of the BNA (i.e., BNA-ID), the identifier of the BCN (i.e., BCF-ID), and/or the identifiers of BCNs (i.e., BCN-ID). This request may be relayed by a NEF.

Step 4: The PCF may contact the BCF to authenticate the BNA and authorize if the BNA has the right to configure blockchain policy rules to BCNs.

Step 5: The PCF may determine a SMF and a UPF for the data path from/or the BCNs, based on BCN-ID and BNA-ID.

Step 6: The PCF may generate some new blockchain policy rules.

Step 7: The PCF may configure some blockchain policy rules to the UPF via the SMF. The configured policy rules may be used by the UPF to regulate and manage data plane blockchain traffic from/to BCNs.

Step 8: The PCF may send new blockchain policy rules generated in Step 6 to the BCF.

Step 9: The PCF may send a response back to the BNA, which may include the list of identifiers of new blockchain policy rules being configured to the UPF in Step 7. This response may be relayed by the NEF.

Representative Embodiments of BCF Discovery and BCC/BCA Registration

Previously new solutions were proposed in three different scenarios for BCF discovery and BCC/BCA registration. In particular, each of the scenarios has its own system settings and assumptions. 3GPP embodiments of BCF Discovery and BCC/BCA Registration are presented. Note that, the embodiments are the applicable embodiments of the solutions proposed in all three scenarios.

FIG. 4 illustrates some general procedures in 5G system architecture which are jointly performed by a WTRU, RANs, and 5GC sequentially to enable the WTRU to fulfill the following functionalities. As a result, several levels of connection/sessions (i.e., RRC Connection, AMF Connection, and PDU Session) are established between a WTRU and other 5GS entities, which allow the WTRU to send/receive control plane traffic to/from the core network and send/receive data plane traffic to/from data networks via UPFs.

Step 1: The WTRU may discover and select a network (i.e., a PLMN, a RAN, a cell) based on the received System Information Block (SIB), which RANs broadcast to all WTRUs.

Step 2: The WTRU may establish a Radio Resource Control (RRC) connection with the selected RAN (e.g., RAN1), so that the WTRU may communicate with the core network via the selected RAN.

Step 3: The WTRU may initiate a registration with a serving AMF, which is determined by the selected RAN. This step may be the first embodiment of a BCF discovery. In this case, one or multiple parameters included in the BCF discovery request may be included in this 3GPP registration request. Alternatively, if the WTRU already knows which BCF to register, this step can and/or may also be the first embodiment of a BCC/BCA registration. In this case, one or multiple parameters included in the BCC/BCA registration request may be included in this 3GPP registration request.

Step 4: The WTRU may establish a PDU session for a designated DN with an SMF, which is determined by the serving AMF. This step may be a second embodiment of a BCF discovery. In this case, all the parameters included in the BCF discovery request may be included in this 3GPP PDU session establishment request from the WTRU. Alternatively, if the WTRU already knows which BCF to register, this step may also be the second embodiment of a BCC/BCA registration. In this case, all the parameters included in the BCC/BCA registration request may be included in this 3GPP request.

Step 5: When the WTRU enters to CM-IDLE state (e.g., after the WTRU's connection with the serving AMF is released), the WTRU (e.g., in Mobile Initiated Connections Only (MICO) mode) may actively initiate service request procedure to reestablish a connection with the serving AMF and enters to CM-CONNECTED state. If the WTRU is not in MICO mode, the serving AMF may page and trigger the WTRU to initiate a service request procedure, for example, to receive any downlink packets. This step may be a third embodiment of a BCF discovery. In this case, one or multiple parameters included in the BCF discovery request may be included in this 3GPP service request. Alternatively, if the WTRU already knows which BCF to register, this step may also be the third embodiment of a BCC/BCA registration. In this case, one or multiple parameters included in the BCC/BCA registration request may be included in this 3GPP service request.

Step 6: The WTRU now starts data plane data transmission with the designated DN via RAN and the UPF as PSA. Note that each DN has a Data Network Name (DNN).

Step 7: When the WTRU moves from Registration Area (RA)1 to RA2, it may detect this event by checking the list of TAs for each RA as configured by the serving AMF. The WTRU may perform a Mobile Registration Update a new serving AMF. During this step, Xn-based or N2-based inter-RAN handover may be performed between the new RAN and the old RAN. The new serving AMF contacts the old serving AMF for transferring WTRU's context information. In this step, the SMF may contact PCF and UPF to update existing PDU sessions with the WTRU. This step may be the fourth embodiment of a BCF discovery. In this case, one or multiple parameters included in the BCF discovery request may be included in this 3GPP mobile registration update request. Alternatively, if the WTRU already knows which BCF to register, this step may also be the fourth embodiment of a BCC/BCA registration. In this case, one or multiple parameters included in the BCC/BCA registration request may be included in this 3GPP mobile registration update request.

In another approach, BCF may be implemented as a 5G network function. As such, a BCF may first register itself to an NRF. As a result, application functions, other network functions (e.g., a serving AMF for its WTRUs), and/or other BCFs may discover any registered BCF from the NRF. Specifically, the BCF first may send a BCF registration request to the NRF, which may include BCF information and other repository information the BCF maintains such as BNA repository, BCA repository, and BCN repository. The NRF may receive the BCF registration request, may processes it and create a new BCF record as a part of network function repository the NRF maintains. The NRF may send a response to the BCF indicating the success or the failure of the BCF registration. Another entity-X (e.g., another BCF, another network function, another application function) may send a BCF discovery request to the NRF. The NRF may processes the BCF discovery request, looks up BCF records it has maintained, and may determine a list of registered BCFs that match the discovery condition as included in the BCF discovery request. The NRF may send the list of discovered BCFs to entity-X.

Representative 3GPP Embodiments of BCF-to-BCF Interaction 5G data storage architecture includes three data-related entities: Unified Data Management (UDM), Unified Data Repository (UDR), and Unstructured Data Storage Function (UDSF). When there are multiple BCFs in the system, there are a couple of new ways of enabling BCF-to-BCF interaction. For example, two BCF may exchange information directly as described previously, or indirectly via these data-related 3GPP entities. In particular, the following information may be stored in the UDR by BCFs in order for different BCF to exchange information.

For example, UDR may store the following types of information:

BCF network topology information. In such a case, BCFs may communicate with each other through UDR regarding the peer BCFs they know (e.g., BCF-1 knows and connects to two other BCFs, i.e., BCF-5 and BCF-6. BCF-2 knows and connects to three other BCFs, i.e., BCF-9 and BCF-10 and BCF-11). Through this UDR, BCFs may gradually know all other peer BCFs in the system and the network topology between BCFs.

BNA information. In such a case, BCFs may communicate with each other regarding the information stored in their BNA registration repository.

BCA information exchange request. In such a case, BCFs may communicate with each other regarding the information stored in their BCA registration repository.

BCN information exchange request. In such a case, BCFs may communicate with each other regarding the information stored in their BCN registration repository.

BCF subscription information. In such a case, a BCF-1 may be interested in certain events or information that may be captured by another BCF-2. Therefore, the BCF-1 may make subscriptions to BCF-2 and get notifications.

In case that BCF is a NF in 5G networks, the BNA registration repository, the BCA registration repository and the BCN registration repository of the BCF may be implemented using UDR (i.e., For a BCF, all the registration information of its managed BCAs, BNAs, BCNs may be stored in UDR).

Alternatively, multiple BCF may register themselves to Network Repository Function (NRF) in order to be discovered by each other.

In addition, the above approaches can and/or may also be used by a BCC/BCA to find a BCF.

Another possible embodiment is that the proposed BCF may be realized by an existing function in the 5GS, such as an AMF, or SMF, etc. In other words, the proposed BCF is a new value-added service provided by the existing functional entities. For example, the following cases may be two embodiments of BCF-to-BCF communications:

In a 5G system, an AMF and a SMF implements the BCF function respectively. In such a case, the BCF-to-BCF communication is embodied as the AMF-to-SMF communications.

In a 5G system, two network slides are created, and each of them includes an AMF instance, and each of the AMF instances implements the BCF function. In this case, the BCF-to-BCF communication is embodied as the AMF-to-AMF communications between two different networking slices.

Representative Embodiments of BCN Registration and BCN Management

BCN functionalities including the maintenance of blockchains/ledgers may be implemented as a UDSF. As such, a BCN as a UDSF (referred to as BCN-UDSF) may register itself including its capabilities and the information about the affiliated blockchain systems to an NRF. In other words, a BCN-UDSF may send a registration request to the NRF. The registration request may contain one or multiple parameters as included in Step 1 of FIG. 12 for basic BCN registration. The NRF may processes this registration request and may create a new BCN-UDSF record (similar to BCN Registration Repository which a BCF maintains). The NRF may send a registration response to the BCN-UDSF, which is similar to Step 3 of FIG. 12. A BCF may search BCN capabilities and corresponding blockchain system information from the NRF by sending a BCN discovery request to the NRF. the NRF may processes the BCN discovery request, searches the maintained BCN-UDSF records to find any matching record, and returns the matching record to the BCF. Alternatively, the BCF may send a subscription request to the NRF to subscribe on any new BCN-UDSF registration. When a new BCN-UDSF registers to the NRF. The NRF may send a notification to the BCF including all subscribed information about the BCN-UDSF and its affiliated blockchain system.

Likewise, a BCN-UDSF may send a reporting request to the NRF to report the current status of itself and/or the affiliated blockchain system. The report request may include one or multiple parameters as included in Step 1 of FIG. 15. The NRF may processes this reporting request and updates corresponding BCN-UDSF record. A BCF may actively send a request to the NRF to retrieve the latest BCN-UDSF records and use subscription mechanism to receive automatic notification of new BCN-UDSF records from the NRF whenever a BCN-UDSF attempts to update its status as stored in the NRF.

Representative Integration of Blockchain Application Enablement and Other Vertical Application Enablement 3GPP SA6 has introduced a few vertical applications for mission-critical scenarios, which include edge application, V2X application, Factories of the Future (FF) application, 5G Messaging Service (5GMSGS) application, Unmanned Aerial System (UAS) application, etc. For each of these vertical applications, 3GPP SA6 defines an application enablement layer. In general, the application enablement layer consists of entities such as: Vertical Application Client (VAC), Vertical Enablement Client (VEC), Vertical Enablement Server (VES), and Vertical Application Server (VAS). VAC and VEC may be co-located within a WTRU. Table 1 shows how VAC, VEC, VES, and VAS map to entities defined in each vertical application layer enablement.

TABLE 1

Entities in SA6 Vertical Application Layer Enablement

| Entities | Edge Application | V2X Application | FF Application | UAS Application | 5GMSGS Application |
|---|---|---|---|---|---|
| VAC | Application Client | V2X Application-Specific Client | FF Application-Specific Client | UAS Application-Specific Client | Application |
| VEC | Edge Enabler Client | V2X Application Enabler Client | FF Application Enabler Client | UAS Application Enabler Client | 5GMSGS Client |
| VES | Edge Enabler Server | V2X Application Enabler Server | FF Application Enabler Server | UAS Application Enabler Server | 5GMSGS Server, 5GMSGS Gateway |
| VAS | Edge Application Server | V2X Application Specific Client | FF Application Specific Client | UAS Application Specific Client | Application Server |

These vertical applications may use blockchain application enablement, for example, to store their communication records to a target blockchain, and/or to transmit unicast or multicast messages through a target blockchain network. Thus, these vertical applications may be beneficial from blockchain features such as decentralization, immutability, transparency, and security. To enable vertical applications to interact with blockchain application enablement, three integration architectures are proposed, respectively, in FIG. 43, FIG. 44 and FIG. 45.

Figure 43:
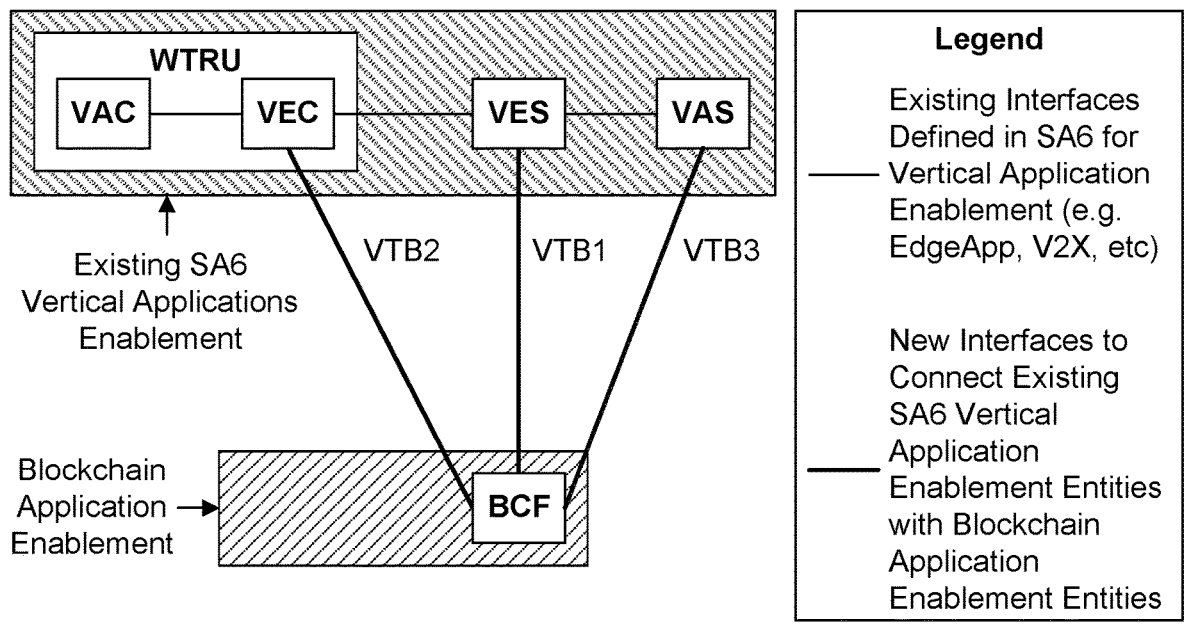
FIG. 43 illustrates an example of integrating existing vertical application enablements with blockchain application enablement.

In the integration model 1, as shown in FIG. 43, there are two approaches for vertical application to communicate with blockchain application enablement.

- Approach-1: A VES may discover a BCF and may register to the BCF. The VES may behave like a BCC, a BNA. After registration, the VES may interact with the BCF on behalf of any VAC, any VEC, and any VAS via a Vertical-To-Blockchain (VTB1) interface. In this approach, a VAC/VEC/VAS cannot directly communicate with the BCF, but indirectly via the VES. Through the VES and the BCF, the VEC (or the VAS) may access any target blockchain network that the BCF interfaces with. The VEC is on behalf of a VAC as needed. After setup is complete (e.g., after VEC/VAC/VES/VAS/BCF are connected and operable), the VEC may be regarded as a BCC, the VES may be regarded as a BCC and the VAS may be regarded as a BNA.
- Approach-2: A VES may help a VEC or a VAS to discover a BCF via a VTB1 interface. The VES may not register with the BCF. The VEC or the VAS may register to a BCF discovered via the VTB1 interface. After registration, the VEC or the VAS may directly communicate with the BCF, respectively, through VTB2 and VTB3 interfaces. Through the BCF, a VAC/VEC and a VAS may access any target blockchain network that the BCF interfaces with. The VEC is on behalf of a VAC as needed. After setup is completed, the VEC may be regarded as a BCC, the VES may be regarded as a BCC and the VAS may be regarded as a BNA.

Figure 44:
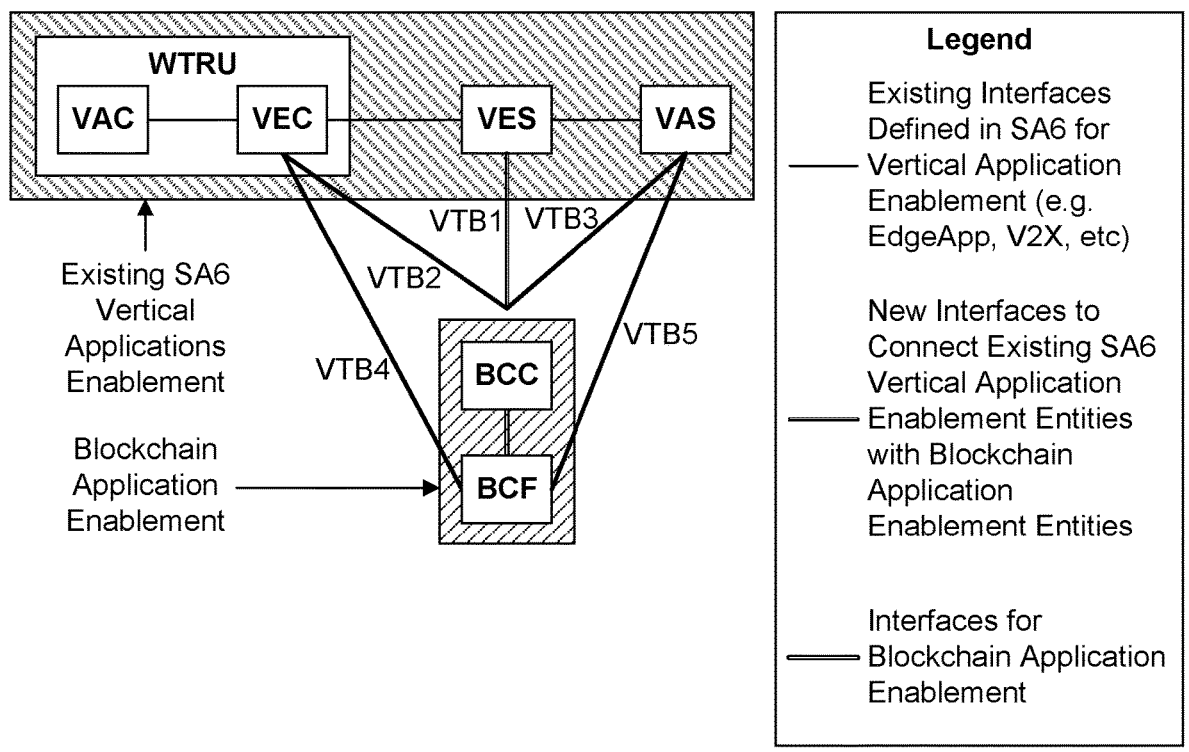
FIG. 44 illustrates an example of integrating existing vertical application enablements with blockchain application enablement.

In the integration model 2 as shown in FIG. 44, there are also three approaches for vertical application to communicate with blockchain application enablement.

- Approach-1: A VES may discovers a BCC. The VES may discover a BCC from a BCF. The VES may register to the BCC. After that, the VES may interact with the BCC on behalf of any VAC, any VEC, and any VAS. In this approach, a VAC/VEC/VAS cannot directly communicate with the BCC, but indirectly via the VES. Through the VES, the BCC, and the BCF, the VEC (or the VAS) may access any target blockchain network that the BCF interfaces with. The VEC is on behalf of a VAC as needed. After setup is completed, the VEC/VAS/VES may be regarded as a client of BCC.
- Approach-2: A VES helps a VEC (or a VAS) to discover a BCC. The VES may discover a BCC from a BCF. After that, a VEC (or a VAS) may register to the BCC. After registration, the VEC (or the VAS) may interact with the BCC directly, which may talk to the BCF on behalf of the VEC (or the VAS). Through the BCC and the BCF, the VEC (or the VAS) may access any target blockchain network that the BCF interfaces with. The VEC is on behalf of a VAC as needed. After setup is completed, the VEC/VAS/VES may be regarded as a client of BCC.
- Approach-3: A VEC (or a VAS) may discover a BCC and may register to the BCC. After that, the VEC (or the VAS) may interact with the BCC directly, which may talk to the BCF on behalf of the VEC (or the VAS). Through the BCC and the BCF, the VEC (or the VAS) may access any target blockchain network that the BCF interfaces with. The VEC is on behalf of a VAC as needed. After setup is completed, the VEC/VAS/VES may be regarded as a client of BCC.
- Approach-4: A VEC (or a VAS) may discover a BCC and may register to the BCC. The VEC (or the VAS) may discovers a BCF via the BCC. After that, the VEC (or the VAS) may communicate with the BCF directly. Through the BCF, the VEC (or the VAS) may access any target blockchain network that the BCF interfaces with. The VEC is on behalf of a VAC as needed. After setup is completed, the VEC may be regarded as a BCC, VES may be regarded as a BCC, and VAS may be regarded as a BNA.

Figure 45:
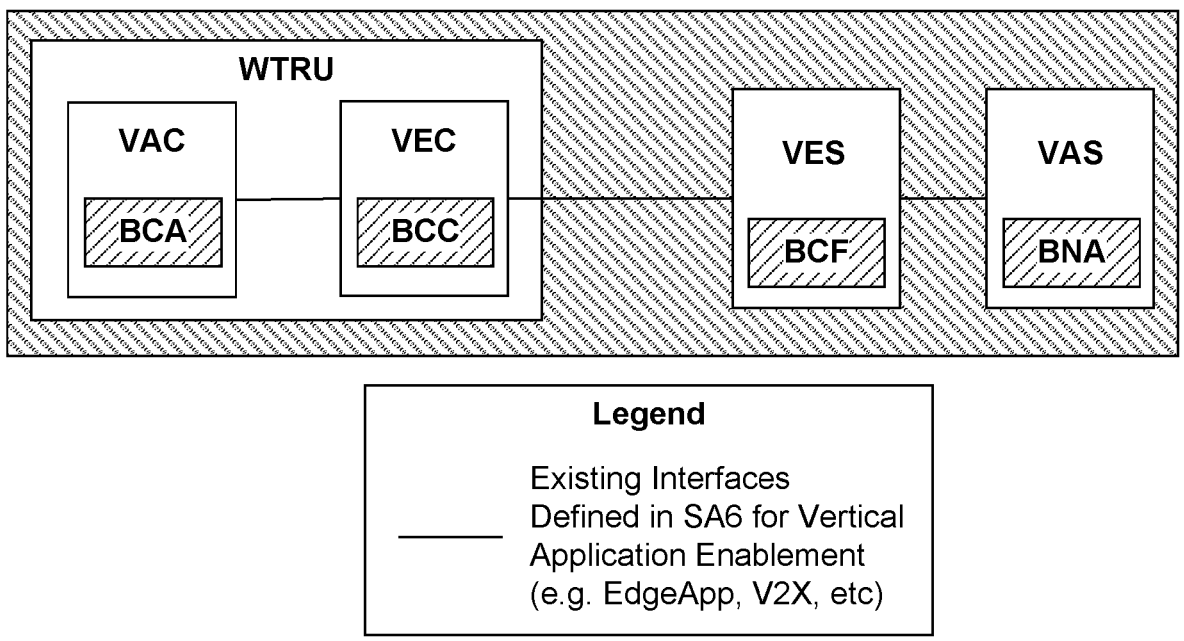
FIG. 45 illustrates an example of integrating existing vertical application enablements with blockchain application enablement.

FIG. 45 illustrates an example of integrating (e.g., SA6) existing vertical application enablements with blockchain application enablement-Model 3.

In the integration model 3, as shown in FIG. 45, the blockchain enablement may be directly realized or implemented inside the existing entities in various vertical application entities. For example, the VAC may implement all the functionalities of the BCA, the VEC may implement all the functionalities of the BCC, the VES may implement all the functionalities of the BCF, and the VAS may implement all the functionalities of the BNA. As a result, all the communications between BCC/BCF/BNA proposed in this disclosure may be using the existing interfaces defined in SA6 for vertical application enablement. In other words, all existing interfaces may be enhanced to support blockchain-related interactions between BCC/BCF/BNA as defined in this disclosure, e.g., to carry all the proposed new parameters proposed in this disclosure.

" " Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIG. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U.S.C. § 112, ¶6 or means-plus-function claim format, and any claim without the terms "means for" is not so intended.

What is claimed is:

1. A method implemented in a device comprising circuitry, including a transmitter, a receiver, a processor and memory, the method comprising:
   receiving, from a network application via any of wireless and wired communications, a registration request including first information indicating a plurality of application-level requirements for a distributed ledger service;
   determining, from a plurality of distributed ledger systems communicatively couplable with the device, a first distributed ledger system to serve all blockchain-related processing of the network application based on (i) one or more of the plurality of application-level requirements and (ii) second information indicating one or more features of each of the plurality of distributed ledger systems; and
   sending third information to the network application via any of wireless and wired communications, wherein the third information indicates (i) a confirmation of registration and (ii) a unique identifier assigned to the network application.

2. The method claim 1, wherein the plurality of application-level requirements comprises any of:
   an identifier of the distributed ledger system;
   a type of the distributed ledger system;
   a consensus mechanism;
   a consensus protocol;
   an application programming interface (API) specification of the distributed ledger system;
   a number of peer nodes of the distributed ledger system;
   a current size of a ledger of the distributed ledger system;
   peer node geographical distribution of the distributed ledger system;
   a capability of the distributed ledger system for supporting a new ledger;
   one or more supported performance metrics of the distributed ledger system;
   access details of a node of the distributed ledger system;
   a node type of a node of the distributed ledger system;
   a mobility type of a node of the distributed ledger system; and
   an organization affiliated with a node of the distributed ledger system.

3. The method of claim 1, comprising maintaining a distributed ledger repository comprising at least some of the first information and the second information.

4. The method of claim 3, comprising receiving the at least some of the second information from the distributed ledger repository.

5. The method of claim 3, comprising:
   receiving another registration request from a network node of each of the plurality of distributed ledger systems via any of wireless and wired communications;
   adding information into the distributed ledger repository identifying each of the plurality of distributed ledger systems; and
   sending a confirmation of registration to the network node of each of the plurality of distributed ledger systems via any of wireless and wired communications.

6. The method of claim 1, comprising at least two of:
   maintaining a distributed ledger repository comprising at least some of the first information and the second information;

receiving the at least some of the second information from the distributed ledger repository;

receiving another registration request from a network node of each of the plurality of distributed ledger systems via any of wireless and wired communications;

adding information into the distributed ledger repository identifying each of the plurality of distributed ledger systems; and sending a confirmation of registration to the network node of each of the plurality of distributed ledger systems via any of wireless and wired communications.

7. The method of claim 1, wherein the plurality of application-level requirements comprises the one or more features of each of the plurality of distributed ledger systems.

8. The method of claim 1, wherein each of the plurality of distributed ledger systems is registered to the device.

9. The method of claim 1, wherein the plurality of distributed ledger systems is managed by the device.

10. The method of claim 1, wherein the one or more features of each of the plurality of distributed ledger systems comprises any of a capability, a specification, a type, a characteristic, basic information, and a parameter regarding the corresponding distributed ledger system.

11. A device comprising circuitry, including a transmitter, a receiver, a processor and memory, configured to:

receive, from a network application via any of wireless and wired communications, a registration request including first information indicating a plurality of application-level requirements for a distributed ledger service;

determine, from a plurality of distributed ledger systems communicatively couplable with the device, a first distributed ledger system to serve all blockchain-related processing of the network application based on (i) one or more of the plurality of application-level requirements and (ii) second information indicating one or more features of each of the plurality of distributed ledger systems; and send third information to the network application via any of wireless and wired communications, wherein the third information indicates (i) a confirmation of registration and (ii) a unique identifier assigned to the network application.

12. The device of claim 11, wherein the plurality of application-level requirements comprises any of:

an identifier of the distributed ledger system;
a type of the distributed ledger system;
a consensus mechanism;
a consensus protocol;
an application programming interface (API) specification of the distributed ledger system;
a number of peer nodes of the distributed ledger system;
a current size of a ledger of the distributed ledger system;
peer node geographical distribution of the distributed ledger system;
a capability of the distributed ledger system for supporting a new ledger;
one or more supported performance metrics of the distributed ledger system;
access details of a node of the distributed ledger system;
a node type of a node of the distributed ledger system;
a mobility type of a node of the distributed ledger system; and
an organization affiliated with a node of the distributed ledger system.

13. The device of claim 11, wherein the circuitry is configured to maintain a distributed ledger repository comprising at least some of the first information and the second information.

14. The device of claim 13, wherein the circuitry is configured to receive the at least some of the second information from the distributed ledger repository.

15. The device of claim 13, wherein the circuitry is configured to:

receive another registration request from a network node of each of the plurality of distributed ledger systems via any of wireless and wired communications;

add information into the distributed ledger repository identifying each of the plurality of distributed ledger systems; and send a confirmation of registration to the network node of each of the plurality of distributed ledger systems via any of wireless and wired communications.

16. The device of claim 11, wherein the circuitry is configured for at least two of:

maintaining a distributed ledger repository comprising at least some of the first information and the second information;

receiving the at least some of the second information from the distributed ledger repository;

receiving another registration request from a network node of each of the plurality of distributed ledger systems via any of wireless and wired communications;

adding information into the distributed ledger repository identifying each of the plurality of distributed ledger systems; and sending a confirmation of registration to the network node of each of the plurality of distributed ledger systems via any of wireless and wired communications.

17. The device of claim 11, wherein the plurality of application-level requirements comprises the one or more features of each of the plurality of distributed ledger systems.

18. The device of claim 11, wherein each of the plurality of distributed ledger systems is registered to the device.

19. The device of claim 11, wherein the plurality of distributed ledger systems is managed by the device.

20. The device of claim 11, wherein the one or more features of each of the plurality of distributed ledger systems comprises any of a capability, a specification, a type, a characteristic, basic information, and a parameter regarding the corresponding distributed ledger system.

* * * * *